United States Patent [19]
Yao et al.

[11] Patent Number: 5,896,518
[45] Date of Patent: *Apr. 20, 1999

[54] INSTRUCTION QUEUE SCANNING USING OPCODE IDENTIFICATION

[75] Inventors: Nathan L. Yao; Michael D. Goddard, both of Austin, Tex.

[73] Assignee: Advanced Micro Devices, Inc., Sunnyvale, Calif.

[*] Notice: This patent is subject to a terminal disclaimer.

[21] Appl. No.: 08/795,330

[22] Filed: Feb. 4, 1997

Related U.S. Application Data

[60] Division of application No. 08/292,649, Aug. 18, 1994, Pat. No. 5,630,082, which is a continuation-in-part of application No. 08/146,383, Oct. 29, 1993, abandoned.

[51] Int. Cl.$^6$ .............................................. G06F 9/38
[52] U.S. Cl. ........................... 395/384; 395/385; 395/388
[58] Field of Search ................................ 395/384, 385, 395/386, 388, 389, 390, 391, 380, 800.23

[56] References Cited

U.S. PATENT DOCUMENTS

| | | | |
|---|---|---|---|
| 3,781,808 | 12/1973 | Ahearn et al. | 711/207 |
| 4,044,338 | 8/1977 | Wolf | 365/49 |
| 4,179,737 | 12/1979 | Kim | 395/588 |
| 4,453,212 | 6/1984 | Gaither et al. | 711/2 |
| 4,502,111 | 2/1911 | Riffe et al. | 395/523 |
| 4,736,288 | 4/1988 | Shintani et al. | 395/393 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 4,992,934 | 2/1991 | Portanova et al. | 395/385 |

(List continued on next page.)

FOREIGN PATENT DOCUMENTS

| | | |
|---|---|---|
| 0380854 A3 | 8/1990 | European Pat. Off. |
| 0381471 A2 | 8/1990 | European Pat. Off. |
| 0459232 A2 | 4/1991 | European Pat. Off. |
| 0454984 A2 | 6/1991 | European Pat. Off. |
| 0454985 A2 | 6/1991 | European Pat. Off. |
| 0506972 a1 | 7/1992 | European Pat. Off. |
| 0498654 A3 | 12/1992 | European Pat. Off. |
| 0533337 A1 | 3/1993 | European Pat. Off. |
| 2263987 | 8/1993 | United Kingdom. |
| 2263985 | 11/1993 | United Kingdom. |
| 2281422 | 3/1995 | United Kingdom. |
| 93/01546 | 1/1993 | WIPO. |
| 93/20507 | 10/1993 | WIPO. |

OTHER PUBLICATIONS

Mike Johnson, "Superscalar Microprocessor Design," (Prentice Hall series in innovative technology), 1991.

(List continued on next page.)

*Primary Examiner*—Parshotam S. Lall
*Assistant Examiner*—Viet Vu
*Attorney, Agent, or Firm*—Skjerven, Morrill, MacPherson, Franklin & Friel LLP

[57] ABSTRACT

A superscalar complex instruction set computer ("CISC") processor (100) having a reduced instruction set computer ("RISC") superscalar core (110) includes an instruction cache (104) which identifies and marks raw x86 instruction start and end points and encodes "pre-decode" information, a byte queue (106) which is a queue of aligned instruction and pre-decode information of the "predicted executed" state, and an instruction decoder (108) which generates type, opcode, and operand pointer values for RISC-like operations (ROPs) based on the aligned pre-decoded x86 instructions in the byte queue. The instruction decoder includes in each dispatch position a logic-based conversion path, a memory-based conversion path, and a common conversion path for converting CISC instructions to ROPs. An ROP multiplexer (400) directs x86 instructions from the byte queue to the conversion paths. The ROP multiplexer includes scan logic (690) which rapidly scans the byte queue to generate for each dispatch position an array of bits (ISELx) that identifies the location of the opcode, and ROP information signals (ROPxNUM, ROPxDIFF, PGNXT[x]). The scan logic is segregated into groups of bit processing logic (GP(x,y)) and includes a look-ahead capability (LAG(x)) between groups.

21 Claims, 57 Drawing Sheets

U.S. PATENT DOCUMENTS

| | | | |
|---|---|---|---|
| 5,101,341 | 3/1992 | Circello et al. | 395/389 |
| 5,128,888 | 7/1992 | Tamura et al. | 364/748.14 |
| 5,129,067 | 7/1992 | Johnson | 395/389 |
| 5,131,086 | 7/1992 | Circello et al. | 395/389 |
| 5,136,697 | 8/1992 | Johnson | 395/586 |
| 5,155,816 | 10/1992 | Kohn | 395/381 |
| 5,155,820 | 10/1992 | Gibson | 395/386 |
| 5,185,868 | 2/1993 | Tran | 395/393 |
| 5,226,126 | 7/1993 | McFarland et al. | 395/394 |
| 5,233,694 | 8/1993 | Hotta et al. | 395/391 |
| 5,233,696 | 8/1993 | Suziki | 395/380 |
| 5,251,306 | 10/1993 | Tran | 395/393 |
| 5,337,415 | 8/1994 | DeLano et al. | 395/389 |
| 5,438,668 | 8/1995 | Coon et al. | 395/380 |
| 5,488,710 | 1/1996 | Sato et al. | 711/125 |
| 5,497,496 | 3/1996 | Ando | 395/800.23 |
| 5,513,330 | 4/1996 | Stiles | 395/380 |
| 5,588,277 | 12/1996 | Brown et al. | 395/386 |
| 5,632,023 | 5/1997 | White et al. | 395/394 |
| 5,655,097 | 8/1997 | Witt et al. | 395/380 |

OTHER PUBLICATIONS

U.S. Patent Application Serial No. 07/929,770 filed Apr. 12, 1992 entitled "Instruction Decoder and Superscalar Processor Utilizing Same" —David B. Witt and William M. Anderson.

D.W. Anderson, F.J. Sparacio, F.M. Tomasulo, The IBM System/260 Model 91: Machine Philosophy and Instruction– handling[1] , Chapter 18, Part 2 Regionsof Computer Space, Section 3 Concurrency: Single–Processor System, IBM Journal, vol. 11, Jan. 1967, pp. 276–292.

Michael Slater, "AMD's K5 Designed to Outrun Pentium", *Microprocessor Report*, Oct. 24, 1994, pp. 1,6–11.

IBM Technical Disclosure Bulletin, "System/370 Emulator Assist Processor for a Reduced Instruction Set Computer", vol. 30, No. 10, Mar. 1988, pp. 308–309.

Shreekant S. Thakkar and William E. Hostmann, "An Instruction Pitch Unit for a Graph Reduction Machine", IEEE, ©1986, pp. 82–91.

Toyohiko Yoshida, et al., "The Approach to Multiple Instruction Execution in the GMICRO.400 Processor", ©1991, pp. 185–195.

Tom R. Halhill, "AMD K6 Takes on Intel P6", *Byte* magazine, Jan. 1996, pp. 67–68, 70, and 72.

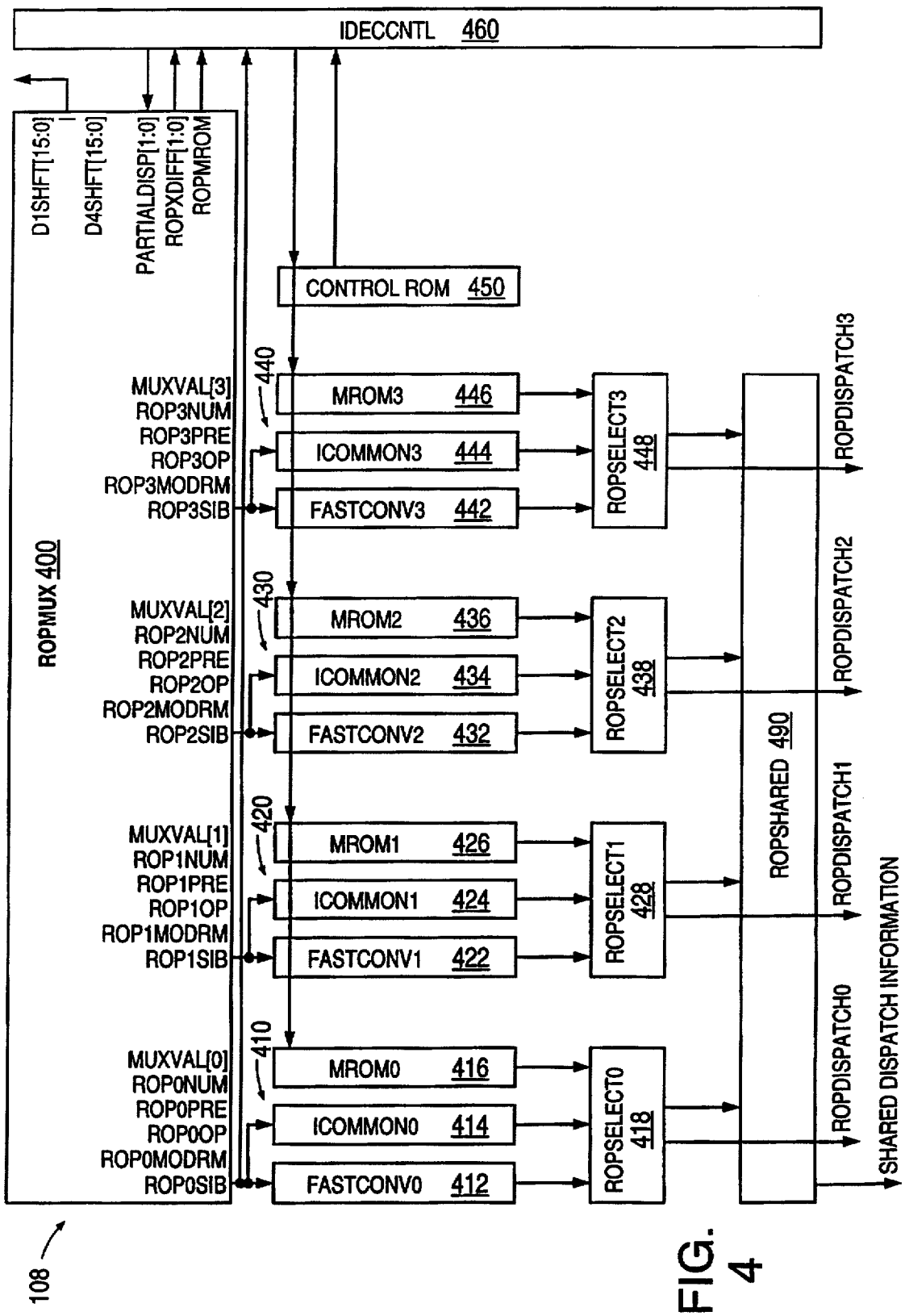

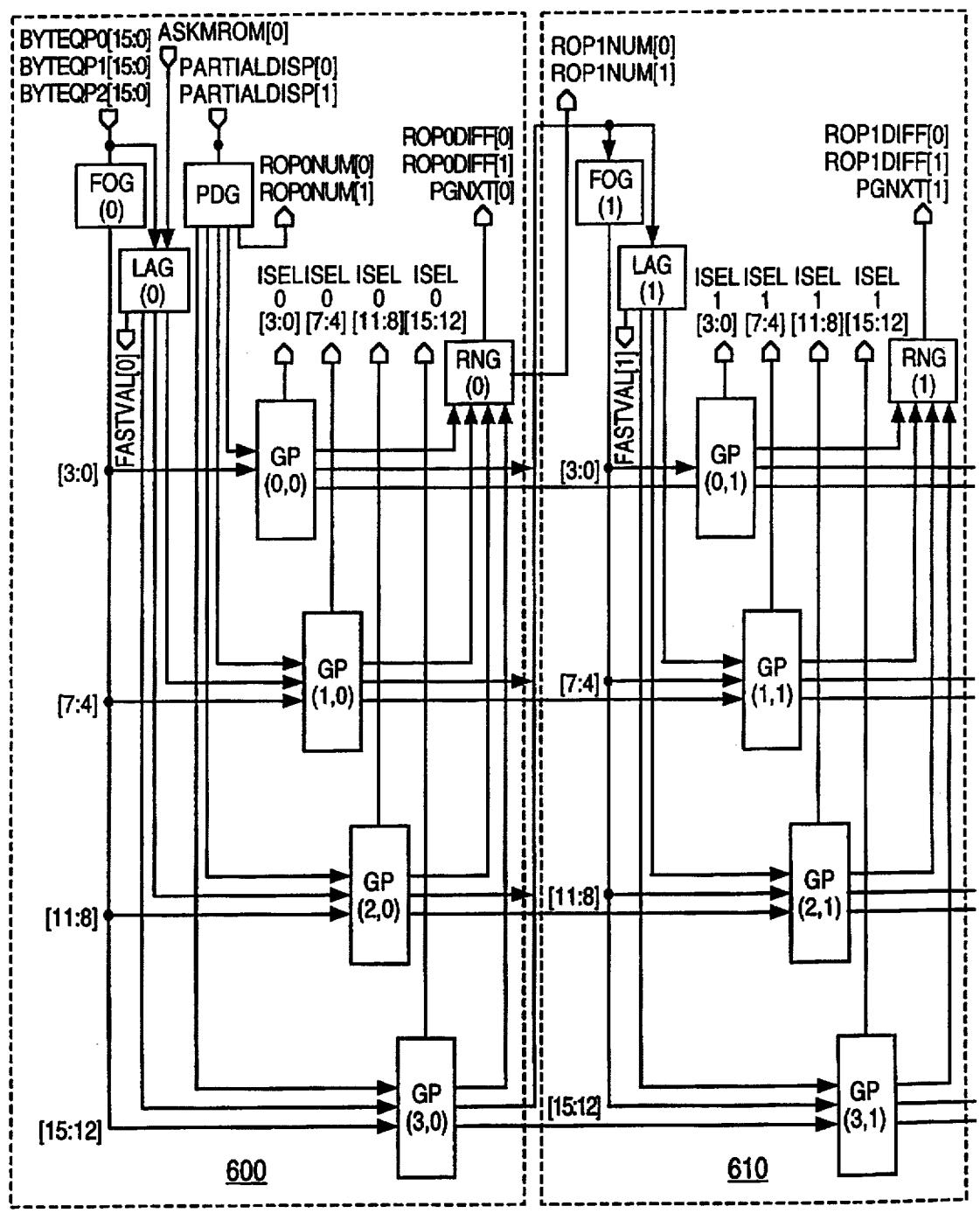
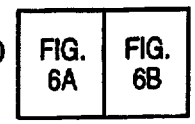
FIG. 6A

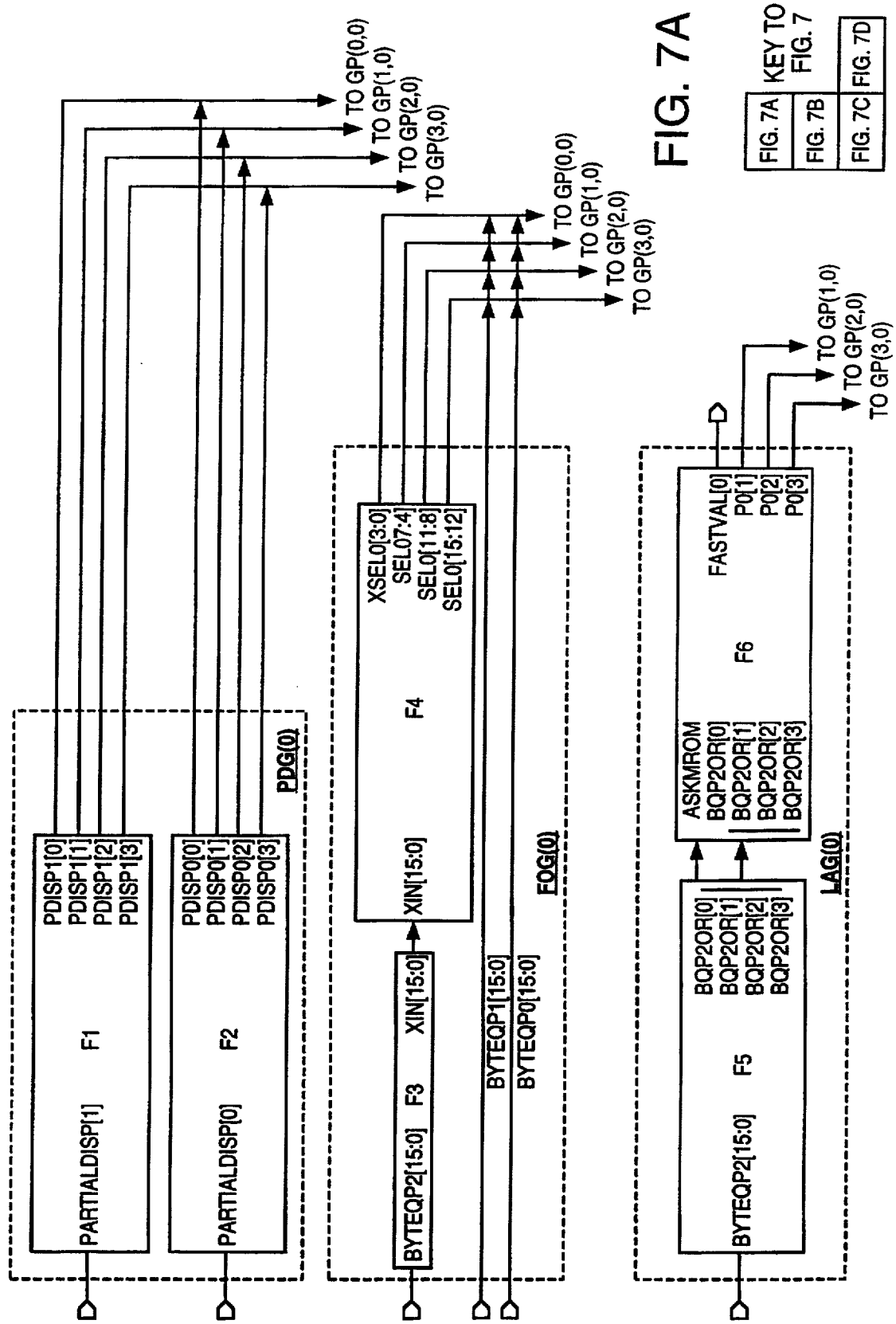

INSTRUCTION QUEUE SCANNING USING OPCODE IDENTIFICATION

CROSS-REFERENCE TO RELATED APPLICATION

This application is a divisional of U.S. patent application Ser. No. 08/292,649, filed Aug. 18, 1994, entitled "APPARATUS AND METHOD FOR INSTRUCTION QUEUE SCANNING" and naming Yao and Goddard as inventors, now U.S. Pat. No. 5,630,082, which is hereby incorporated herein by reference in its entirety, and which in turn is a continuation-in-part of U.S. patent application Ser. No. 08/146,383, filed Oct. 29, 1993, now abandoned.

BACKGROUND OF THE INVENTION

1. Field of the Invention

The invention relates to instruction decoding, and more particularly to scanning a queue of variable length instructions to identify instruction elements for decoding.

2. Description of Related Art

General purpose processors typically are based on scalar instruction sets. Processor architectures are either RISC (Reduced Instruction Set Computer) -based or CISC (Complex Instruction Set Computer) -based. Each approach has its advantages and disadvantages, as has been widely discussed in the literature.

RISC architectures have been used in superscalar computer designs. The term "superscalar" describes a computer implementation that improves performance by concurrent execution of scalar instructions. Progress in implementing superscalar RISC architectures has been good. Scalar RISC architectures typically are defined with a pipelined implementation in mind, and include many features which facilitate superscalar implementation. These features include a fixed format and fixed length instructions, explicit instruction operands, and a load/store architecture. Superscalar RISC architectures are described in Johnson, Superscalar Microprocessor Design, Prentice Hall, Englewood Cliffs, N.J., 1991, which is incorporated herein by reference in its entirety.

Although interest has been expressed in achieving superscalar CISC architectures, progress has been hindered in part because few CISC architectures were defined with superscalar implementation in mind. CISC architectures were defined at a time when the principal implementation technique was microcode interpretation of the instruction set, with an emphasis on deciding which operations should be combined into instructions rather than designing operations so that they could be overlapped. While enormously versatile, microcode interpretation does not facilitate development of pipelined architectures or superscalar architectures. Difficulties arise from numerous aspects of conventional CISC architectures, including instruction format complexity. An aspect of the instruction format complexity is instruction length variability.

An example of a CISC instruction format is the instruction format of the model 80486 microprocessor and the Pentium™ microprocessor, which are available from Intel Corporation of Santa Clara, Calif. In this instruction format, which inherits characteristics from earlier Intel instruction sets and is generally known as the x86 format, an instruction may have an operation code ("opcode") consisting of one or two opcode bytes, a modify register or memory ("mod r/m") byte, a scale-index-base ("sib") byte, displacement bytes, and immediate date bytes. The opcode specifies the operation code, and may also contain a register identifier. The mod r/m byte specifies whether an operand is in a register or in memory. If the operand is in memory, fields in the mod r/m byte specify the addressing mode to be used. Certain encodings of the mod r/m byte indicate that a second byte, the sib byte, follows to fully specify the addressing mode. The sib byte consists of a 2-bit scale field, a 3-bit index field, and a 3-bit base field. These fields are used in complex memory addressing modes to specify how address computation is done. The displacement byte is used in address computation. The immediate data byte is used for an instruction operand. One or more additional bytes, known as prefix bytes, may appear before the opcode byte. The prefix byte changes the interpretation of the instruction, adding additional complexity.

As is apparent from the foregoing discussion, the length of an instruction in the x86 format is widely variable. The minimum instruction consists of a single opcode byte and is 8 bits long. A long instruction that includes a prefix byte may be 104 bits long. Longer instructions containing more than a single prefix byte are possible as well.

The variable instruction length and other complications of the x86 instruction format has resulted in complex and hence relatively slow decoding circuits. While slow decoding circuits may be acceptable in slow microprocessors and in some CISC microprocessors which handle complex instructions, they seriously impact performance in microprocessors having architectures in which each functional element is optimized for speed.

SUMMARY OF THE INVENTION

Advantageously, the present invention provides a rapid scan of a queue of instructions of a superscalar processor for controlling the direction of one or more instructions as appropriate to dispatch positions in the superscalar processor.

This and other advantages are achieved in an scanning apparatus comprising first and second stages for, respectively, first and second dispatch positions. The first stage comprises a plurality of groups of masking logic having inputs coupled to opcode location identification elements, a look-ahead generator having an input coupled to the identification elements and outputs coupled to higher order ones of the masking logic groups of the first stage, and a mapped instruction information generator coupled to outputs of the masking logic groups of the first stage. The second stage comprises a plurality of groups of masking logic having inputs coupled to outputs of corresponding masking logic groups in the first stage, and a look-ahead generator having inputs coupled to outputs of the mapped instruction information generator and of the masking logic groups in the first stage, and outputs coupled to higher order ones of the masking logic groups of the second stage.

This and other advantages are also obtained in a method for scanning a queue of primary instructions having one or more opcodes at respective locations in the queue identified by a first set of opcode location identifiers ("OLI"), wherein each primary instruction maps to a sequence of a number of one or more secondary instructions. First and second subsets in the first set of OLIs are identified, and a second set of OLIs is generated for the first dispatch position having first and second subsets corresponding to the first and second subsets in the first set of OLIs, but in which any first asserted OLIs are identified. A look-ahead signal is also generated for the first dispatch position if the first subset of the first set of OLIs does not include any asserted OLIs. The look-ahead signal is applied to the second subset of the second set of OLIs to generate from the second set of OLIs a third set of OLIs for the first dispatch position indicating a first asserted OLI in the first set and not indicating any successively asserted OLIs in the first set. A fourth set of OLIs is derived from the first set, and a similar series of steps is applied for the second dispatch position. In a variation, the fourth set of OLIs is derived by blocking the first asserted OLI in the first set of OLIs when the first dispatch position contains a last secondary instruction in the sequence of secondary instructions, and otherwise the first asserted OLI in the first set of OLIs is propagated.

BRIEF DESCRIPTION OF THE DRAWINGS

In the figures, in which like reference characters indicate like parts:

FIG. 4 is an architecture-level block diagram of the instruction decoder of FIG. 1;

FIGS. 5, 5A, 5B and 5C are flowcharts showing a method implemented by the ROP multiplexer of FIG. 4;

FIGS. 6, 6A and 6B are parts of an architecture-level block diagram of a byte queue ROP select scan logic of the ROP multiplexer of FIG. 4;

FIGS. 7, 7A, 7B, 7C and 7D are parts of a block diagram showing in greater detail certain elements of the byte queue ROP select scan logic of FIGS. 6A and 6B;

DETAILED DESCRIPTION OF THE PREFERRED EMBODIMENT

Figure 1:
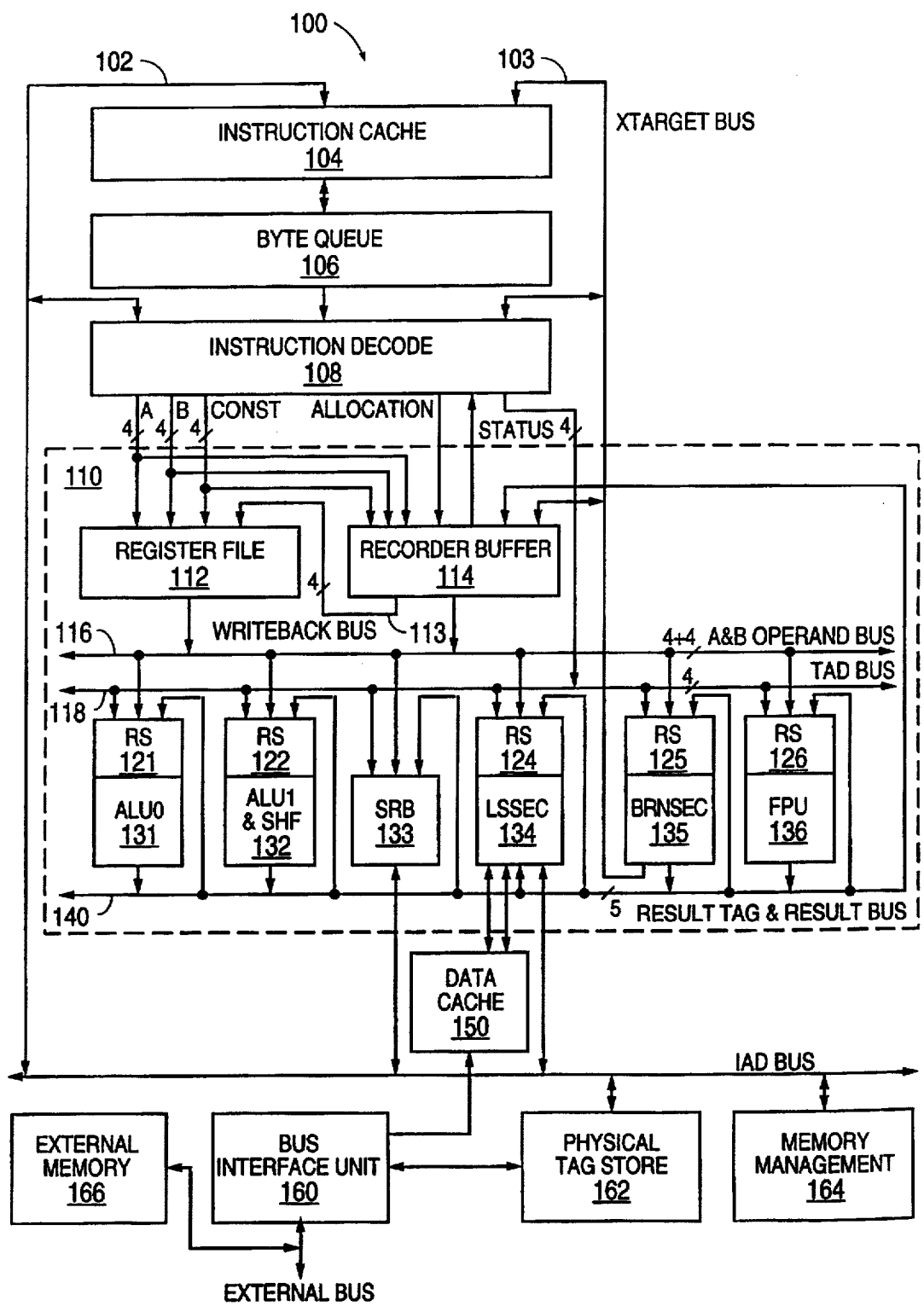
FIG. 1 is an architecture-level block diagram of a processor for achieving superscalar execution of a CISC instruction set.

The architecture of a processor 100 for achieving a superscalar execution of a CISC instruction set is shown in FIG. 1. The processor 100 is based on a superscalar RISC-like core 110, and includes various elements that convert CISC instructions into RISC-like operations, or ROPs, for processing by the core 110. ROPs have a number of useful characteristics, including a "source A—operation—source B→destination" structure, fixed location of opcode and source operands, a load/store architecture, and direct calculation of load/store addressing modes. The ROPs for the core 110 are three operand instructions: two source operands A and B, and one destination operand.

The CISC addresses, data, and control transfers between the major functional blocks of the processor 100 as well as to and from external memory are communicated on an internal address and data ("IAD") bus 102, which is interfaced to an external bus (not show) by a bus interface unit ("BIU") 160 in conjunction with a physical tag store 162 and a memory management unit 164. The IAD bus 102 is a 64-bit bus. A transfer target bus, or XTARGET bus 103, is a 32-bit bus with various prioritized uses, including updating the IDECODE 108 from the branch section BRNSEC 135 in the event of microbranch misprediction, exceptions, and resets; and updating a branch FIFO in the BRNSEC 135 from the IDECODE.

The various elements that convert CISC instructions into ROPs include an instruction cache, or ICACHE, 104; a byte queue, or BYTEQ 106, and an instruction decoder, or IDECODE 108. The CISC instructions, illustratively instructions used by x86 class microprocessors (hereinafter x86 instructions), are parsed and pre-decoded in the ICACHE 104. The ICACHE 104 is a first level instruction cache which identifies and marks raw x86 instruction start and end points and encodes "pre-decode" information. The pre-decoded x86 instructions are copied to the BYTEQ 106, which is, conceptually, a queue of up to sixteen entries representing zero, one or more pre-decoded x86 instructions in the "predicted executed" state. Each pre-decoded x86 instruction starts on an instruction start and ends on an instruction end, and consists of one or more elements. Each element includes a valid bit, an x86 instruction byte, pre-decode information of the predicted executed state, and branch misprediction information. As x86 instructions are dispatched from the BYTEQ 106 and subsequent x86 instructions are advanced to the head of the queue, the pre-decoded x86 instructions are copied into locations of the BYTEQ 106 provided space is available. The pre-decoded x86 instructions from the BYTEQ 106 are mapped in the instruction decoder ("IDECODE") 108 to respective sequences of ROPS. The IDECODE 108 generates type, opcode, and pointer values for all ROPs based on the pre-decoded x86 instructions in the BYTEQ 106, and determines the number of possible x86 instruction dispatch for shifting the BYTEQ 106. The IDECODE 108 also maintains the program counter values of speculative ROPs, and maintains speculative mapping of floating point pointers for speculative floating point execution. Depending on how many ROPs the x86 instructions map to, up to four x86 instructions can be dispatched concurrently.

While the BYTEQ 106 is shown as between the ICACHE 104 and the IDECODE 108, it may be integrated with either, distributed across both, or implemented as a separate unit.

The ROP instructions are dispatched to the core 110 over various buses. The core 110 supports four ROP issue, five ROP results, and up to sixteen speculatively executed ROPs. Up to four sets of pointers to the A and B source operands are furnished over respective buses by the IDECODE 108 to a register file ("REGF") 112 and to a reorder buffer ("ROB") 114 the core 110. The REGF 112 is a physical register file which contains the mapped x86 registers for the integer and floating point instructions. The ROB 114 is a circular FIFO with head and tail queue pointers for keeping track of the relative order of speculatively executed ROPs. The storage locations are dynamically allocated to instruction results. Speculative execution state operands are retired from the ROB 114 to the REGF 112 over a writeback bus 113.

The REGF 112 and ROB 114 furnish the appropriate "executed" and "predicted executed" versions of the RISC operands A and B to various functional units in the core 110 via an A & B source operand bus 116. The various functional units in the core 110 are a first arithmetic logic unit ("ALU0") 131, a second arithmetic logic and shift unit ("ALU1 & SHF") 132, a special register block ("SRB") 133, a load/store section ("LSSEC") 134, a branch section ("BRNSEC") 135, and a floating point unit ("FPU") 136. The functional units 131, 132, 133, 134, 135 and 136 include respective reservation stations 121, 122, 124, 125 AND 126 having inputs connected to the operand bus 116 and the TAD bus 118. RISC opcode information is dispatched from the IDECODE 108 via a type and dispatch information ("TAD") bus 118. When results are obtained from completion of execution in the functional units 131–136, the results and their respective result tags are furnished to the ROB 114 over a four bus wide result tag and result bus 140, as well as to the reservation stations 121–122 and 124–126.

DCACHE 150 is closely aligned to LSSEC 134, which handles both integer and floating point load and store operations. Up to two load operations simultaneously access the DCACHE 150 and forward their operations to the result bus 140. Cache hit/miss checking for data stored in the DCACHE 150 is also done by the LSSEC 134.

The processor 100 also includes the physical tag store 162, the memory management unit 164, and a bus interface unit 160, which interfaces with a conventional external bus coupled to a conventional external memory 166. The physical tag store 162 contains tags which relate to the contents of the ICACHE 104 and the DCACHE 150. The memory management unit 164 performs memory address conversions. The bus interface unit 160 takes requests for read/write cycles from the physical tag store 162, and watches read/write cycles on the external bus to ensure cache consistency in the physical tag store 162, the ICACHE 104, and the DCACHE 150 and, upon detection, to update, invalidate, or provide data as appropriate.

The processor 100 of FIG. 1 operates as a five stage pipeline having a fetch stage, two decode stages DECODE1 and DECODE2, an execute stage, a result stage, and a retire stage.

The ICACHE 104 is described in further detail in U.S. patent application Ser. No. 08/145,905 filed on Oct. 29, 1993 (David B. Witt and Michael D. Goddard, "Pre-Decode Instruction Cache and Method Therefor Particularly Suitable for Variable Byte-Length Instructions," Attorney Docket Number M-2278), which is incorporated herein by reference in its entirety. The BYTEQ 106 is described in further detail in U.S. patent application Ser. No. 08/145,902 filed Oct. 29, 1993 (David B. Witt "Speculative Instruction Queue and Method Therefor Particularly Suitable for Variable Byte-Length Instructions," Attorney Docket Number M-2279), which is incorporated herein by reference in its entirety. The IDECODE 108 is described in further detail in U.S. patent application Ser. No. 08/146,383 filed on Oct. 29, 1993 (David B. Witt and Michael D. Goddard, "Superscalar Instruction Decoder," Attorney Docket Number M-2280), which is incorporated herein by reference in its entirety. A suitable unit for the core 110 is disclosed in U.S. patent application Ser. No. 08/146,382 filed on Oct. 29, 1993 (David B. Witt and William M. Johnson, "High Performance Superscalar Microprocessor," Attorney Docket Number M-2518), which is incorporated herein by reference in its entirety. Other suitable superscalar RISC cores as well as suitable RISC instruction sets are well known in the art. The DCACHE 150 and the LSSEC 134 are further described in U.S. patent application Ser. No. 08/146,381 filed on Oct. 29, 1993 (David B. Witt, "Linearly Addressed Microprocessor Cache," Attorney Docket Number M-2412 US), which is incorporated herein by reference in its entirety. The physical tag store 162 and the LSSEC 134 are further described in U.S. patent application Ser. No. 08/146,376 filed on Oct. 29, 1993 (William M. Johnson, David B. Witt, and Murali Chinnakonda, "High Performance Load/Store Functional Unit and Data Cache," Attorney Docket Number M-2281 US), which is incorporated herein by reference in its entirety.

Figure 2:
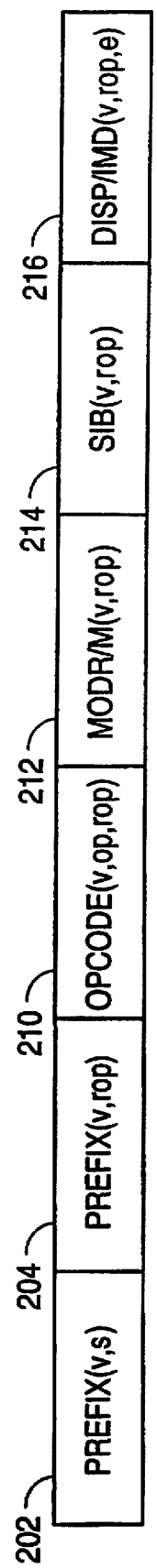
FIG. 2 is a pictorial representation of a pre-decoded x86 instruction suitable for storage in a byte queue of the processor of FIG. 1.

A general representation of a pre-decoded x86 instruction resulting from the processing of an x86 instruction in the ICACHE 104 is shown in FIG. 2. The pre-decoded x86 instruction may have up to six instruction "elements." If one or more prefixes are present in the raw x86 instruction, the pre-decoded x86 instruction includes one or more prefix elements. The last prefix element is a consolidated prefix element containing complete prefix information for the IDECODE 108, while the other prefix elements are re-coded prefix elements containing partial information and are not used by the IDECODE 108. FIG. 2 shows re-coded prefix element 202 and consolidated prefix element 204. An OPCODE element 210 containing an x86 instruction opcode byte follows the prefix elements 202 and 204. If the raw x86 instruction performs special memory addressing, the pre-decoded x86 instruction includes a mod r/m element, e.g. mod r/m element 212. If the raw x86 instruction requires certain addressing modes, the pre-decoded x86 instruction includes an sib element; e.g. sib element 214. If the raw x86 instruction requires displacement information for address computation or contains immediate data, the pre-decoded x86 instruction includes a displacement/immediate data element; e.g. displacement/immediate data element 216.

Pre-decode information is conveyed by various bits which are identified by the codes v, s, e, rop, and op. Bit "v" is a valid bit which indicates whether a particular element is part of a valid instruction, bit "s" is a start bit which identifies the first element of the pre-decoded x86 instruction, bits "rop" indicate the number of ROPs required for the x86 instruction, bits "op" identifies the x86 instruction opcode element, and bit "e" is an end bit which identifies the last element of the pre-decoded x86 instruction.

FIG. 2 shows asserted pre-decode information bits. All elements in the illustrated pre-decoded x86 instruction of FIG. 2 are valid, as indicated by an asserted "v" bit. The first element of the pre-decoded x86 instruction of FIG. 2, the re-coded prefix 202, is identified by an asserted "s" bit. Bits "rop" are not shown asserted in the re-coded prefix element 202 because the re-coding operations may not yield valid rop information. However, as the rop bits are valid in the final re-coding operation, the consolidated prefix 204 and all subsequent elements of the pre-decoded x86 instruction contain usable rop bits. Bits "op" identifies the x86 instruction opcode element 210. The displacement-immediate element 216 is marked as the last element of the pre-decoded x86 instruction by an asserted "e" bit.

Figure 3:
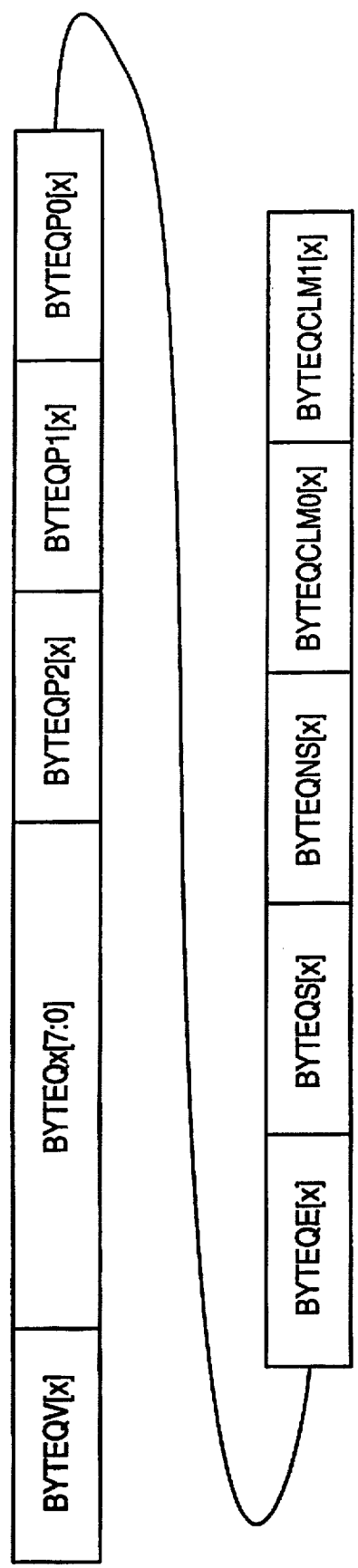
FIG. 3 is a pictorial representation of an element of the pre-decoded x86 instruction of FIG. 2.

The BYTEQ 106 is maintained in several arrays, as shown for the representative byte queue element "x" of FIG. 3. The array BTYEQ contains bytes that are selected from or derived from the bytes of the raw x86 instruction, including re-coded prefix information, consolidate prefix information, opcode information, mod r/m information, sib information, or displacement or immediate data information. Hence, the representative byte queue element "x" of FIG. 3 includes bits BYTEQx[7:0]. The array BYTEQV contains the valid bits. Hence, the representative byte queue element "x" of FIG. 3 includes bit BYTEQV[x], which indicates whether the $x^{th}$ element is valid. Byte misprediction information includes BYTEQNS[x], BYTEQCLM0[x] and BYTEQCLM1[x].

Pre-decode information bits s, e, op and rop are contained in the s bit array BYTEQS, the e bit array BYTEQE, the op bit array BYTEQP2, and the rop bit arrays BYTEQP1 and BYTEQP0 for the two bits of rop information, each entry of which corresponds to a location in the BYTEQ 106. In FIG. 3, pre-decode information for the $x^{th}$ element includes BYTEQP2[x], which indicates when logic 1 that the accompanying raw byte is an opcode byte; BYTEQP1[x] and BYTEQP0[x], which indicate the number of ROPs needed to execute the x86 instruction; BYTEQS[x], which indicates whether the accompanying raw byte is the first byte of the x86 instruction; and BYTEQE[x], which indicates whether the accompanying raw byte is the last byte of the x86 instruction.

The IDECODE 108, which is shown in greater detail in FIG. 4, is a two-stage pipelined decoder which receives pre-decoded x86 instruction bytes from the BYTEQ 106, translates them into respective sequences of ROPs, and rapidly dispatches ROPs from a plurality of dispatch positions. To maximize the opportunity for multiple instruction issue, the translation is handled in a hardwired fast conversion path for most simple instructions, which the embodiment of FIG. 4 applied to x86 instructions which map to three ROPs or less. Instructions which require more than three ROPs and infrequently used instructions are handled by microcode sequences contained in microcode ROM. Whether an x86 instruction maps to multiple ROP instructions or microcode ROM, the pre-decoded x86 instruction information is duplicated at multiple dispatch positions to allow each dispatch position to work independently and in parallel with other dispatch positions.

In the IDECODE 108, an ROP multiplexer ROPMUX 400 directs entries of the BYTEQ 106 to four dispatch positions 410, 420, 430 AND 440. In each dispatch position, a fast converter (e.g. FASTCONV0 412, FASTCONV1 422, FASTCONV2 432, or FASTCONV3 442) performs a fast conversion of a "simple" x86 instruction (i.e. an instruction that maps to 3 or fewer ROPs) into one of ROPs in the sequence to which the x86 instruction maps. Each dispatch position also has a microcode ROM (e.g. MROM0 416, MROM1 426, MROM2 436, or MROM3 446), which uses microcode ROM to convert rarely used x86 instructions and x86 instructions requiring ROP sequences of more than 3 ROPs into one of ROPs in the sequence to which the x86 instruction maps. The common stages ICOMMON0 414, ICOMMON1 424, ICOMMON2 434, and ICOMMON3 444 process and pipeline portions of x86 instruction conversion operations which can be effectively handled in a particular way regardless of whether the instruction is a fastpath or microcode ROM instruction. Each of the ROPSELECT0 418, ROPSELECT1 428, ROPSELECT2 438, and ROPSELECT3 448 selects either the outputs of its associated fast converter and common paths, or the outputs of its associated memory ROM and common paths, and generates dispatch information. The ROPSHARED 490 is responsive to information from the ROPSELECT0 418, ROPSELECT1 428, ROPSELECT2 438, and ROPSELECT3 448 for generating dispatch information for resources that are shared by all dispatch positions. The IDECODE 108 is controlled by IDECCNTL 460.

The ROPMUX 400 is responsible for allocating a complete pre-decoded x86 instruction in the BYTEQ 106 to one or more of the dispatch positions 410, 420, 430 and 440 in the IDECODE 108. One or more pre-decoded x86 instructions are directed concurrently from the BYTEQ 106 to available ones of the dispatch positions 410, 420, 430 and 440, beginning with the x86 instruction at the head of the BYTEQ 106. For example, assuming all dispatch positions are available, if each of the first four pre-decoded x86 instructions in the BYTEQ 106 maps to one ROP, the first pre-decoded x86 instruction at the head of the BYTEQ 106 is muxed to dispatch position 0, the second pre-decoded x86 instruction is muxed to dispatch position 1, the third pre-decoded x86 instruction is muxed to dispatch position 2, and the fourth pre-decoded x86 instruction is muxed to dispatch position 3. Alternatively, if the second pre-decoded x86 instruction in the BYTEQ 106 maps to two ROPs, the first pre-decoded x86 instruction is muxed to dispatch position 0, the second pre-decoded x86 instruction is muxed to dispatch positions 1 and 2, and the third pre-decoded x86 instruction is muxed to dispatch position 3.

A pre-decoded x86 instruction that does not map to microcode ROM and does not entirely fit in the dispatch window is allocated as many dispatch positions 410, 420, 430 and 440 as available in the first dispatch window. The IDECCNTL 460 uses a signal PARTIALDISP[1:0] to indicate the number of the next ROP to be dispatched for the pre-decoded x86 instruction at the head of queue in the next cycle, so that the already dispatched ROPs are not allocated dispatch positions.

PARTIALDISP[1:0] is obtained in the IDECCNTL 460 from signal ROPxDIFF[1:0], which indicates for each of the dispatch position "x" (x=0,1,2,3) the number of the next ROP remaining to be dispatched. The first ROP in a sequence is considered number 0, the second is considered number 1, and so forth. Specifically, PARTIALDISP[1:0] is latched for the next cycle from one of the ROPxDIFF signals, selected on the basis of the number of ROPs predicted to be dispatched from the current dispatch window. For example, if the instruction at the head of queue and the next instruction both map to three ROPs, ROP0DIFF and ROP1DIFF correspond to the instruction at the head of queue, while ROP2DIFF and ROP3DIFF correspond to the next instruction. ROP0DIFF is 1, ROP1DIFF is 2, ROP2DIFF is 0, and ROP3DIFF is 1. Assuming the IDECCNTL 460 determines that all four ROPs in the dispatch window are to be dispatched, ROP3DIFF is selected and latched as PARTIALDISP. The value of PARTIALDISP for the next dispatch window is therefore one.

Figure 5A:
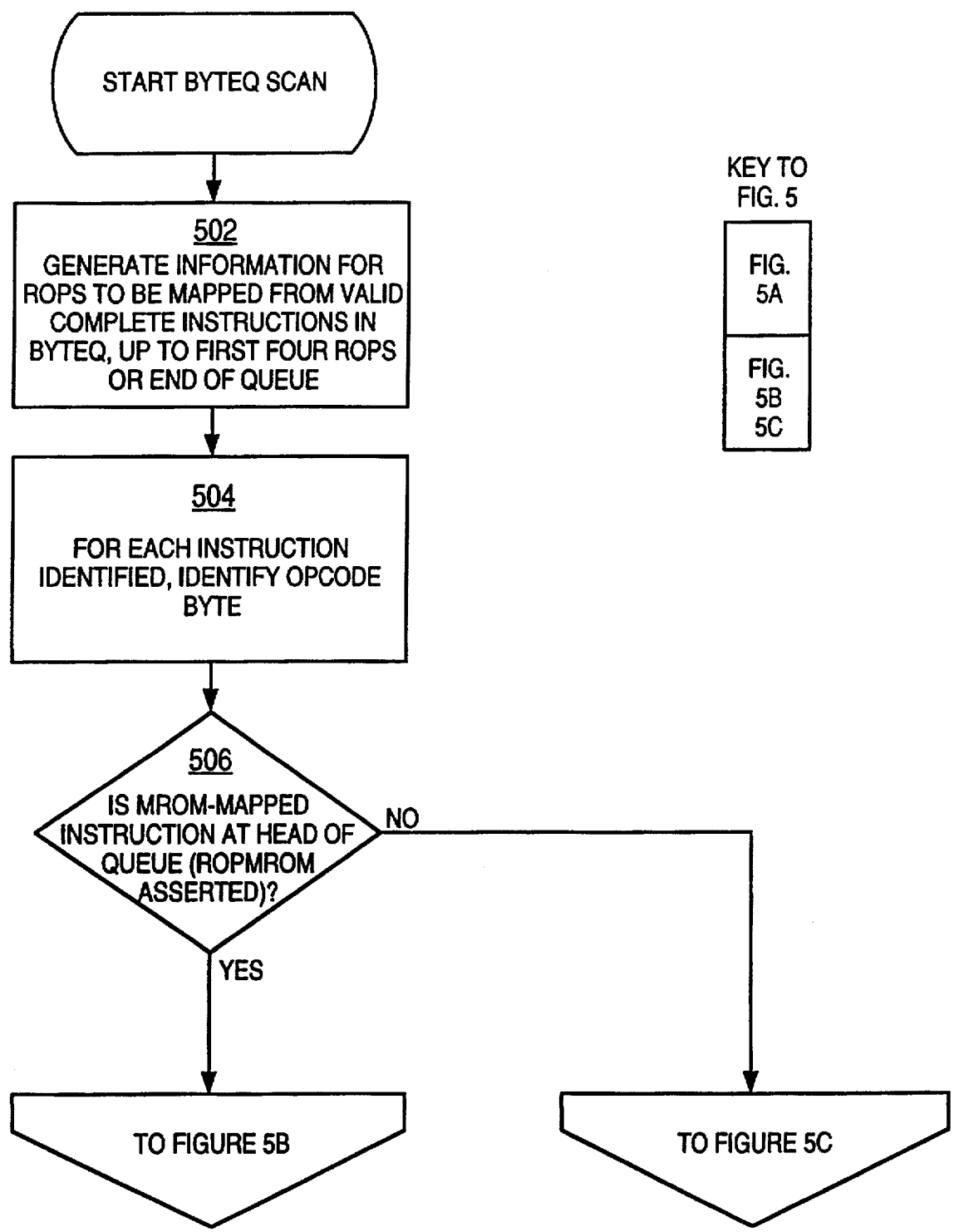

The operation of the ROPMUX 400 is shown in FIG. 5, which is a flowchart of a scanning function performed on the BYTEQ 106. When the BYTEQ 106 becomes valid after a shifting operation, the ROPMUX 400 rapidly "scans" the BYTEQ 106 to identify and to obtain certain information about complete pre-decoded x86 instructions and the number of ROPs to which they map. Rapid scanning affords more time for the conversion processes, which need to complete quickly in the processor 100. To avoid unnecessary delay, the scanning preferably is performed essentially concurrently using the circuits shown in FIGS. 8 through 51 and others that are similar, although other logic circuits may be used to perform the functions shown in the architecture of FIGS. 6 and 7. The flowchart of FIG. 5 illustrates the various scanning operations performed, and is not to be interpreted as teaching a sequential ordering of those various operations.

In operation 502, the byte queue scan function begins at the head of BYTEQ 106 and identifies all valid and complete instructions that collectively map to four ROPs. If the end of queue is encountered before four ROPs are detected, the byte queue scan function identifies all valid and complete instructions in the BYTEQ 106. The instructions are identified by detecting their respective start bits in the array BYTEQS and valid bits in the array BYTEQV. Complete instructions are identified by determining that the start bit of the instruction has an opposing end bit in the array BYTEQE.

In operation 502, the ROPMUX 400 also generates the control signals ROPxNUM[1:0] and ROPxDIFF[1:0], which respectively indicate for the dispatch position "x" the number in the ROP sequence in which it is a member of the current ROP to be dispatched and the number in the ROP sequence in which it is a member of the next ROP to be dispatched. For example, if the instruction at the head of queue and the next instruction both map to three ROPs, ROP0NUM is 0, ROP1NUM is 1, ROP2NUM is 2, and ROP3NUM is 0; while ROP0DISP is 1, ROP1DISP is 2, ROP2DISP is 0, and ROP3DISP is 1.

The ROPMUX 400 also generates a control signal PGNXT[x], which indicates whether the ROP in the dispatch position "x" is the last ROP in the ROP sequence mapped from the corresponding x86 instruction. When ROPxDIFF is 00, which indicates that the next dispatch position is to dispatch the first ROP mapped from a new x86 instruction, PGNXT[x] is 0; else PGNXT[x] is 1. PGNXT[x] is furnished to other byte queue scan logic circuits that require such information, such as the byte queue SE scan logic 5200 shown in FIG. 52.

In operation 504, the position of the opcodes in each of the instructions identified in operation 502 is identified and reported in arrays ISEL0, ISEL1, ISEL2 and ISEL3.

Figure 5B:
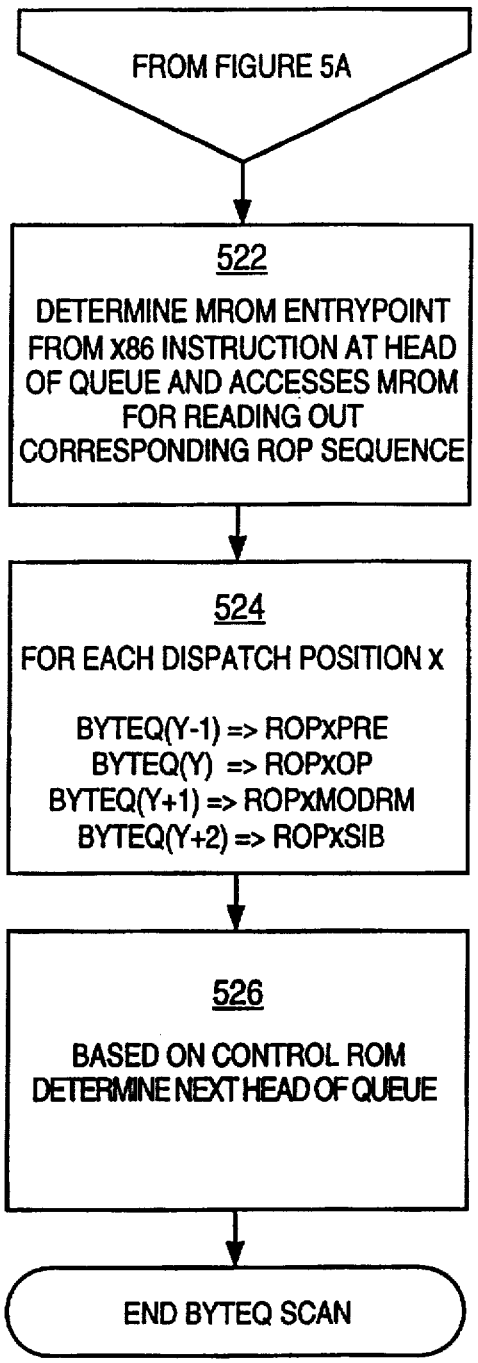
Figure 5C:
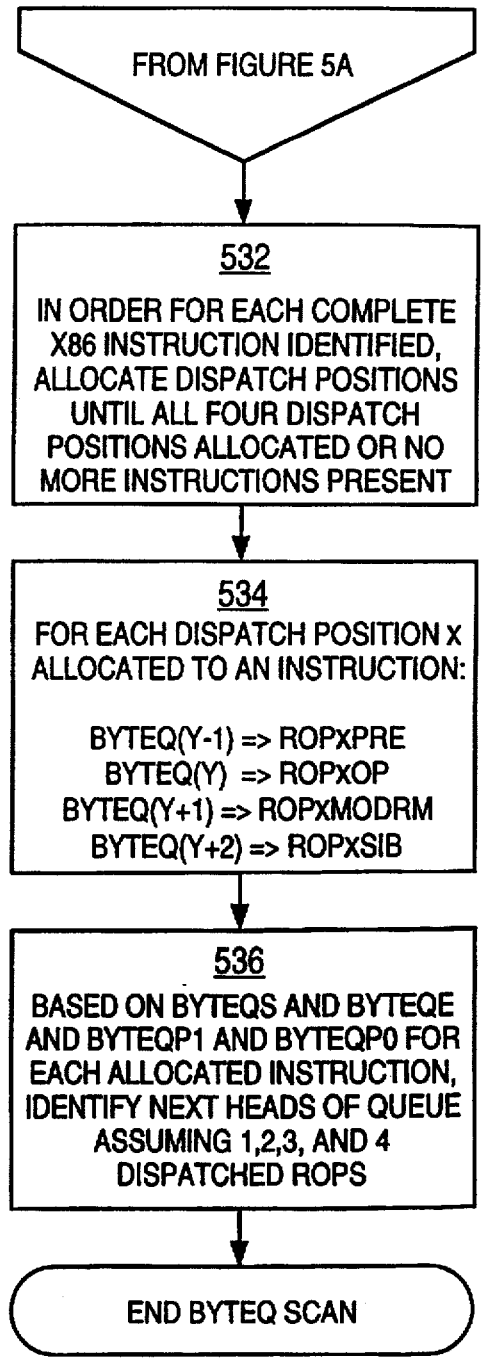

In operation 506, a determination is made of whether the pre-decoded x86 instruction at the head of the BYTEQ 106 is a microcode ROM mapped instruction, which is indicated when BYTEQP1[x],BYTEQP0[x] is 11. The determination is made in the ROPMUX 400 and reported as the signal ROPMROM. The operations of FIG. 5B are performed if the predecoded x86 instruction at the head of the BYTEQ 106 is a microcode ROM mapped instruction. The operations of FIG. 5C are performed if the pre-decoded x86 instruction at the head of the BYTEQ 106 is not a microcode ROM mapped instruction.

When the pre-decoded x86 instruction at the head of the BYTEQ 106 is not a microcode ROM mapped instruction, dispatch positions 410, 420, 430 and 440 are allocated in operation 532 (FIG. 5C) to pre-decoded x86 instructions depending on the number of ROPs to which each pre-decoded x86 instruction maps and the number of dispatch positions available. ROPxNUM for the dispatch positions allocated in this manner are assigned their respective values, control signal ROPMROM is not asserted, and MUXVAL[x] for each dispatch position is asserted.

For example, assume that the opcode for instruction I1 at the head of queue is at position 0 in the BYTEQ 106. The value of BYTEQP1[0] and BYTEQP0[0] for the instruction I1 is 10, indicating that the instruction I1 maps to three ROPs. The first three dispatch positions 0, 1 and 2 are available and are allocated to instruction I1. Assume further that the opcode for the next instruction I2 is at position 5 in the BYTEQ 106. The value of BYTEQP1[5] and BYTEQP0[5] are also 10, indicating that the instruction I2 maps to three ROPs. Since only one dispatch position is available, it is allocated to the instruction I2. Note that dispatch position resources are not available in the present decode stage for full allocation to the instruction I2. The remaining two required dispatch positions are allocated to instruction I2 in the next cycle, after instruction I2 is shifted to the head of the BYTEQ 106 and in accordance with control signal PARTIALDISP, which is set to one to indicate the number of the next ROP to be dispatched. If any of the x86 instructions pending for the current dispatch window and not at the head of the BYTEQ 106 maps to microcode ROM, dispatch positions are still allocated. However, ROPxNUM for dispatch positions allocated in this manner is "don't care," since control signal ROPMROM is not asserted and ROPs dispatched from dispatch positions allocated to x86 instructions which map to microcode ROM but which are not at the head of queue are not marked valid (MUXVAL[x] for dispatch position x is not asserted). Invalid ROPs are not processed in subsequent pipeline stages of the processor 100.

In operation 534, each dispatch position receives four elements from a pre-decoded x86 instruction stored in the BYTEQ 106. The four elements are a consolidated prefix data element at byte queue location Y-1, an opcode element at byte queue location Y, a mod r/m element at byte queue location Y+1, and a sib element at location Y+2, where Y is the location in the BYTEQ 106 of the opcode element of the instruction.

In operation 536, the next heads of queue are determined for one, two, three and four ROPs dispatched. This information is furnished to the ICACHE 104, where it is used for shifting the BYTEQ 106.

When the pre-decoded x86 instruction at the head of the BYTEQ 106 is a microcode ROM mapped instruction, all four dispatch positions are allocated to the microcode ROM mapped instruction. For a microcode ROM mapped instruction, the value of BYTEQP1 and BYTEQP0 is 11, indicating that the instruction is microcode ROM mapped. If the allocation of four dispatch position resources is not sufficient for completing dispatch of the ROP sequence to which the x86 instruction maps, the four dispatch position resources are again allocated to the microcode mapped instruction in the next cycle. ROPxNUM for dispatch positions allocated in this manner is "don't care" since it is not used, the dispatch positions are marked valid (MUXVAL[3:0] bits are asserted), and control signal ROPMROM is asserted since the microcode mapped x86 instruction is at the head of queue.

In operation 522, the IDECCNTL 460 forms a microcode ROM entrypoint and accesses an ROP sequence contained in MROM0 416, MROM1 426, MROM2 436, and MROM3 446.

In operation 524, the consolidated prefix data element, the opcode element, the mod r/m element, and the sib element from the microcode mapped x86 instruction at the head of the BYTEQ 106 are furnished as the signals ROPxPRE, ROPXOP, ROPxMODRM, and ROPxSIB elements to all of the dispatch positions for use by ICOMMONx. The consolidated prefix data element is at byte queue location Y-1, the opcode element is at byte queue location Y, the mod r/m element is at byte queue location Y+1, and the sib element is at location Y+2, where Y is the location in the BYTEQ 106 of the opcode element of the instruction at the head of queue. If an element is not present in the pre-decoded x86 instruction, as determined from the start and end bits of the instruction, the information received at the dispatch position corresponding to the absent element is treated as "don't care" information.

In operation 526, the next heads of queue are determined for one, two, three and four ROPs dispatched. This information is used for shifting the BYTEQ 106 in the event that the microcode mapped x86 instruction is fully dispatched.

Figure 6B:
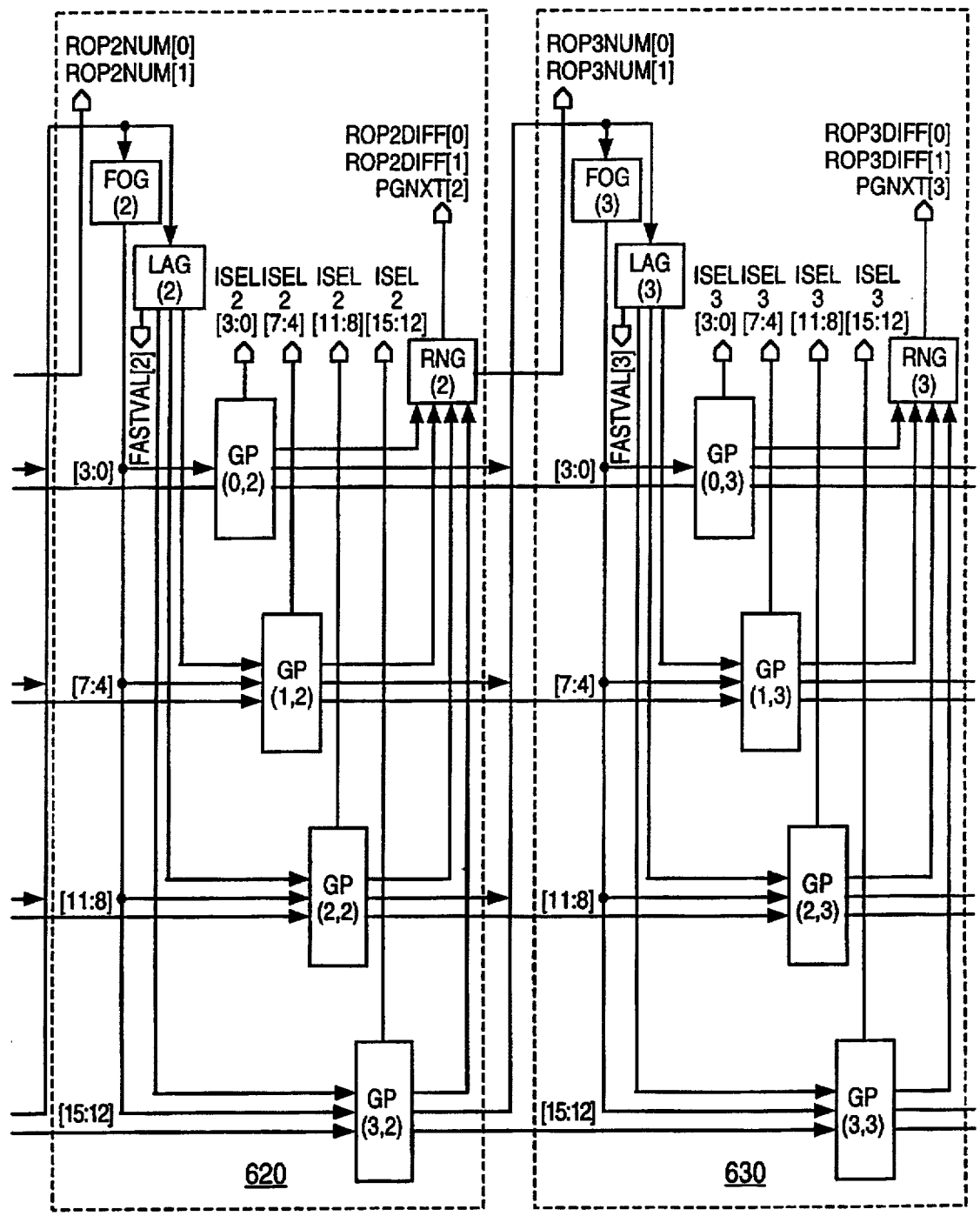

A fast byte queue scan logic architecture 690 suitable for use in the ROPMUX 400 for processing the opcode and rop number arrays BYTEQP2, BYTEQP1 and BYTEQP0 is shown in FIGS. 6A and 6B. The scan logic architecture 690 includes four stages 600, 610, 620 and 630, respectively corresponding to dispatch positions 0, 1, 2 and 3, although a lesser or greater number of stages may be used as desired. One of the inputs to the scan logic architecture 690 is the output of the array BYTEQP2[15:0], which is a 16-bit bus that indicates the locations of the opcode bytes in the BYTEQ 106. Outputs from the stages 600, 610, 620 and 630 of the scan logic architecture 690 include, respectively, ISEL0, ISEL1, ISEL2 and ISEL3. Output bits ISEL0[15:0] constitute a 16-bit output bus which indicates the location of the opcode byte for the first dispatch position. Bits ISEL1 [15:0] constitute a 16-bit output bus which indicates the location of the opcode byte for the second dispatch position. Bits ISEL2[15:0] constitute a 16-bit output bus which indicates the location of the opcode byte for the third dispatch position. Bits ISEL3[15:0] constitute a 16-bit output bus which indicates the location of the opcode byte for the fourth opcode position. These outputs are applied to steering logic such as a 16:1 multiplexer (not shown) in the ROPMUX 400 to direct the instruction opcodes from the BYTEQ 106 into the respective processing paths FASTCONV0 412 and ICOMMON0 414, FASTCONV1 422 and ICOMMON1 424, FASTCONV2 432 and ICOMMON2 434, and FASTCONV3 442 and ICOMMON3 444.

The following examples illustrate the relationship between the bits of the input:bus BYTEQP2[15:0] and the bits of the output buses ISEL0[15:0], ISEL1[15:0], ISEL2 [15:0] and ISEL3[15:0]. Assume, for example, that the signal BYTEQP2[15:0] is binary 1010-0100-0000-1001 indicating that the first opcode byte of the first instruction is at byte queue location 0, the first opcode byte of the second instruction is at byte queue location 3, the first opcode byte of the third instruction is at byte queue location 10, and the first opcode byte of the fourth instruction is at byte queue location 13. For the first example, assume that the instruction at the head of queue and the immediately following instruction both map to three ROPS. In this case, the outputs ISEL0[15:0], ISEL1[15:0], ISEL2[15:0] and ISEL3[15:0] of the scan logic 1700 are shown below in Table 1.

TABLE 1

| BYTEQP2[15:0] | 1 0 1 0 - 0 1 0 0 - 0 0 0 0 - 1 0 0 1 |
| --- | --- |
| ISEL0[15:0] | 0 0 0 0 - 0 0 0 0 - 0 0 0 0 - 0 0 0 1 |
| ISEL1[15:0] | 0 0 0 0 - 0 0 0 0 - 0 0 0 0 - 0 0 0 1 |
| ISEL2[15:0] | 0 0 0 0 - 0 0 0 0 - 0 0 0 0 - 0 0 0 1 |
| ISEL3[15:0] | 0 0 0 0 - 0 0 0 0 - 0 0 0 0 - 1 0 0 0 |

Note that ISEL0, ISEL1 and ISEL2 are identical since the same opcode is directed to the first three dispatch positions. For the second example, assume for purposes of comparison that the first four instructions in the BYTEQ 106 each map to one ROP. In this event, the outputs ISEL0[15:0], ISEL1 [15:0], ISEL2[15:0] and ISEL3[15:0] of the scan logic 1700 are shown below in Table 2.

TABLE 2

| BYTEQP2[15:0] | 1 0 1 0 - 0 1 0 0 - 0 0 0 0 - 1 0 0 1 |
| --- | --- |
| ISEL0[15:0] | 0 0 0 0 - 0 0 0 0 - 0 0 0 0 - 0 0 0 1 |
| ISEL1[15:0] | 0 0 0 0 - 0 0 0 0 - 0 0 0 0 - 1 0 0 0 |
| ISEL2[15:0] | 0 0 0 0 - 0 1 0 0 - 0 0 0 0 - 0 0 0 0 |
| ISEL3[15:0] | 0 0 1 0 - 0 0 0 0 - 0 0 0 0 - 0 0 0 0 |

Note that ISEL0, ISEL1, ISEL2 and ISEL3 are different since different opcodes are directed to the four dispatch positions.

Advantageously, the scan logic architecture 690 uses look-ahead logic to achieve a high speed scan. Each of the four stages 600, 610, 620 and 630 include four groups of bit processing logic to facilitate look-ahead, although a lesser or greater number of groups may be used as desired. For example, stage 600 for dispatch position 0 includes first group GP(0,0) and look-ahead signal generation logic LAG (0) connected to groups GP(1,0), GP(2,0) and GP(3,0), as well as partial dispatch signal generation logic PDG(0) and first opcode identification signal generation logic FOG(0); stage 610 for dispatch position 1 includes first group GP(0,1) and look-ahead signal generation logic LAG(1) connected to groups GP(1,1), GP(2,1) and GP(3,1), as well as first opcode identification signal generation logic FOG(1); stage 620 for dispatch position 2 includes first group GP(0,2) and look-ahead signal generation logic LAG(2) connected to groups GP(1,2), GP(2,2) and GP(3,2), as well as first opcode identification signal generation logic FOG(2); and stage 630 for dispatch position 3 includes first group GP(0,3) and look-ahead signal generation logic LAG(3) connected to groups GP(1,3), GP(2,3) and GP(3,3), as well as first opcode identification signal generation logic FOG(3).

The outputs of each of the groups are furnished to three different destinations. Consider, for example, the outputs of group GP(0,0). A first set of outputs 602 pertains to the ROP number of the ROP to be allocated the next dispatch position, and is furnished to an ROP number signal generating logic RNG(0); see, e.g., XDISP0[x] and XDSP0[x+16] in FIG. 7B. RNG(0) receives inputs from all the groups GP(0,0), GP(0,1), GP(0,2) and GP(0,3) in the first stage 600, and generates the ROP number signals ROP0DIFF[1:0], ROP1NUM[1:0] and PGNXT[0]. A second set of outputs 604 pertains to identification of opcode locations for instructions not yet fully allocated dispatch positions, and is furnished to FOG(1) and LAG(1) in the second stage 610; see, e.g., XN1[x] in FIG. 7B.

FOG(1) and LAG(1) receive inputs from all the groups GP(0,0), GP(0,1), GP(0,2) and GP(0,3) in the first stage 600, and generate first opcode identification signals and look-ahead signals respectively for the groups of the second stage 610. A third set of outputs 606 pertains to the number of the ROP most recently allocated a dispatch position and the number of ROPs to which the associated x86 instruction maps, and is furnished to group GP(0,1) in the second stage 610; see, e.g., D1N1[x], D0N1[x], NBQP1[x], NBQP0[x] (note signal XN1[x] is also part of this third set).

Among the stages 600, 610, 620 and 630, signals pertaining to the number of the ROP most recently allocated dispatch position and the number of ROPs to which the associated x86 instruction maps propagate and are processed as shown below in Table 3, for an example in which: the instruction at the head of queue and the immediately following instruction both map to three ROPs, all following ROPs map to one ROP, and the ROP sequence to which the instruction initially at the head of queue maps has not been partially dispatched.

TABLE 3

| Stage and Array Status | | | | | ROP Num | Action |
| --- | --- | --- | --- | --- | --- | --- |
| FIRST DISPATCH WINDOW | | | | | | |
| STAGE 1 | | | | | | Increment ROP |
| OPC LOCS | 1010 | 0100 | 0000 | 1001 | | Number for second |
| NUM ROPS | --- | --- | --- | —1 | 0 | stage. |
|  | --- | --- | --- | —0 | 0 | |
| STAGE 2 | | | | | | Increment ROP |
| OPC LOCS | 1010 | 0100 | 0000 | 1001 | | Number for third |
| NUM ROPS | --- | --- | --- | —1 | 0 | stage. |
|  | --- | --- | --- | —0 | 1 | |
| STAGE 3 | | | | | | Reset ROP Number |
| OPC LOCS | 1010 | 0100 | 0000 | 1001 | | for fourth stage; |
| NUM ROPS | --- | --- | --- | —1 | 1 | mask bit |
|  | --- | --- | --- | —0 | 0 | identifying first opcode location. |
| STAGE 4 | | | | | | Set PARTIALDISP |
| OPC LOCS | 1010 | 0100 | 0000 | 1000 | | at 01. |

TABLE 3-continued

| Stage and Array Status | | | | | ROP Num | Action |
|---|---|---|---|---|---|---|
| NUM ROPS | ---- | ---- | ---- | 1--- | 0 | |
| | ---- | ---- | ---- | 0--- | 0 | |
| SECOND DISPATCH WINDOW | | | | | | |
| STAGE 1 | | | | | | Increment ROP |
| OPC LOCS | xxx1 | 0100 | 1000 | 0001 | | Number for second |
| NUM ROPS | ---- | ---- | ---- | ---1 | 0 | stage. |
| | ---- | ---- | ---- | ---0 | 1 | |
| STAGE 2 | | | | | | Reset ROP Number |
| OPC LOCS | xxx1 | 0100 | 1000 | 0001 | | for third stage; |
| NUM ROPS | ---- | ---- | ---- | ---1 | 1 | mask bit |
| | ---- | ---- | ---- | ---0 | 0 | identifying first opcode location. |
| STAGE 3 | | | | | | Reset ROP Number |
| OPC LOCS | xxx1 | 0100 | 1000 | 0000 | | for third stage; |
| NUM ROPS | ---- | ---- | 0--- | ---- | 0 | mask bit |
| | ---- | ---- | 0--- | ---- | 0 | identifying second opcode location. |
| STAGE 4 | | | | | | Reset ROP Number; |
| OPC LOCS | xxx1 | 0100 | 0000 | 0000 | | mask bit |
| NUM ROPS | ---- | -0- | ---- | ---- | 0 | identifying third |
| | ---- | -0- | ---- | ---- | 0 | opcode location. |

In the first dispatch window, PARTIALDISP[1:0] is 00. In the first stage, since the first byte queue location 0 contains an opcode, the "number of ROPs" data is taken from position 0 of the number of ROPs array, and is compared with the ROP number derived from PARTIALDISP[1:0]. No match occurs, and the ROP number is incremented by one and furnished to the second stage along with an unchanged "opcode location" array. In the second stage, the "number of ROPs" data is taken from position 0 of the number of ROPs array, and is compared with the ROP number furnished by the first stage. No match occurs, and the ROP number is incremented by one and furnished to the third stage along with an unchanged "opcode location" array. In the third stage, the "number of ROPs" data is taken from position 0 of the number of ROPs array, and is compared with the ROP number furnished by the second stage. A match occurs, and the ROP number is reset to 00 and furnished to the fourth stage. The "opcode location" array is modified by masking out the bit identifying the opcode for which dispatch positions have been fully allocated, and furnished to the fourth stage. In the fourth stage, the "number of ROPs" data is taken from position 3 of the number of ROPs array, and is compared with the ROP number furnished by the third stage. No match occurs, and PARTIALDISP[1:0] is set at 01 to indicate that one of the three ROPs mapped from the instruction to be the next head of queue has been dispatched.

To prepare for the next dispatch window, the second instruction is shifted to the head of queue. PARTIALDISP [1:0] is now 01. In the first stage, since the first byte queue location 0 again happens to contain an opcode, the "number of ROPs" data is taken from position 0 of the number of ROPs array, and is compared with the ROP number derived from PARTIALDISP[1:0]. No match occurs, and the ROP number is incremented by one and furnished to the second stage along with an unchanged "opcode location" array. In the second stage, the "number of ROPs" data is taken from position 0 of the number of ROPs array, and is compared with the ROP number furnished by the first stage. A match occurs, and the ROP number is reset to 00 and furnished to the third stage. The "opcode location" array is modified by masking out the bit identifying the opcode for which dispatch positions have been fully allocated, and is furnished to the third stage. In the third stage, the "number of ROPs" data is taken from position 7 of the number of ROPs array, and is compared with the ROP number furnished by the second stage. A match occurs, and the ROP number is reset to 00 and furnished to the fourth stage. The "opcode location" array is modified by masking out the bit identifying the opcode for which dispatch positions have been fully allocated, and is furnished to the fourth stage. In the fourth stage, the "number of ROPs" data is taken from position 10 of the number of ROPs array, and is compared with the ROP number furnished by the third stage. A match occurs, and PARTIALDISP[1:0] is set at 00 to indicate that none of the ROPs mapped from the instruction to be the next head of queue has been dispatched.

Figure 7B:
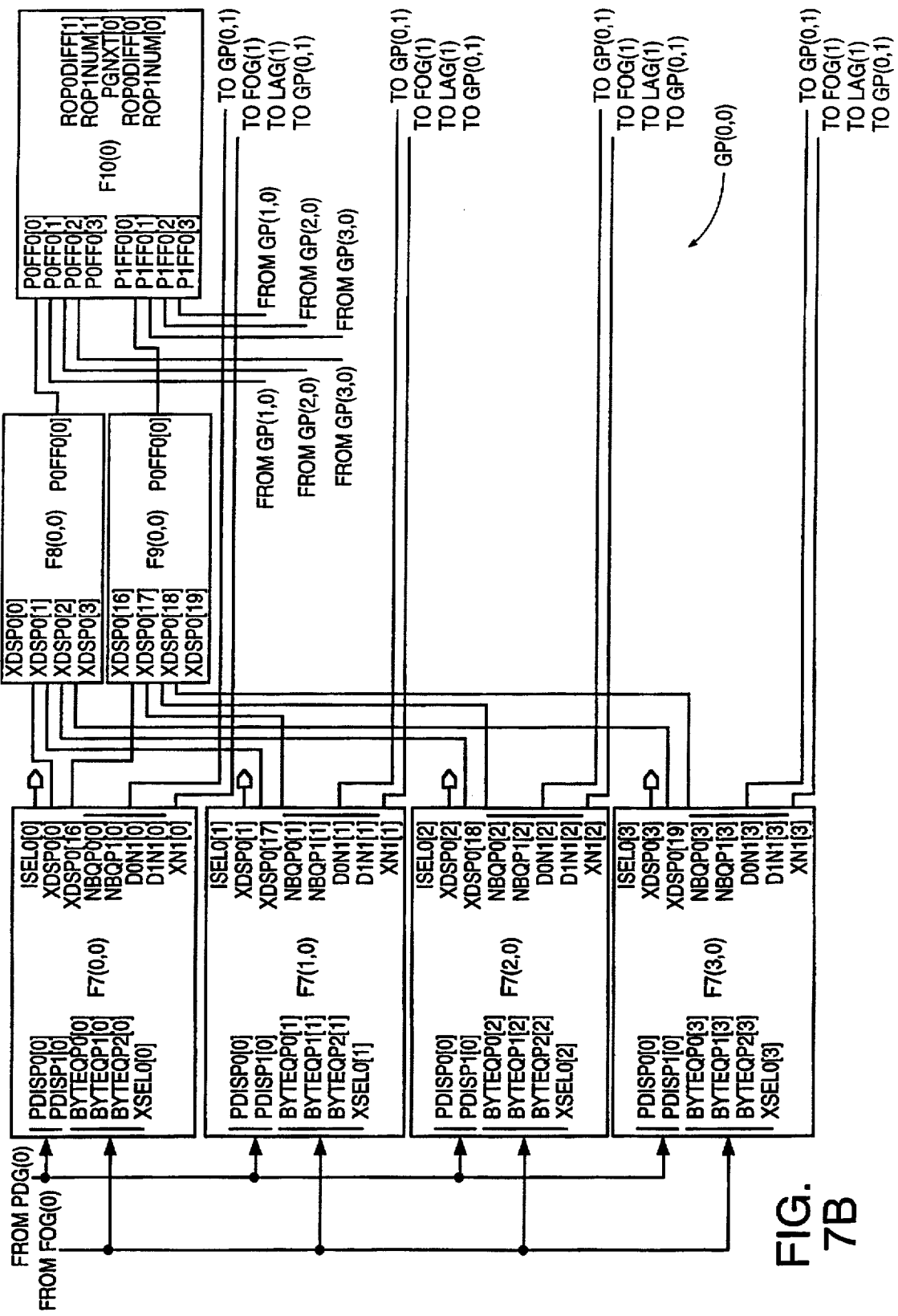
Figure 7C:
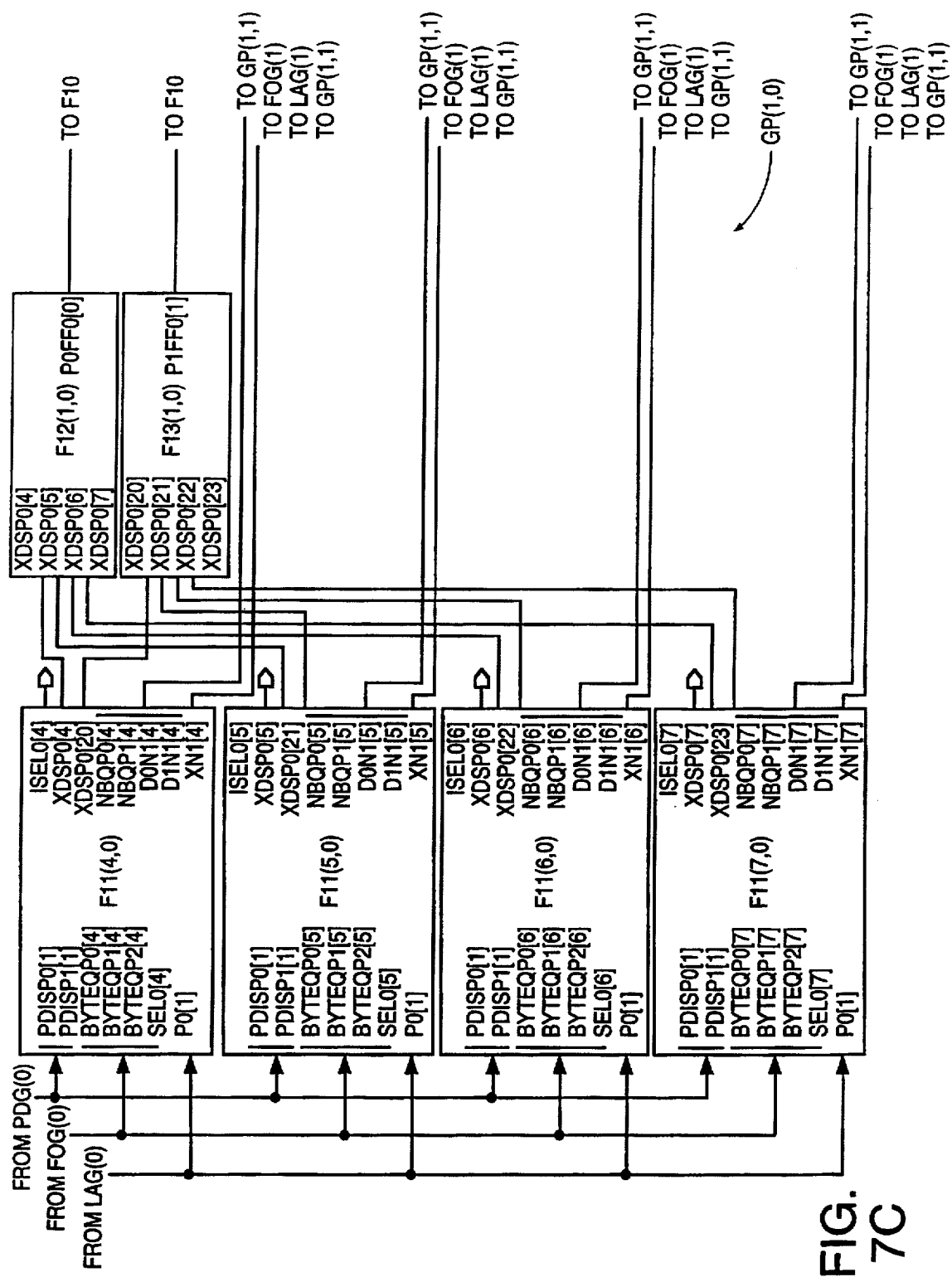
Figure 7D:
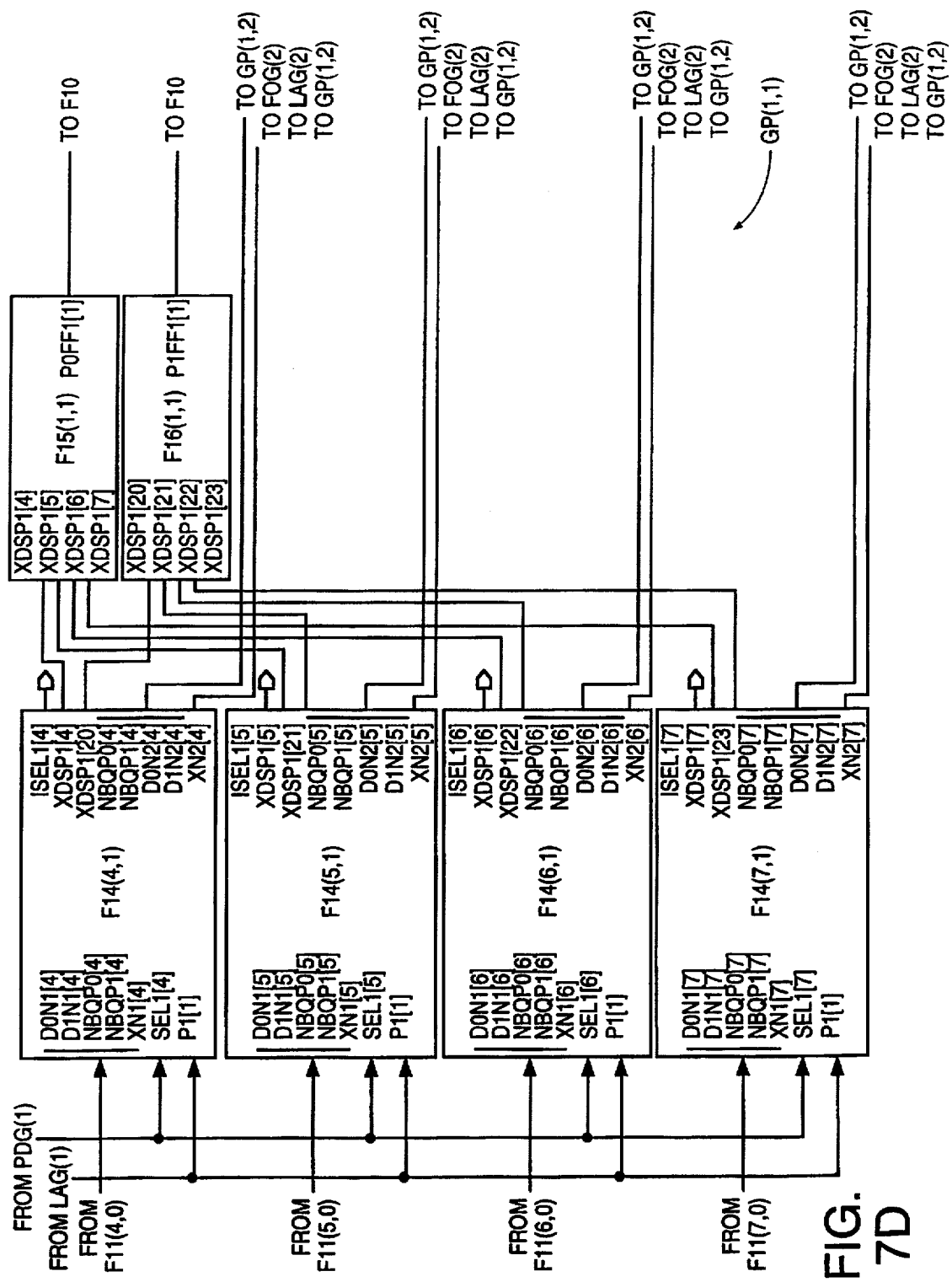

FIGS. 7A–7D show in greater detail some elements of the scan logic architecture 690 that are representative of, although not identical to, corresponding elements in other dispatch positions; note that some of the elements shown in FIG. 7 are omitted from FIG. 6 for clarity. For example, FIG. 7A shows FOG(0) which corresponds to FOG(1), FOG(2) and FOG(3), and LAG(0) which corresponds to LAG(1), LAG(2) and LAG(3); FIG. 7A also shows PDG(0). FIG. 7B is a detail of GP(0,0) showing four bit processing logic circuits F7(0,0), F7(1,0), F7(2,0) and F7(3,0), which correspond to similar bit processing logic circuits in groups GP(0,1), GP(0,2) and GP(0,3). FIG. 7B also shows ROP number signal generating circuits F8(0,0), F9(0,0) and F10 (0,0). FIG. 7C is a detail of GP(1,0) showing four bit processing logic circuits F11(4,0), F11(5,0), F11(6,0) and F11(7,0), which correspond to similar bit processing logic circuits in groups GP(1,1), GP(1,2), GP(1,3), GP(2,0), GP(2,1), GP(2,2), GP(2,3), GP(3,0), GP(3,1), GP(3,2) and GP(3,3). FIG. 7C also shows ROP information generating circuits F12(1,0) and F13(1,0). FIG. 7D shows the four bit processing logic circuits F14(4,1), F14(5,1), F14(6,1) and F14(7,1) in group GP(1,1). FIG. 7D also shows ROP information generating circuits F15(1,1) and F16(1,1). In the architecture of FIG. 7, the scanning function is accelerated for each dispatch position by grouping many of the subcircuits in groups of four bits, with look-ahead subcircuits providing inputs to higher order groups for that dispatch position.

Figure 10:
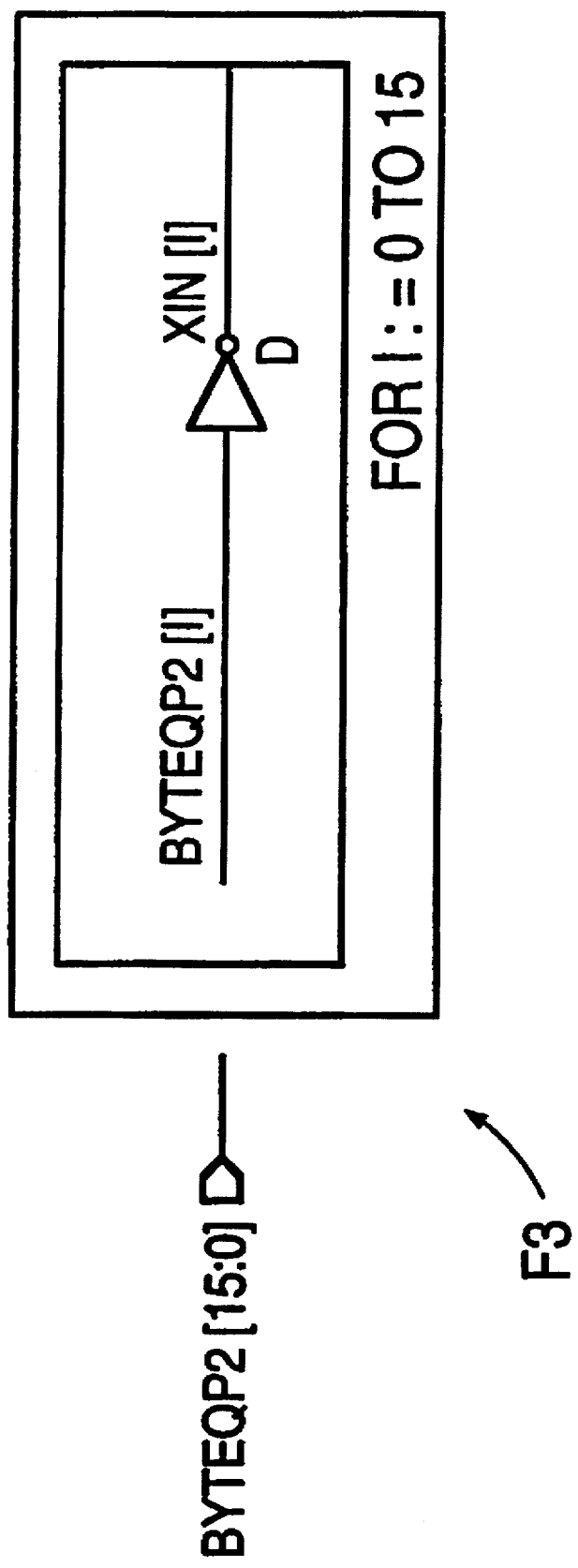
Figure 11:
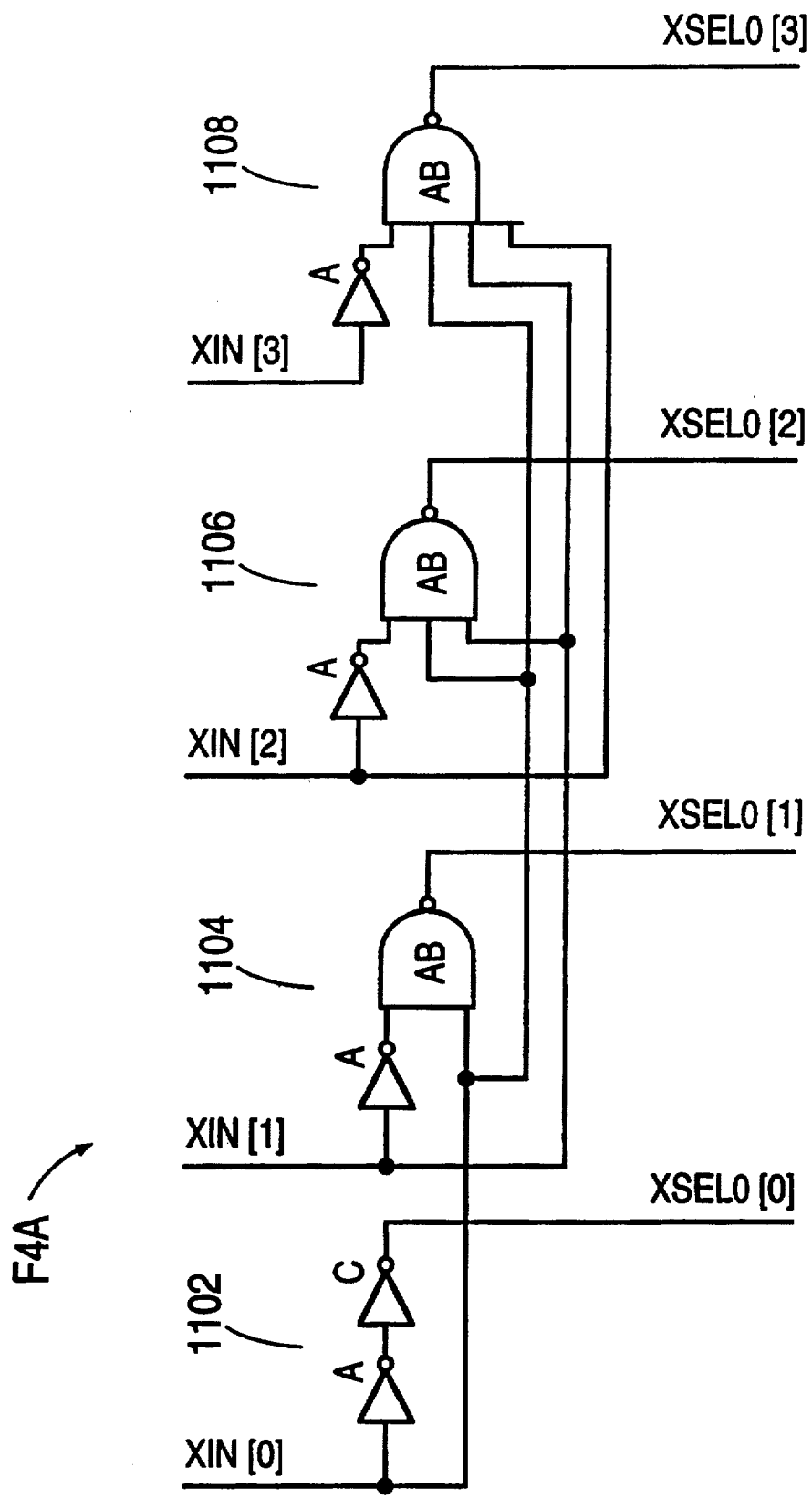
Figure 12:
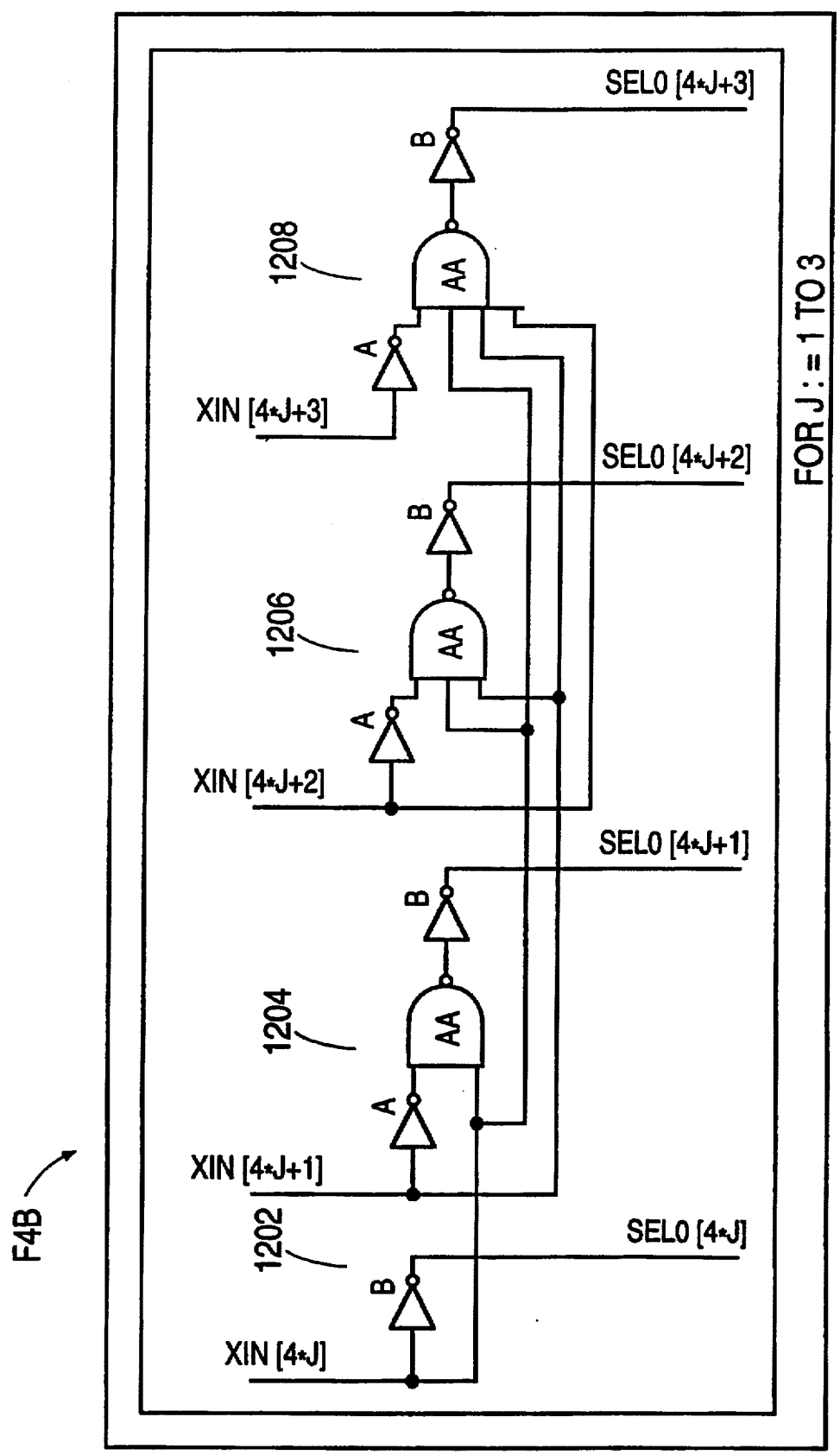
Figure 13:
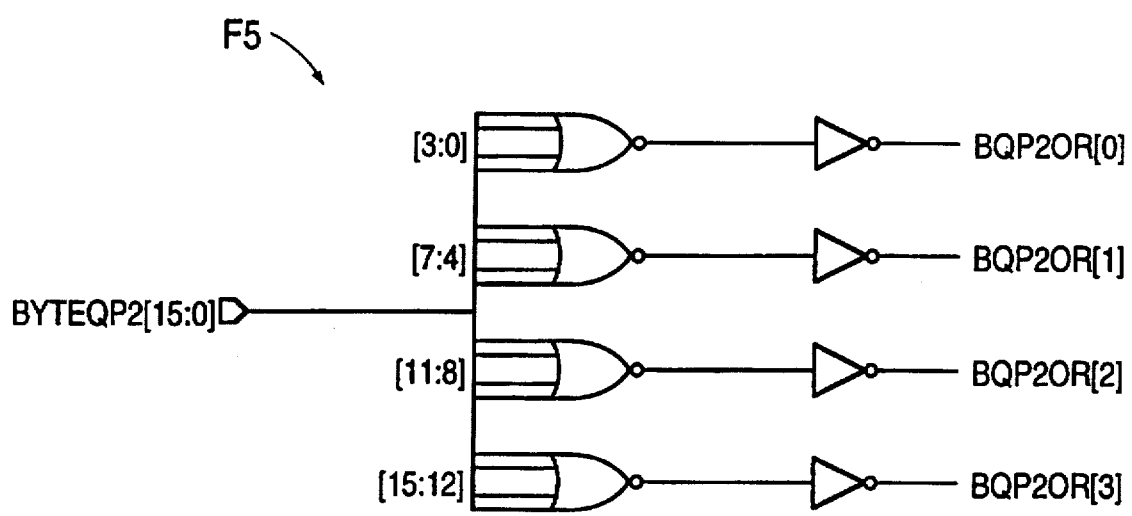
Figure 14:
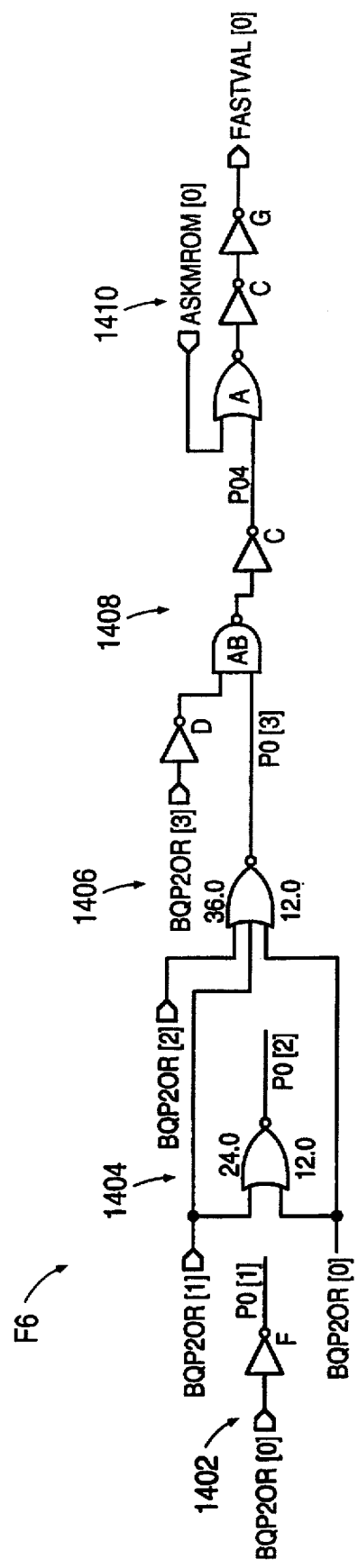
Figure 52:
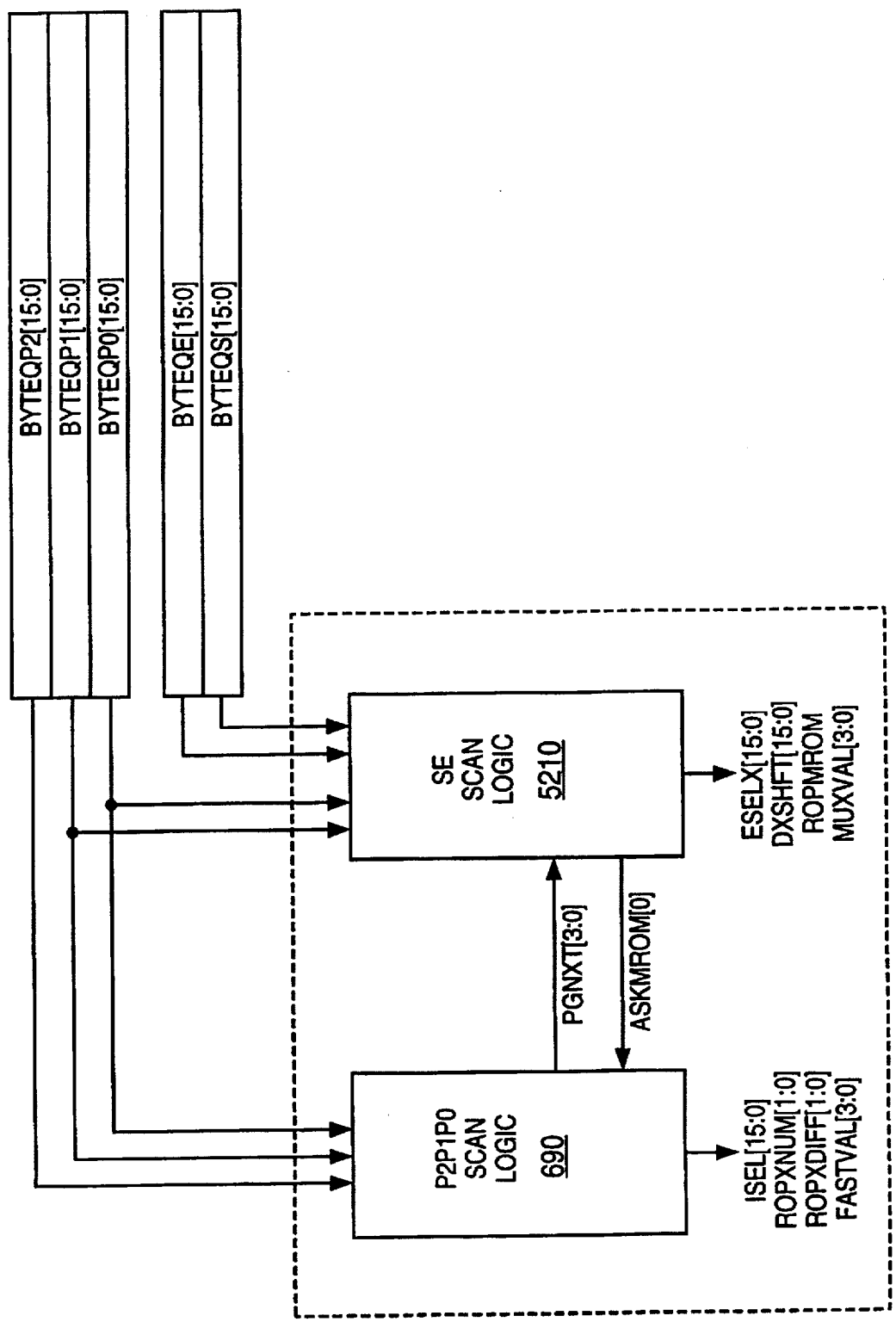
FIG. 52 is a block diagram showing the relationship between the byte queue ROP select scan logic and a byte queue SE scan logic of the ROP multiplexer of FIG. 4.

The operation of the scan logic architecture 690 for dispatch position 0 is as follows for the embodiment shown in FIGS. 7A, 7B, 7C and 7D. Refer to FIG. 7A. PDG(0) includes elements F1 and F2, which generate the binary quantity PDISP1,PDISP0 indicating the number of the next ROP to be dispatched for the pre-decoded x86 instruction at the head of queue. In embodiments of the elements F1 and F2 shown in FIGS. 8 and 9, the quantity PDISP1, PDISP0 is obtained directly from PARTIALDISP[1:0] through inverters. The quantity PDISP1, PDISP0 is furnished to each of the four groups GP(0,0), GP(1,0), GP(2,0) and GP(3,0) in the first stage. For each group of four bits from the BYTEQP2 array, FOG(0) identifies the first asserted bit of the group. FOG(0) includes elements F3 and F4, embodiments of which are shown in FIG. 10 and FIGS. 11 and 12 respectively. The respective indications are furnished to each of the four groups GP(0,0), GP(1,0), GP(2,0) and GP(3,0) in stage 0. For each group of four bits other than the first group from the BYTEQP2 array, LAG(0) provides an indication of whether the first asserted bit appears in any of the groups preceding the group. LAG(0) includes elements F5 and F6, embodiments of which are shown in FIGS. 13 and 14 respectively. Element F6 receives a signal ASKMROM[0] from another circuit in the ROPMUX 400, such as the byte queue SE scan logic 5200 (FIG. 52). ASKMROM[0] indicates that a memory ROM instruction is at the head of queue.

The respective indications of whether the first asserted bit appears in any of the groups preceding a group are furnished to each of the three groups GP(1,0), GP(2,0) and GP(3,0) in stage 0.

FIG. 7B shows the bit processing logic circuits F7(0,0), F7(1,0), F7(2,0) and F7(3,0) for group GP(0,0). In addition to the output ISEL0[x], the element F7 has an output XN1[x]; the signal BYTEQP2[x] is either passed through the element F7 in an inverted state, or is masked. The element F7 also provides a default value such as 00 for the quantity D1N1, D0N1 unless its XSEL0[x] input is asserted to indicate that BYTEQP2[x] is the first asserted bit in the bit group. In this event, one of two conditions can occur: (a) the ROP being allocated a dispatch position is not the last ROP in the sequence; or (b) the ROP being allocated a dispatch position is the last ROP in the sequence. In the event of "(a)," the element F7 asserts its ISEL0[x] output, increments the quantity PDISP1[x],PDISP0[x] by one and furnish the result to the next stage as the quantity D1N1, D0N1, and passes through the bit BYTEQP2[x] in an inverted state. In the event of "(b)," the element F7 asserts its ISEL0[x] output, resets the quantity PDISP1[x],PDISP0[x] to zero and furnishes the result to the next stage as the quantity D1N1, D0N1, and masks the bit BYTEQP2[x] at the output XN1[x].

Signals D1N1 and D0N1 are inverted and furnished as the signals XDSP0[x] and XDSP0[x+16] to elements F8 and F9 respectively. In combination, elements F8 and F9 generate signals P1FF0[0] and P0FF0[0], which in effect represent the value PARTIALDISP[1,0] incremented by one if a first asserted bit of the array BYTEQP2 occurs in the group GP(0,0) and the ROP in the dispatch position is not the last ROP in the ROP sequence. Otherwise, signals P1FF0[0] and P0FF0[0] have a default value.

Signals P1FF0 and P0FF0 from all groups in stage 0 are combined in element F10. These signals will all have a default value except in the event that a first asserted bit of the array BYTEQP2 occurs in stage 0. In this event, one pair of the signals P1FF0 and P0FF0 represents the value PARTIALDISP[1,0] as modified, and this value is used to derive the quantities ROPODIFF[1:0] and ROP1NUM[1:0], and the signal PGNXT[0].

FIG. 7C shows the bit processing logic circuits F11(4,0), F11(5,0), F11(6,0) and F11(7,0) for group GP(1,0). The element F11 is similar to the element F7 except for the effect of its input SEL0[x], which corresponds to the XSEL0[x] input of the element F7. SEL0[x] is asserted to indicate that BYTEQP2[x] is the first asserted bit in the bit group. However, an input P0[x] blocks SEL0[x] unless P0[x] is asserted to indicate that a first asserted bit of the array BYTEQP2 is not present in the preceding bit group of stage 0.

Signals D1N1 and D0N1 are inverted and furnished as the signals XDSP0[x] and XDSP0[x+16] to elements F12 and F13 respectively. In combination, elements F12 and F13 generate signals P1FF0[0] and P0FF0[0], which in effect represent the value PARTIALDISP[1,0] incremented by one if a first asserted bit of the array BYTEQP2 occurs in the group GP(1,0) and the ROP in the dispatch position is not the last ROP in the ROP sequence. Otherwise, signals P1FF0[0] and P0FF0[0] have a default value. Signals P1FF0 and P0FF0 from elements F12 and F13 are directed to element F10.

FIG. 7D shows the bit processing logic circuits F14(4,1), F14(5,1), F14(6,1) and F14(7,1) for group GP(1,1). The element F14 is essentially identical to the element F11, although the input and output signal names are different.

Signals D1N2 and D0N2 are inverted and furnished as the signals XDSP1[x] and XDSP1[x+16] to elements F15 and F16 respectively. Elements F15 and F16 are essentially identical to the elements F12 and F13, although the input and output signal names are different.

Figure 8:
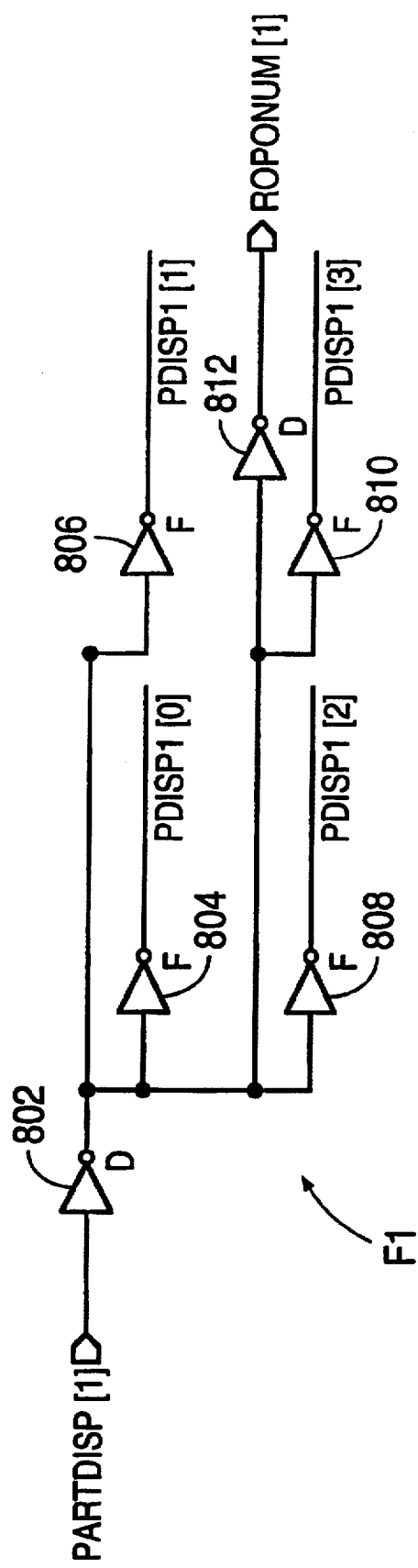
FIGS. 8 through 51 are gate-level schematic diagrams of an embodiment of the byte queue ROP select scan logic of FIGS. 6A and 6B.
Figure 15:
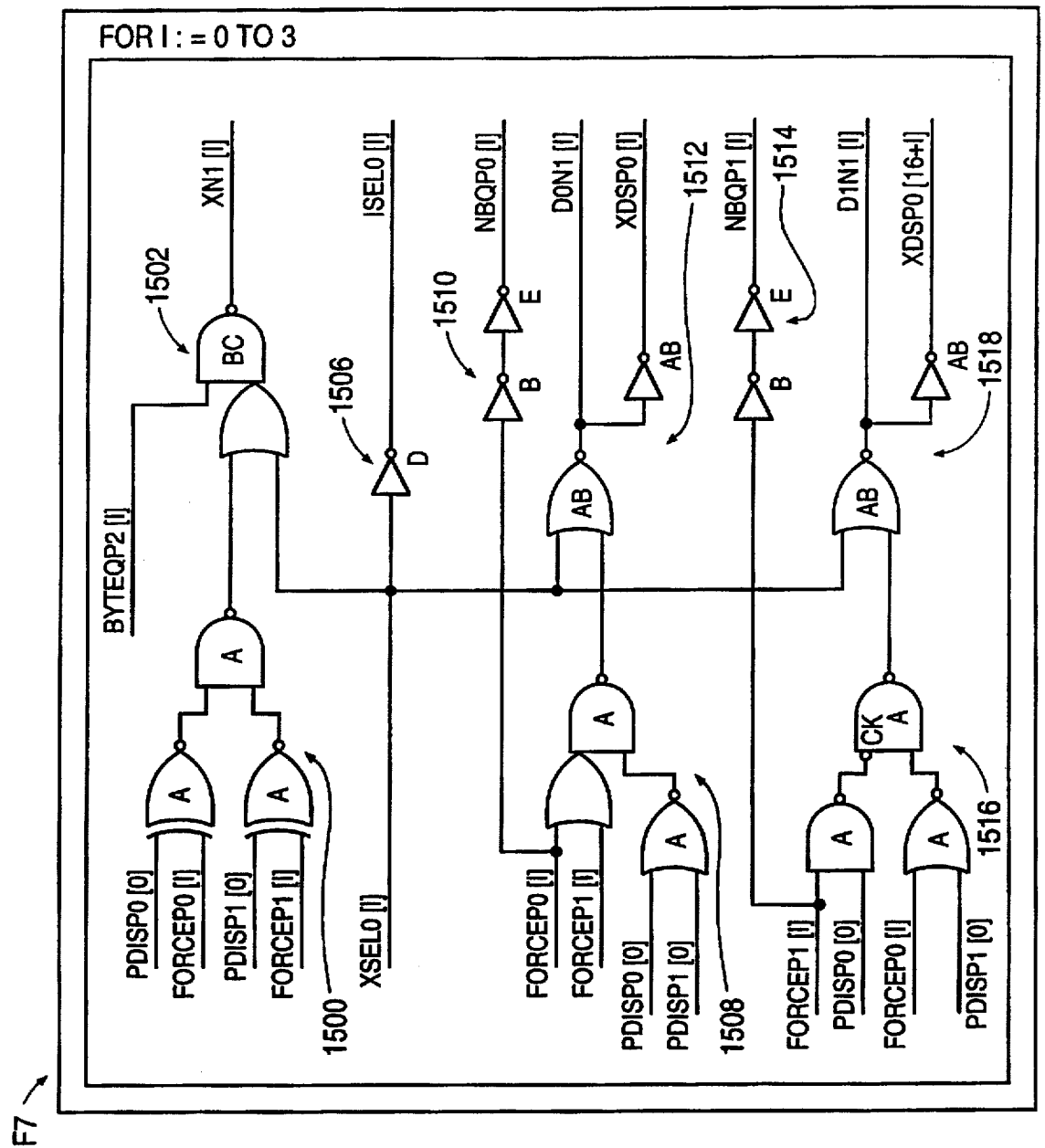
Figure 16:
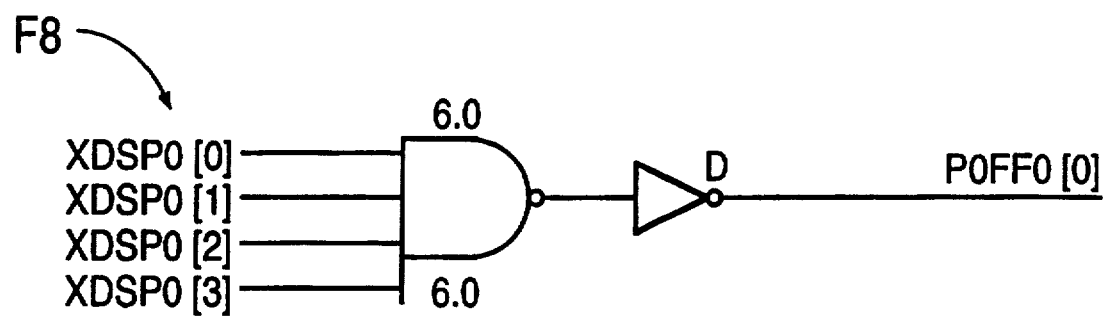
Figure 17:
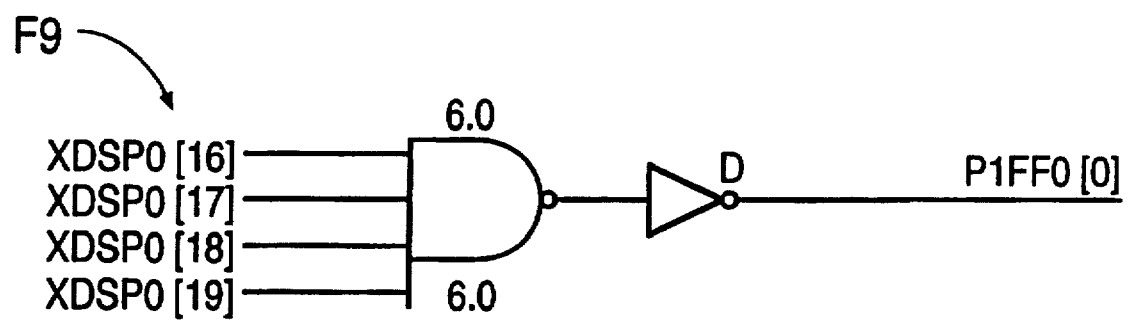
Figure 18:
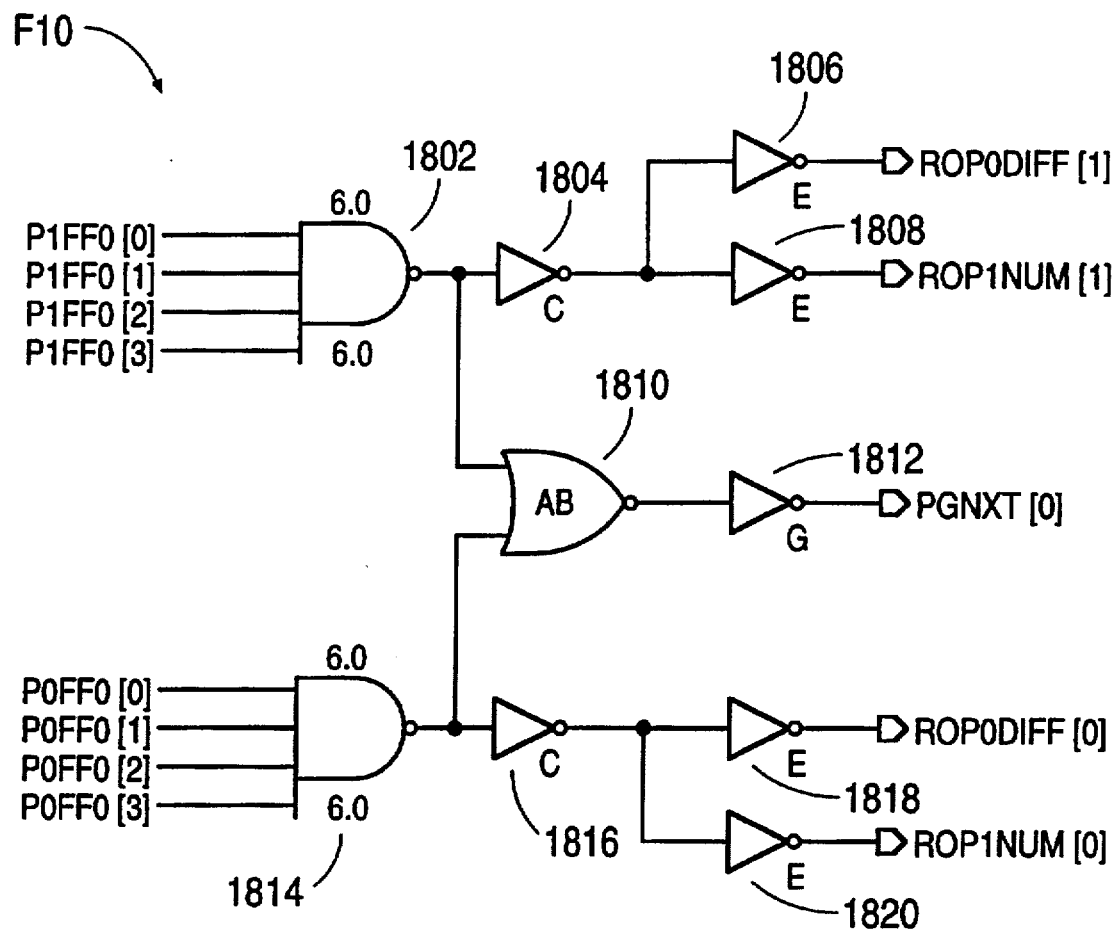
Figure 19:
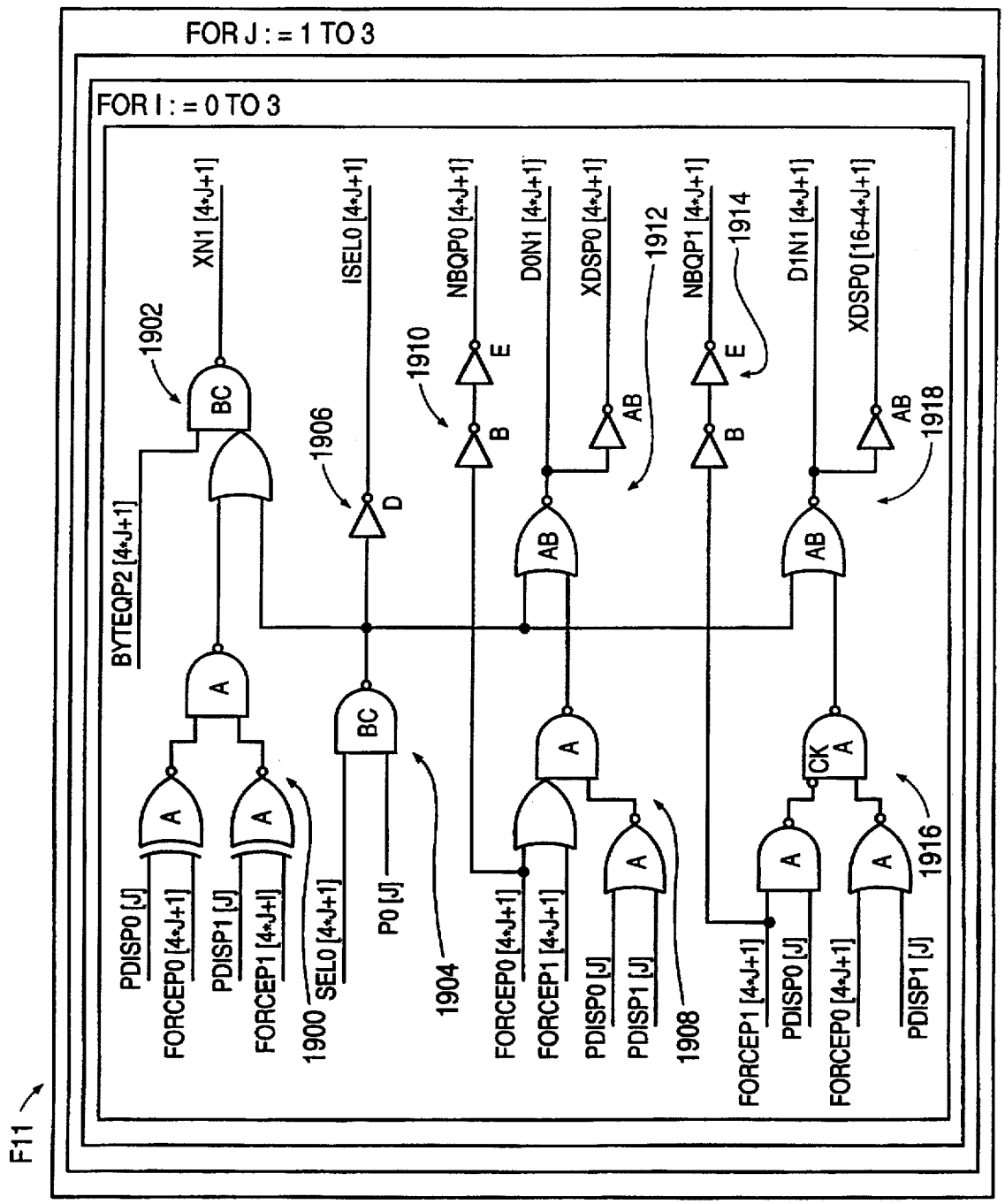
Figure 20:
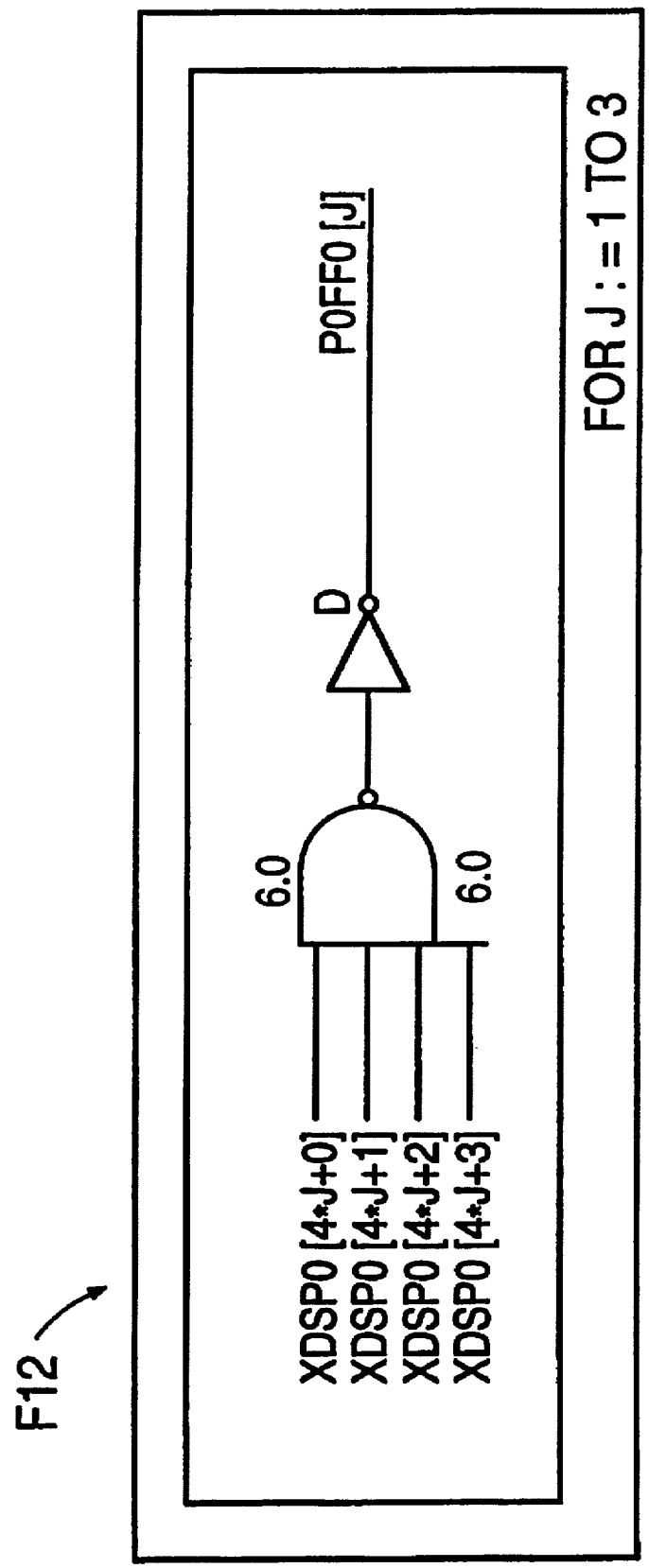
Figure 21:
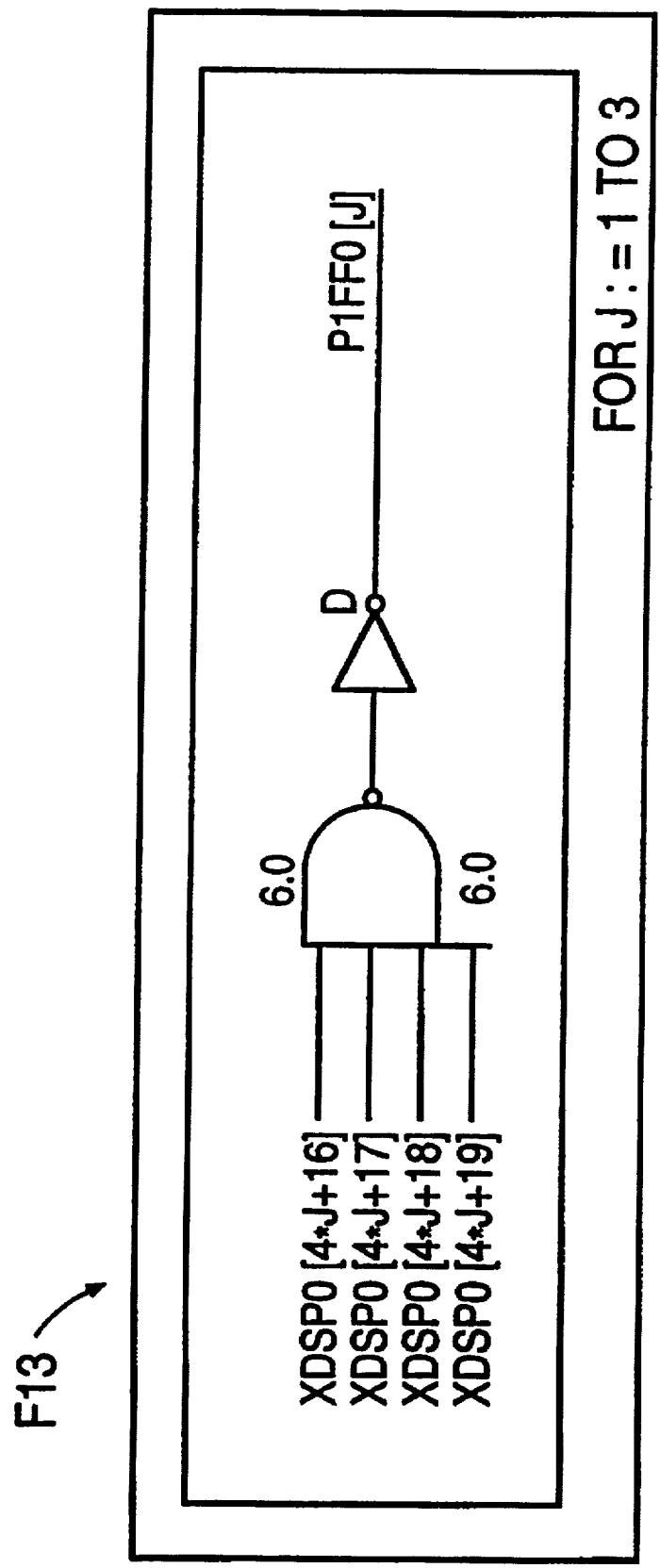
Figure 22:
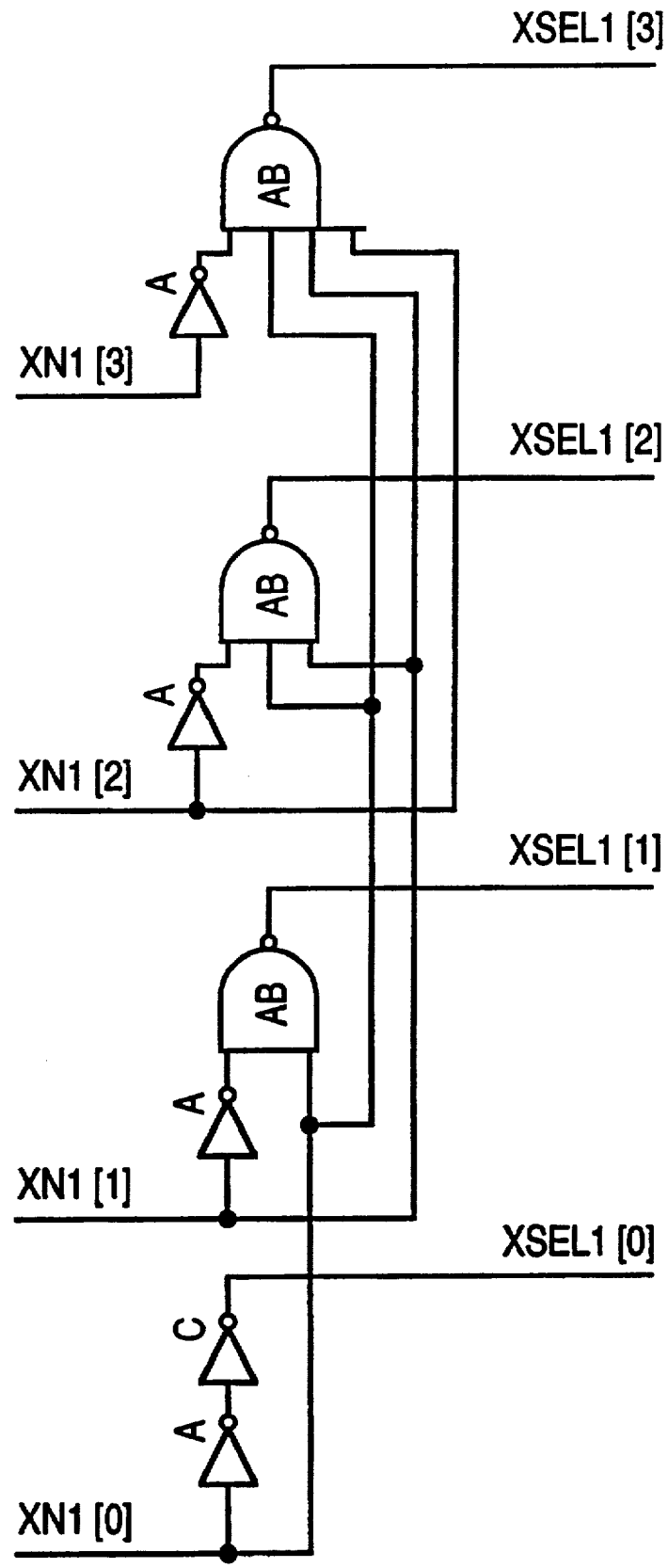
Figure 23:
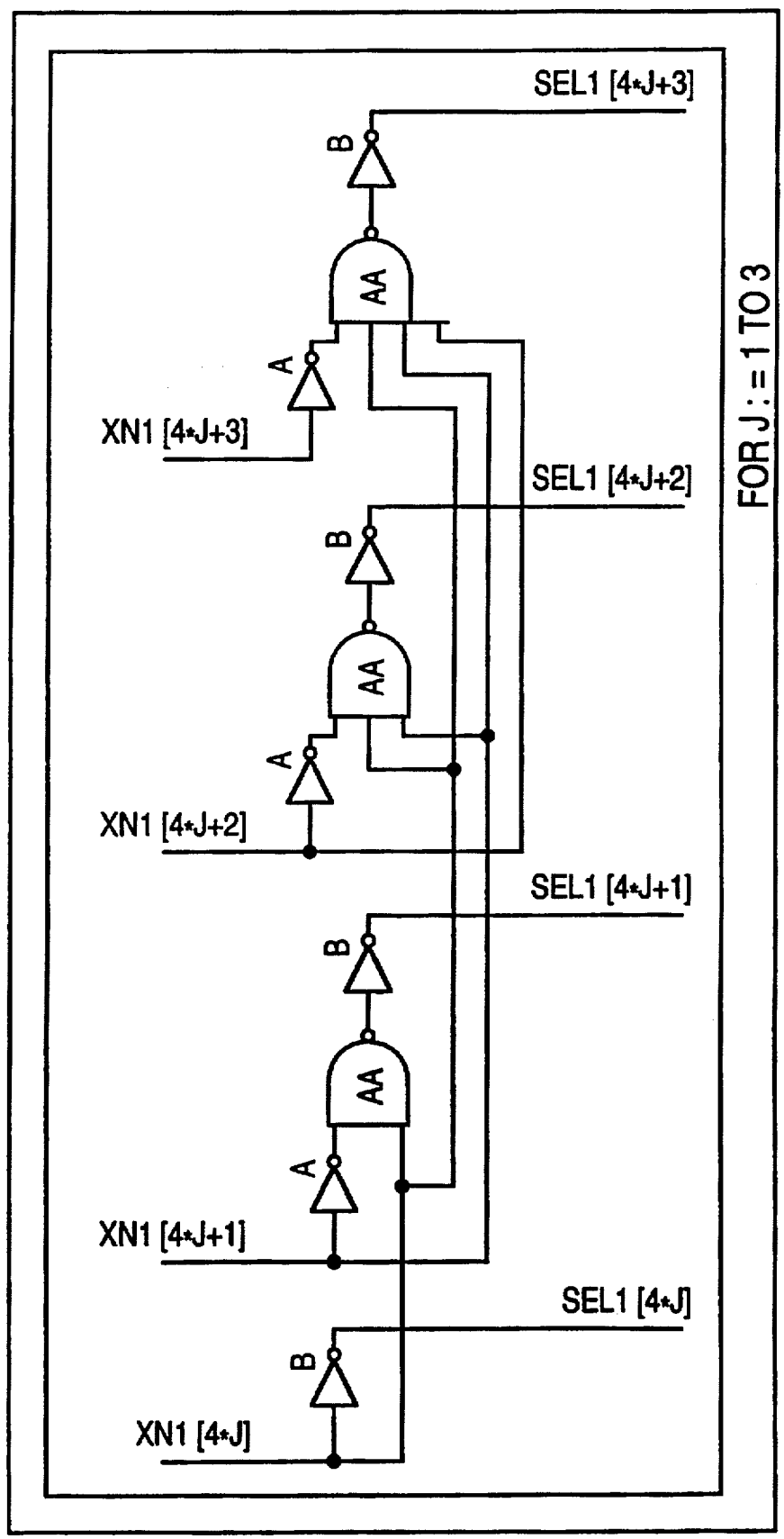
Figure 24:
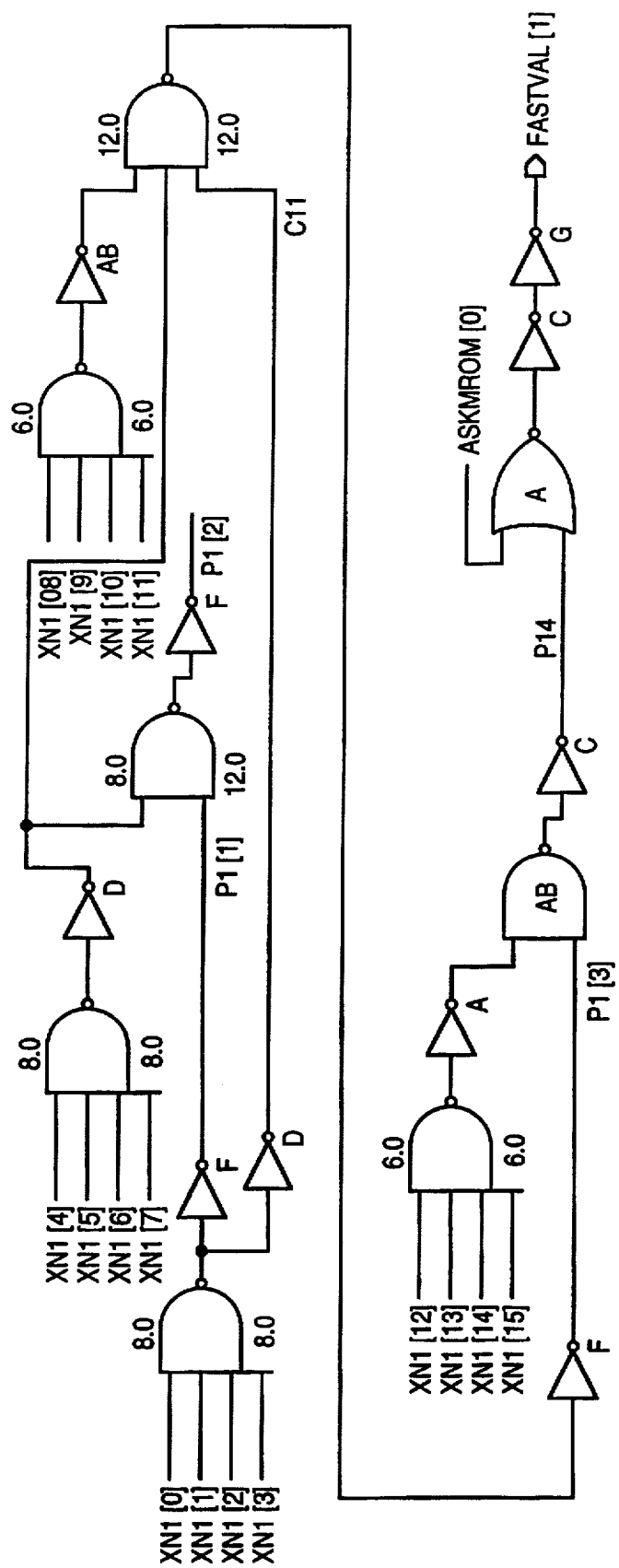
Figure 25:
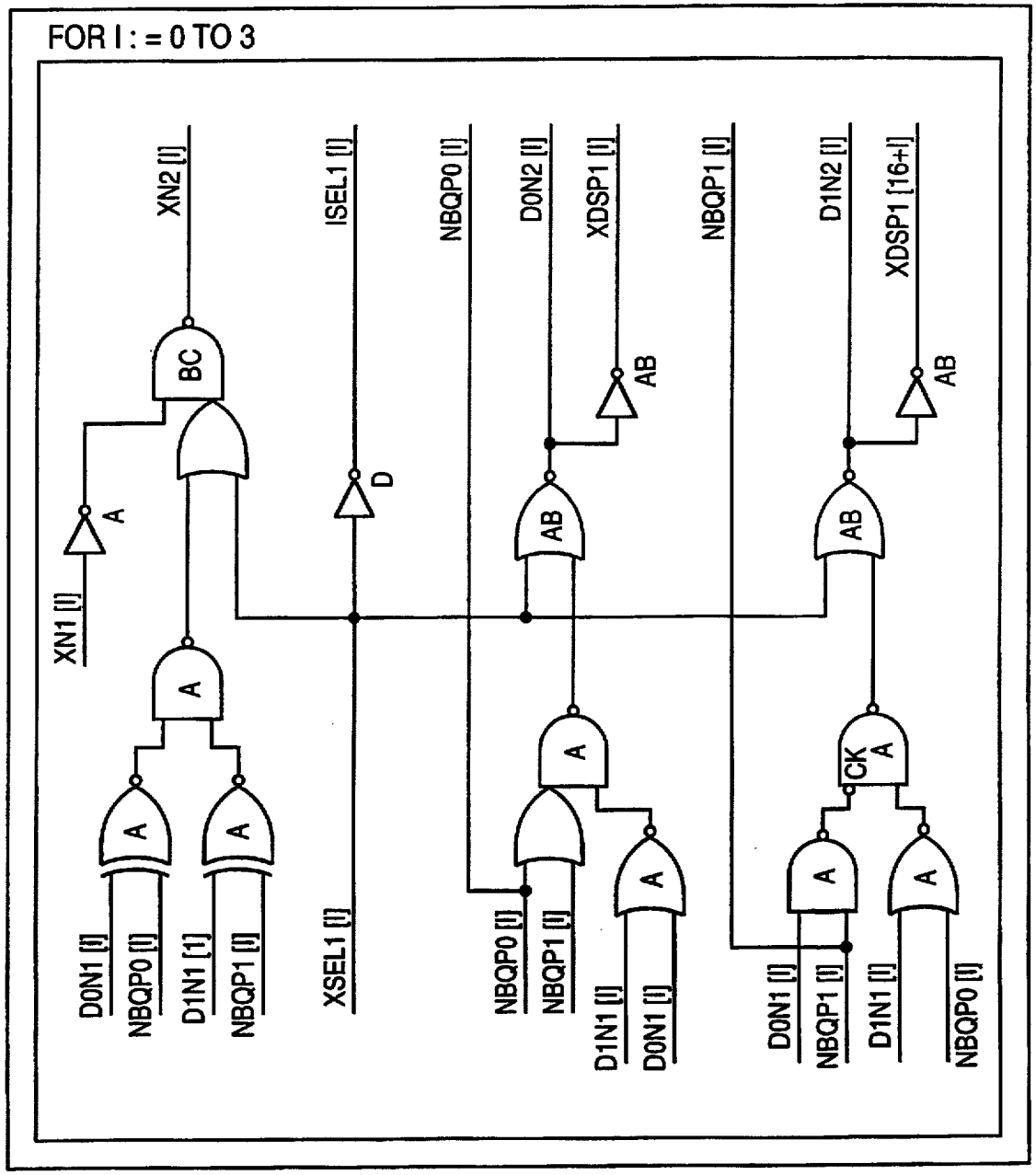
Figure 26:
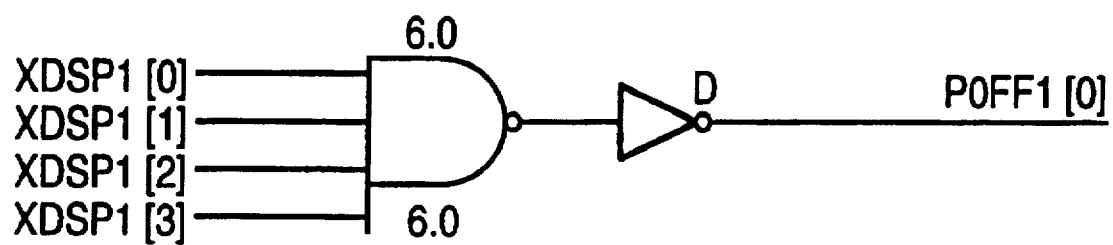
Figure 27:
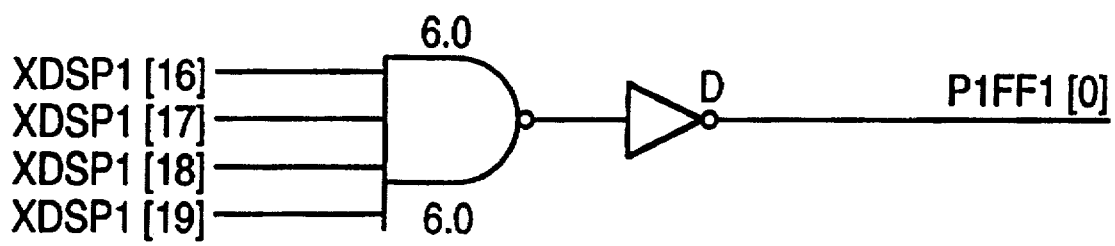
Figure 28:
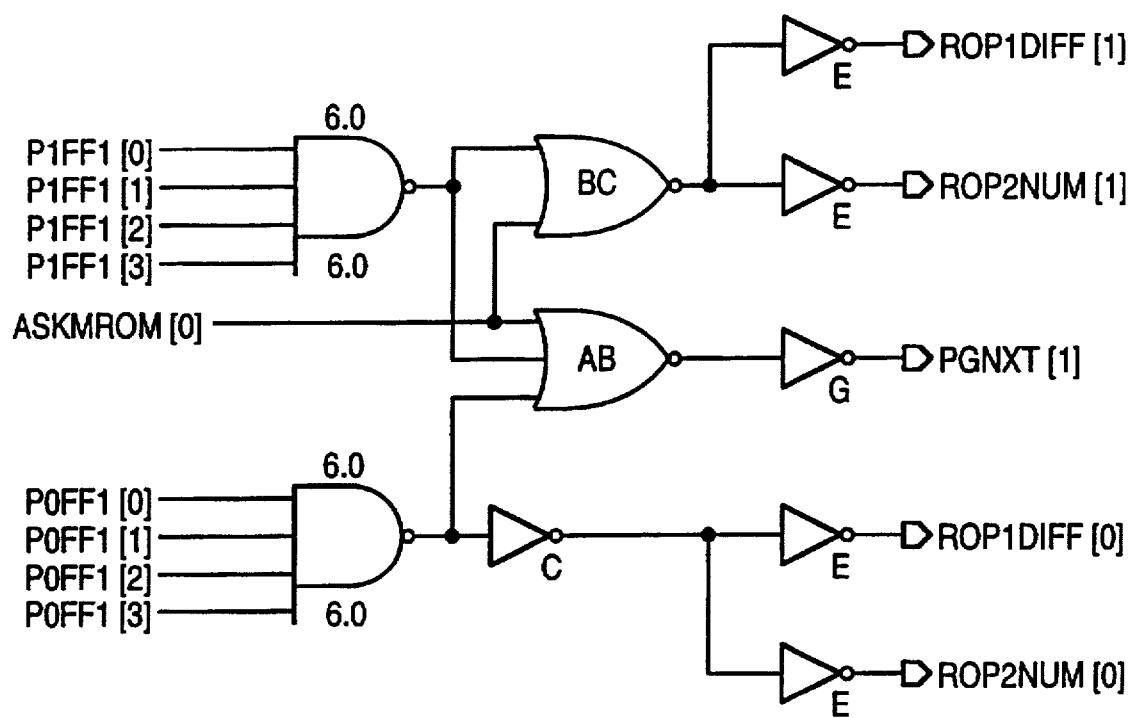
Figure 29:
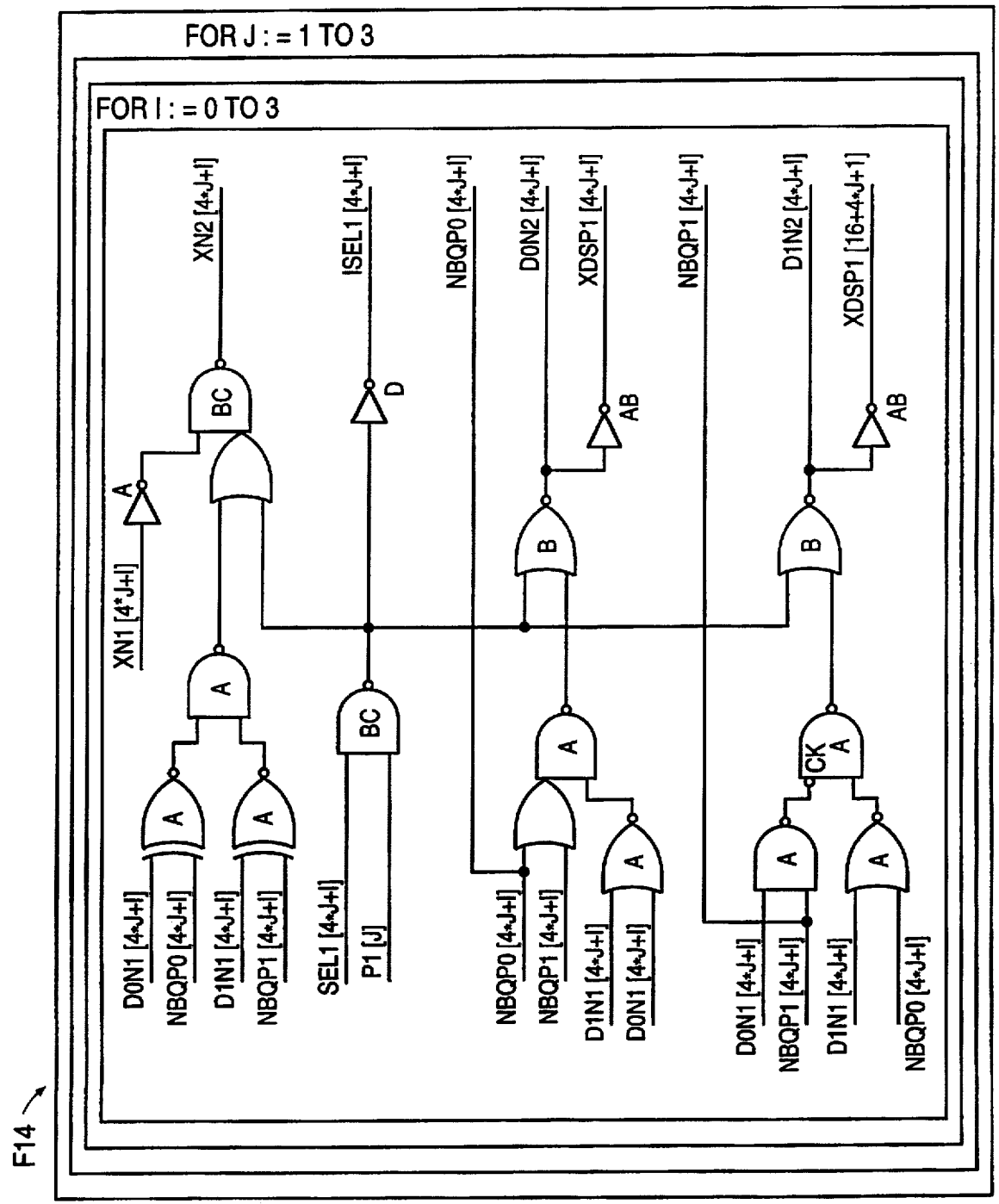
Figure 30:
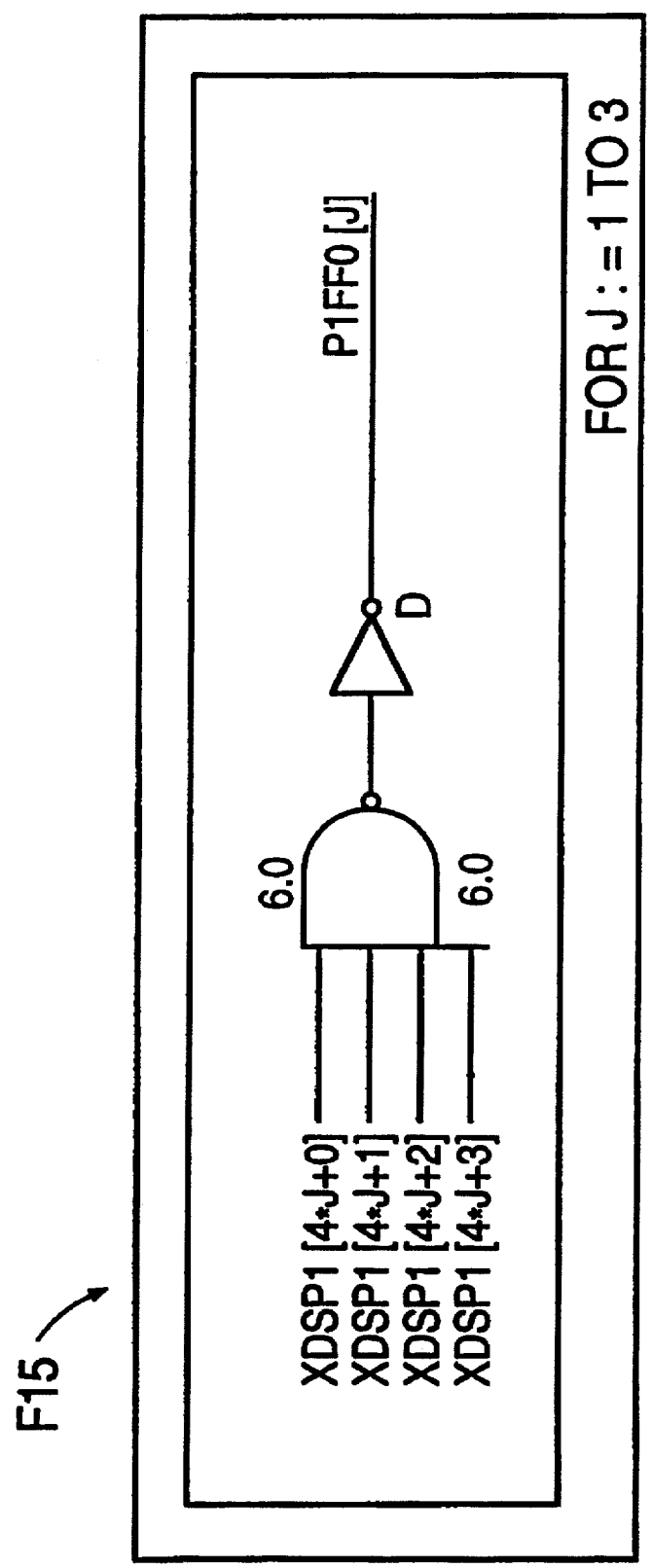
Figure 31:
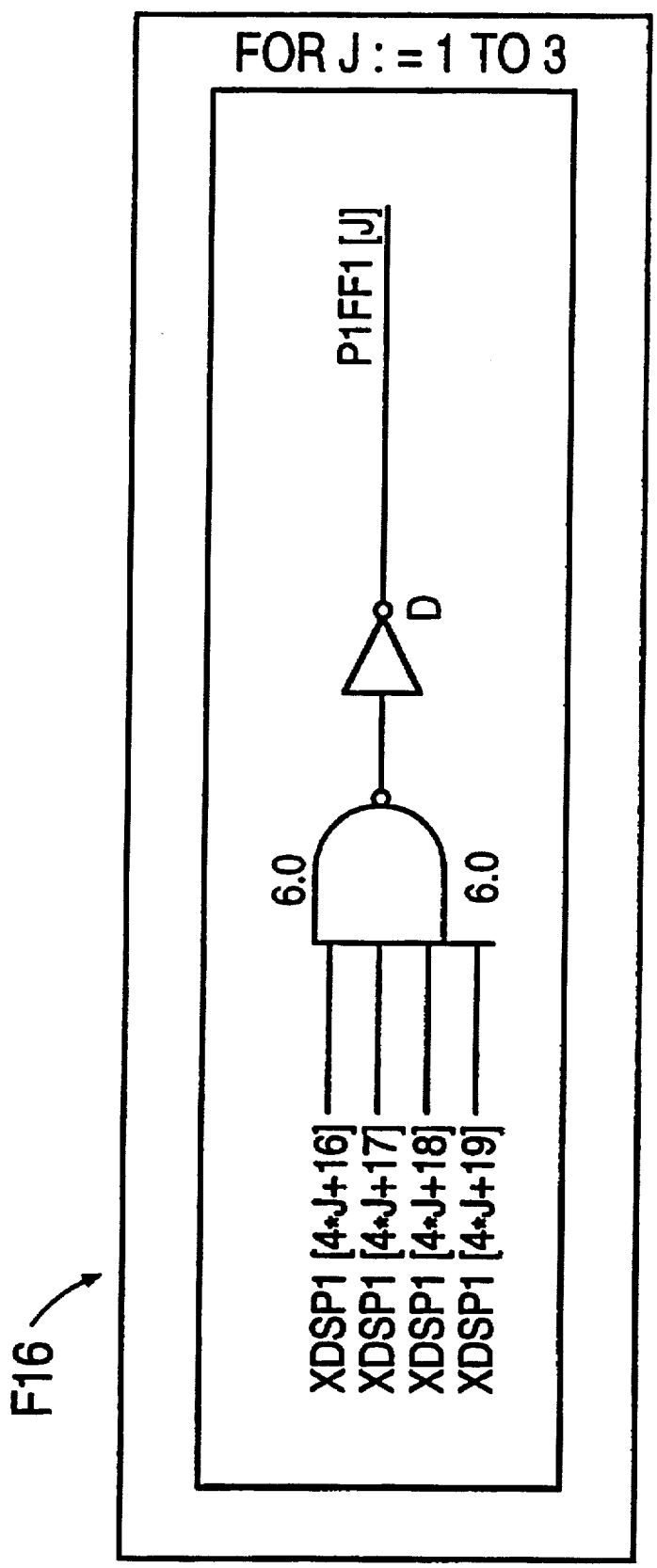
Figure 32:
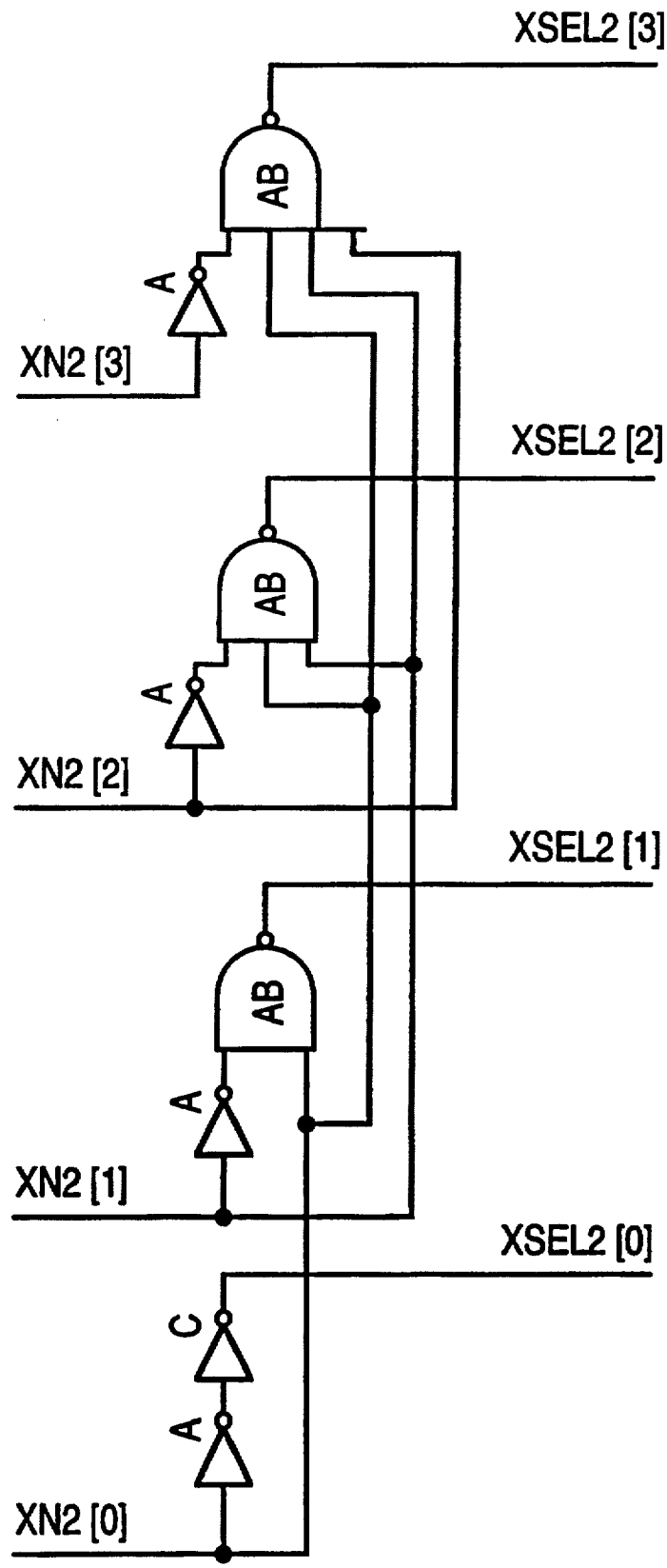
Figure 33:
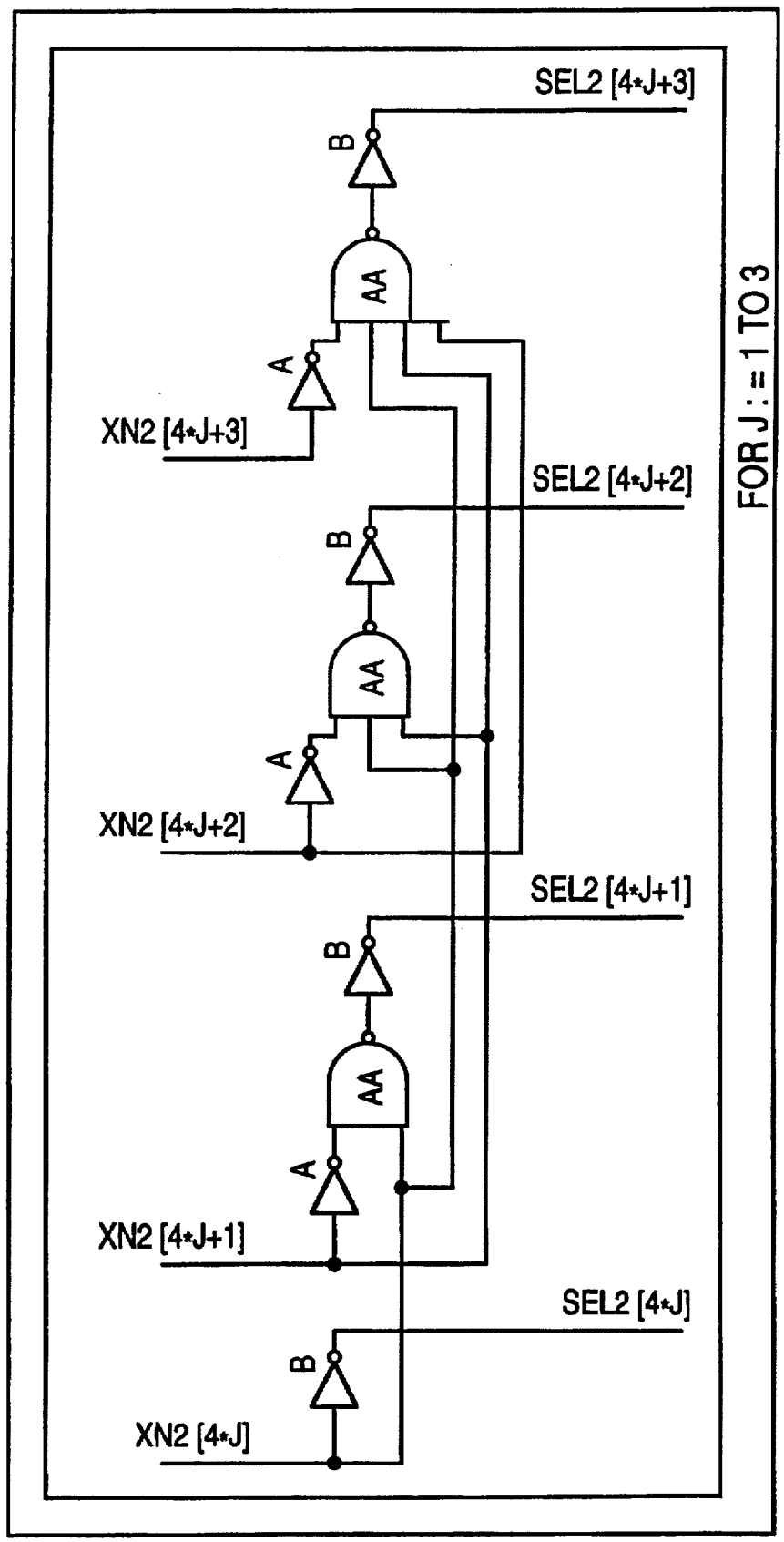
Figure 34:
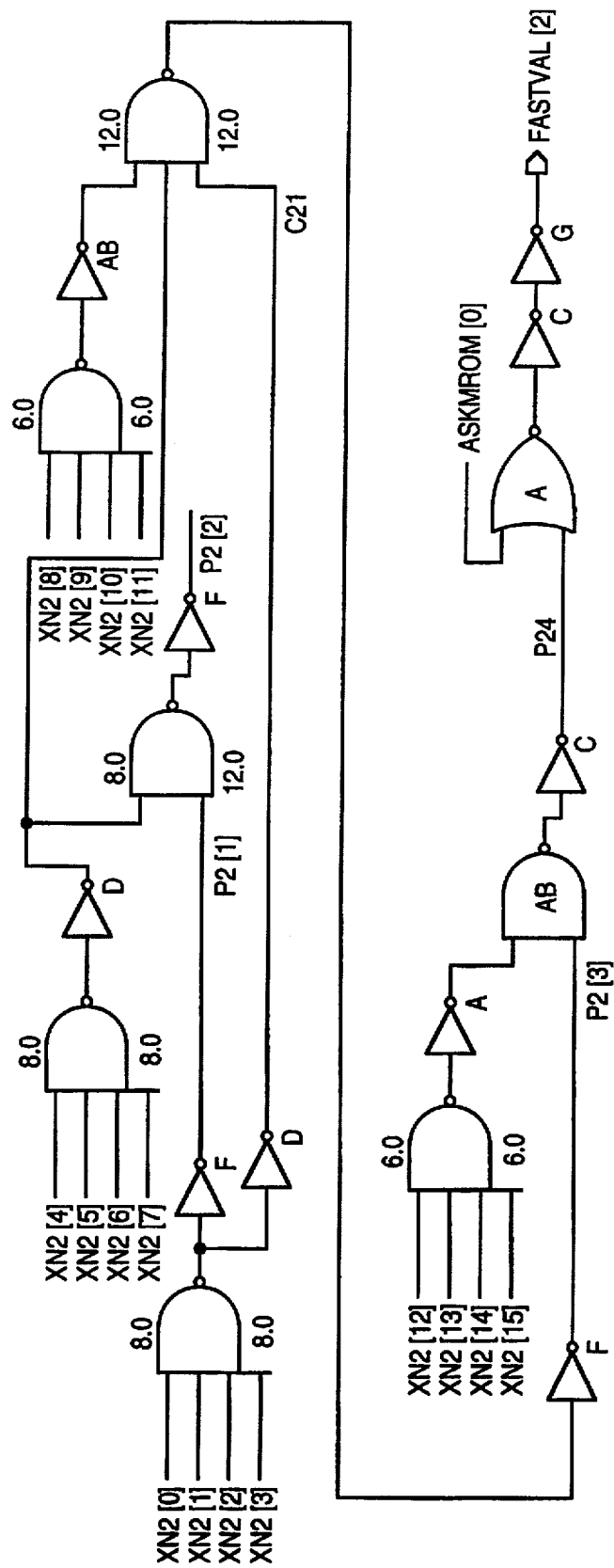
Figure 35:
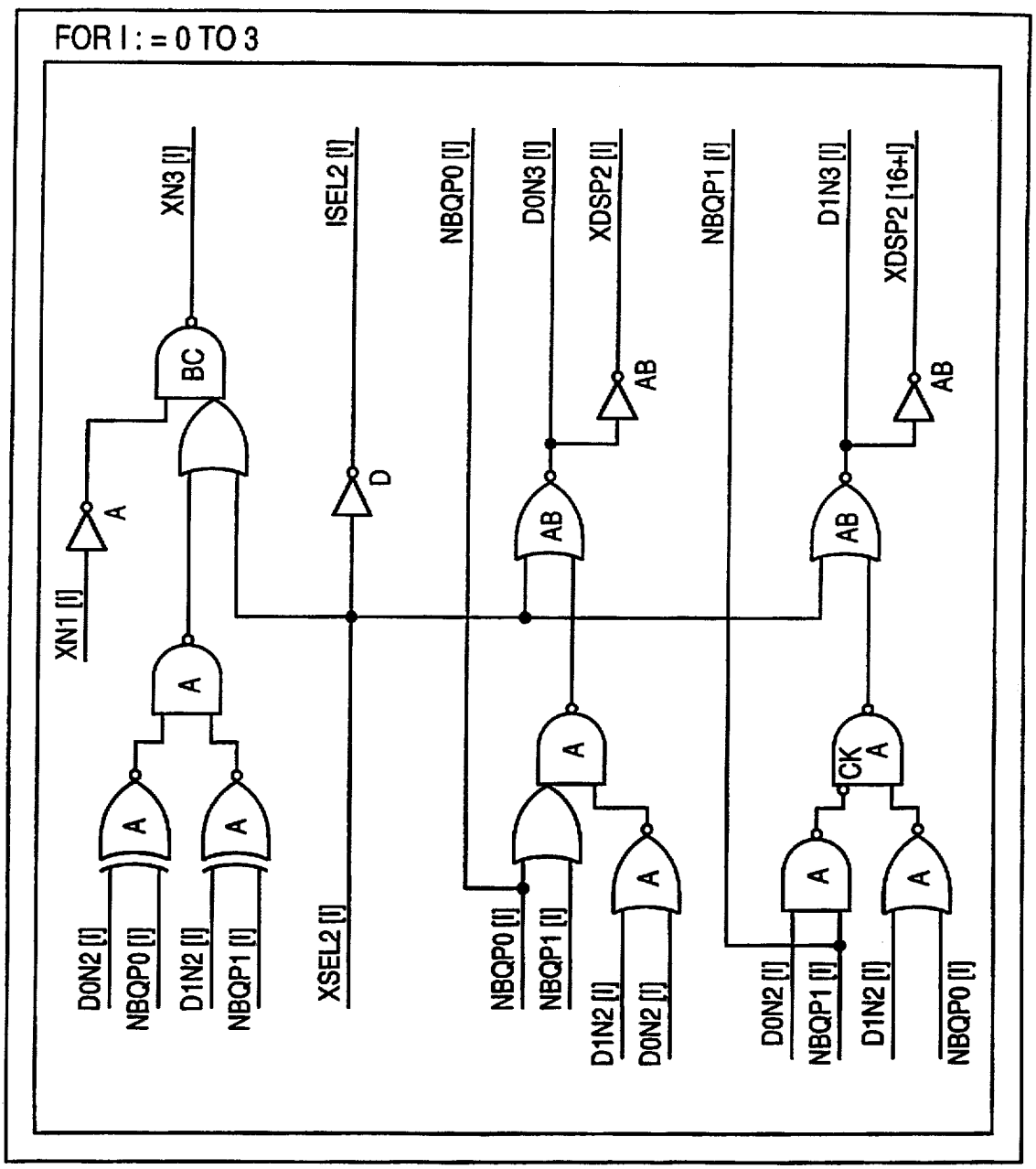
Figure 36:
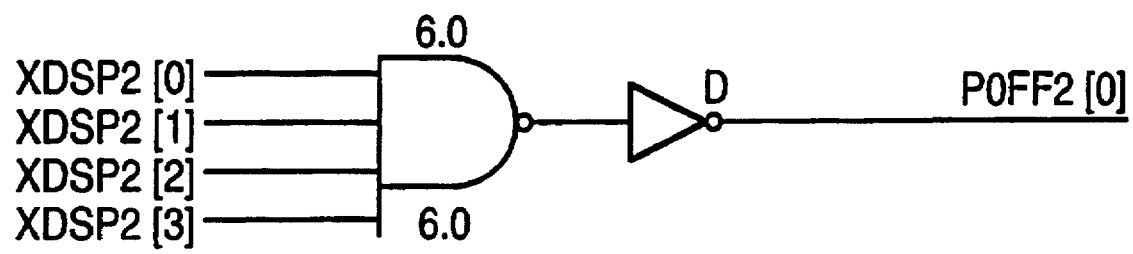
Figure 37:
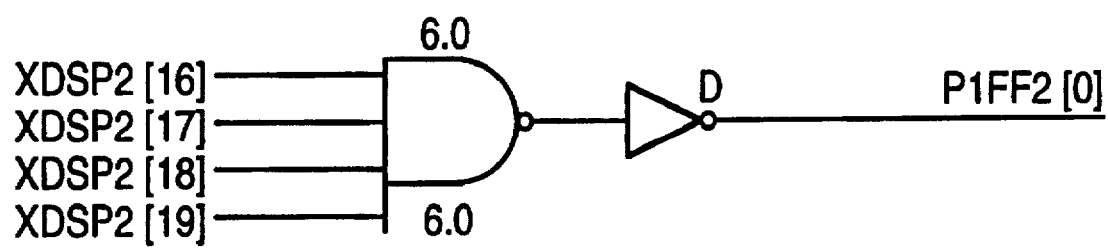
Figure 38:
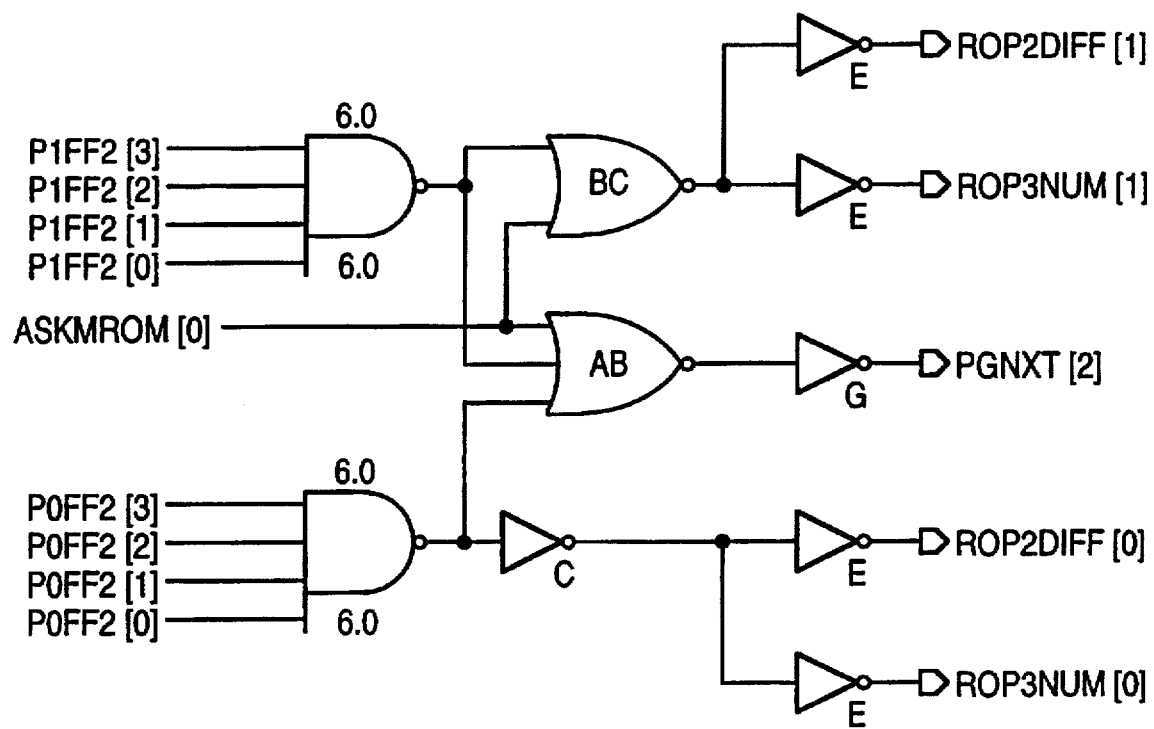
Figure 39:
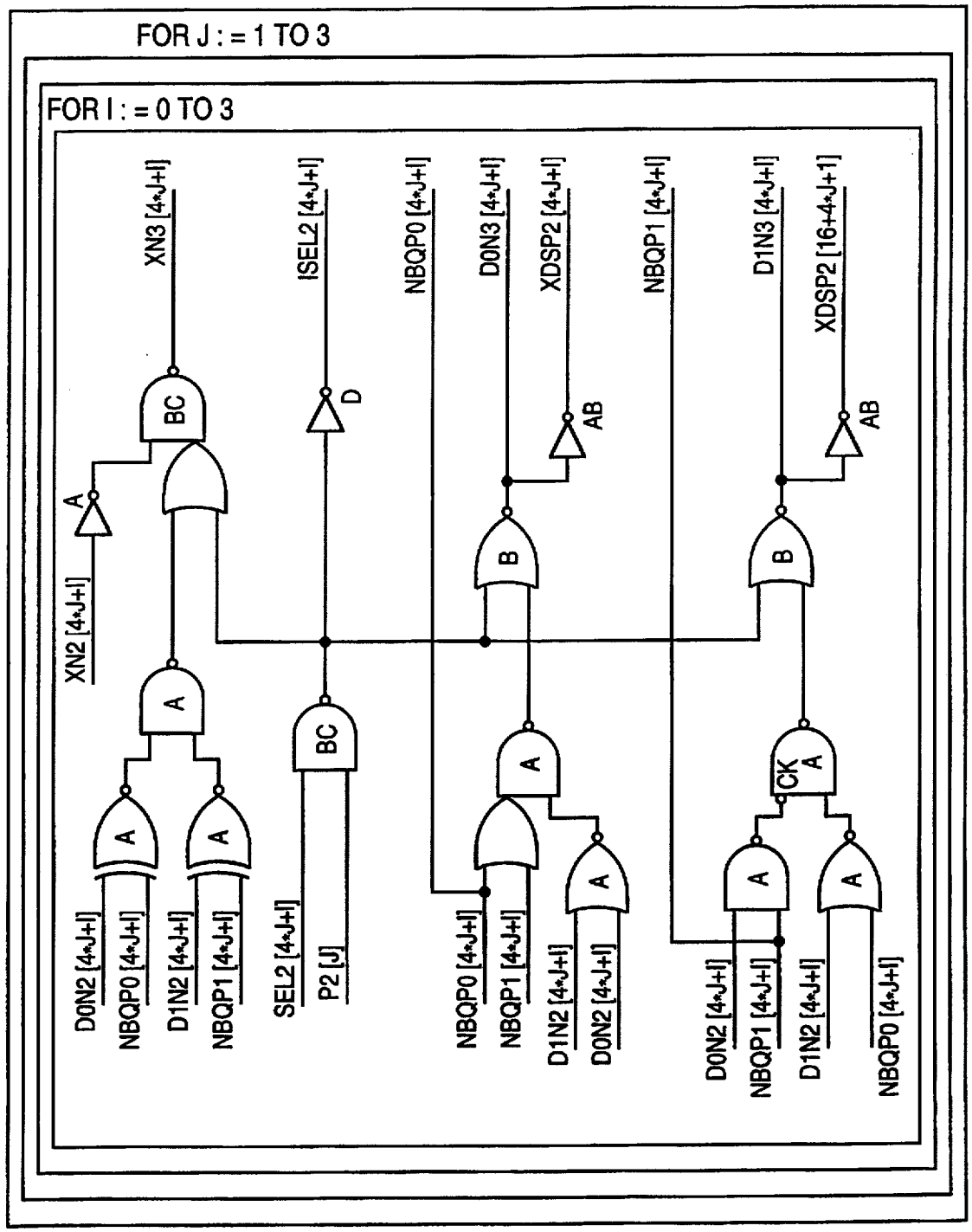
Figure 40:
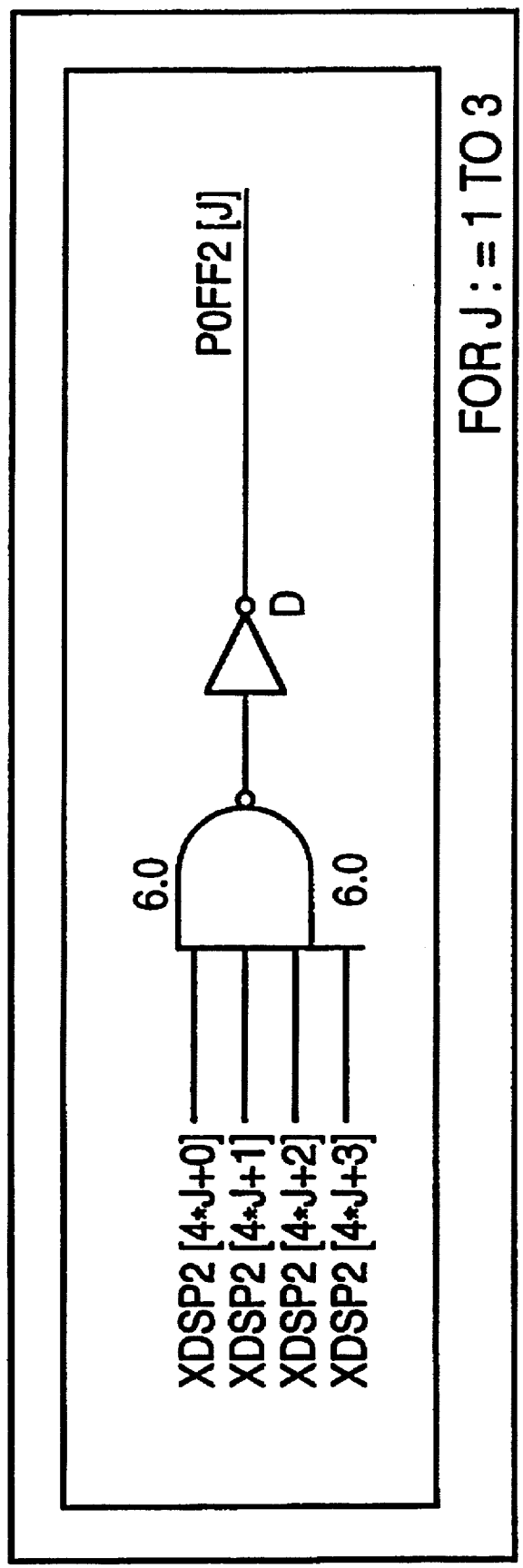
Figure 41:
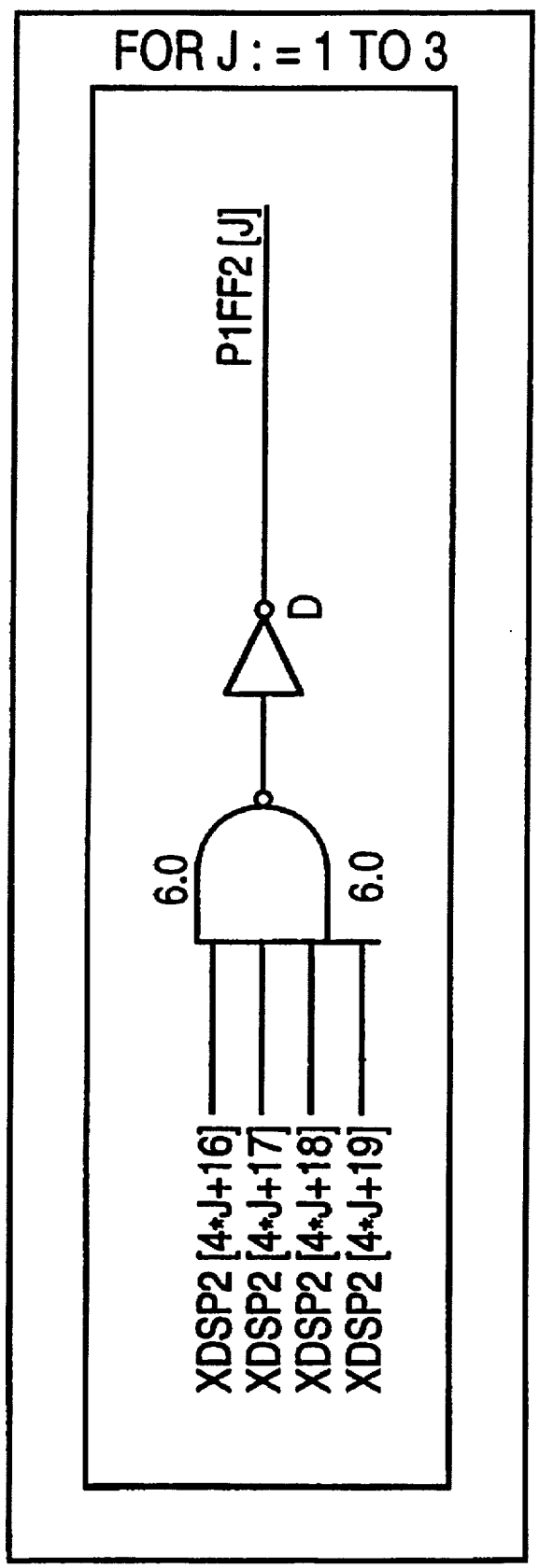
Figure 42:
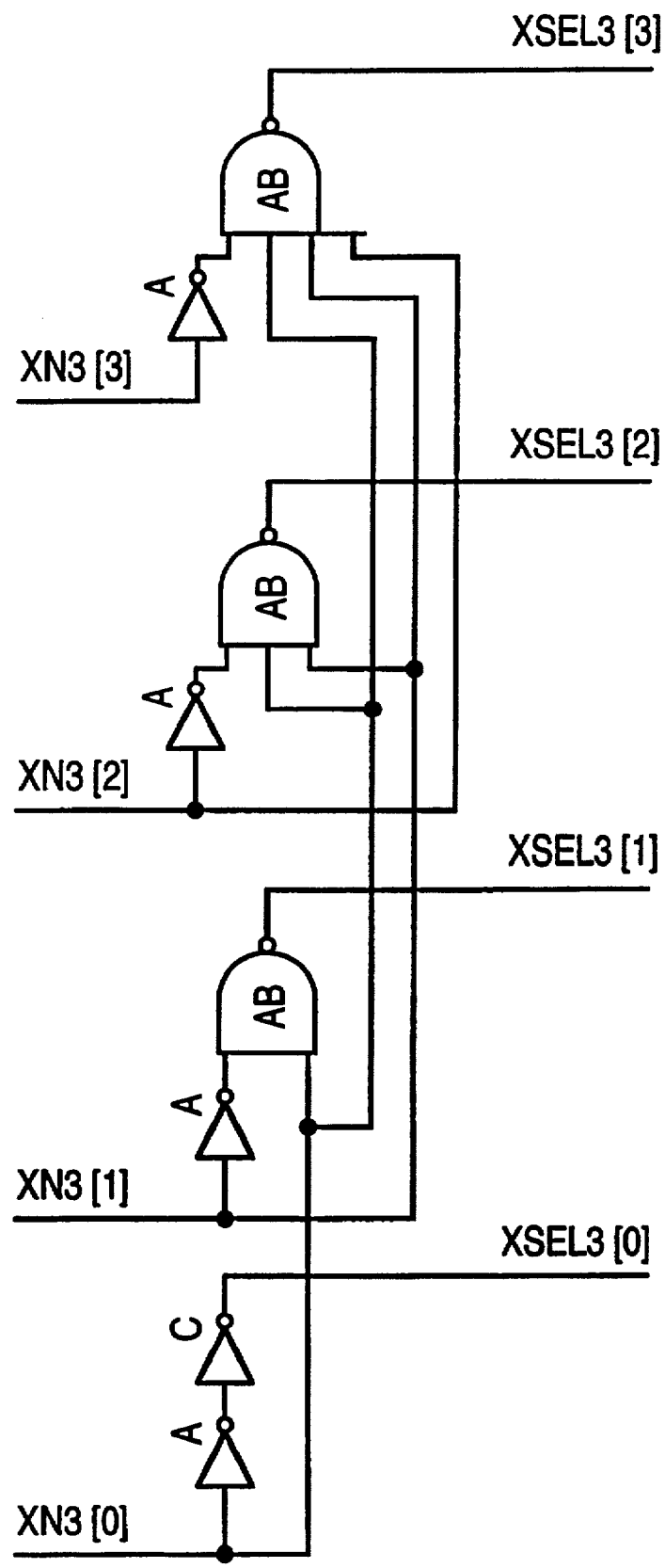
Figure 43:
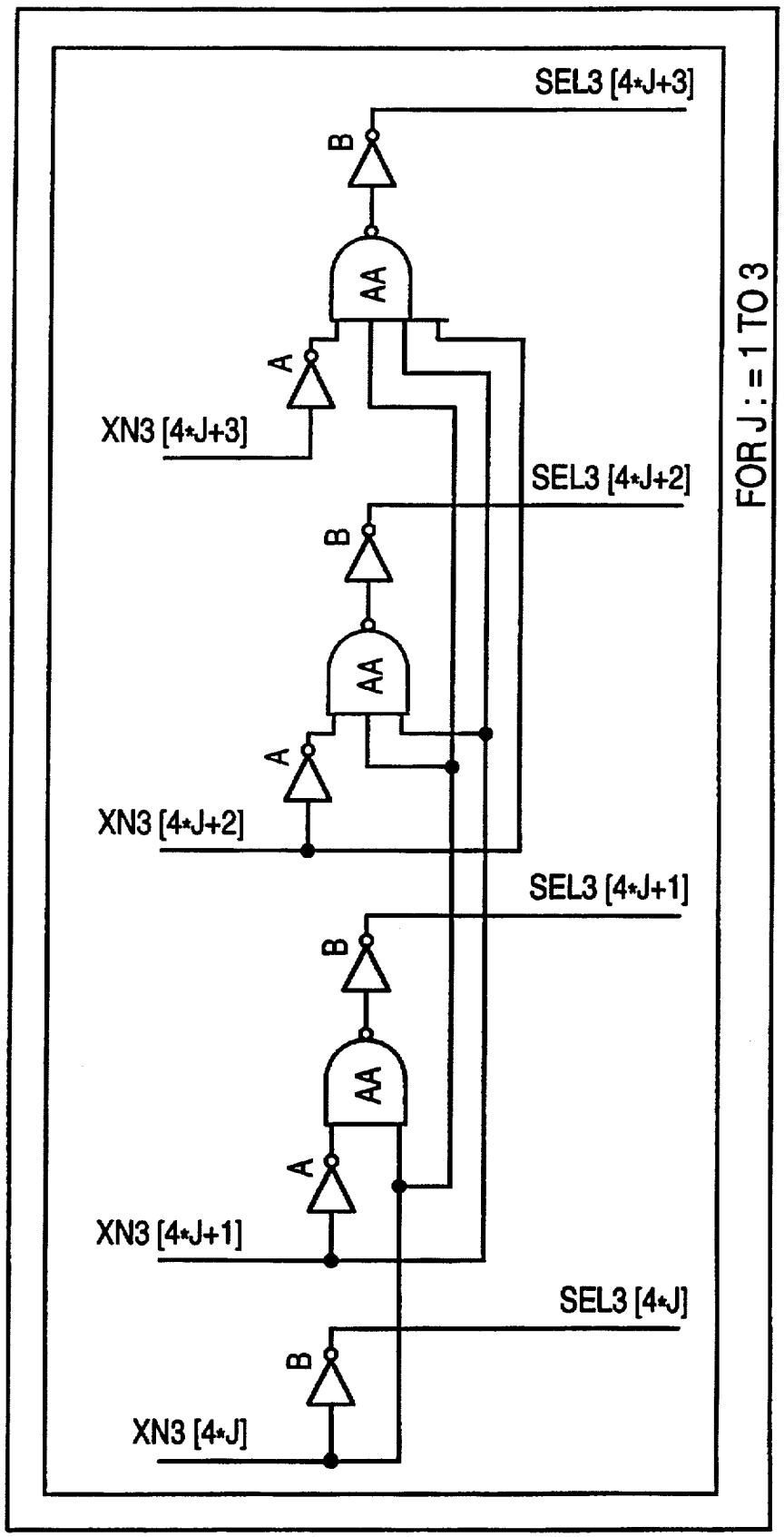
Figure 44:
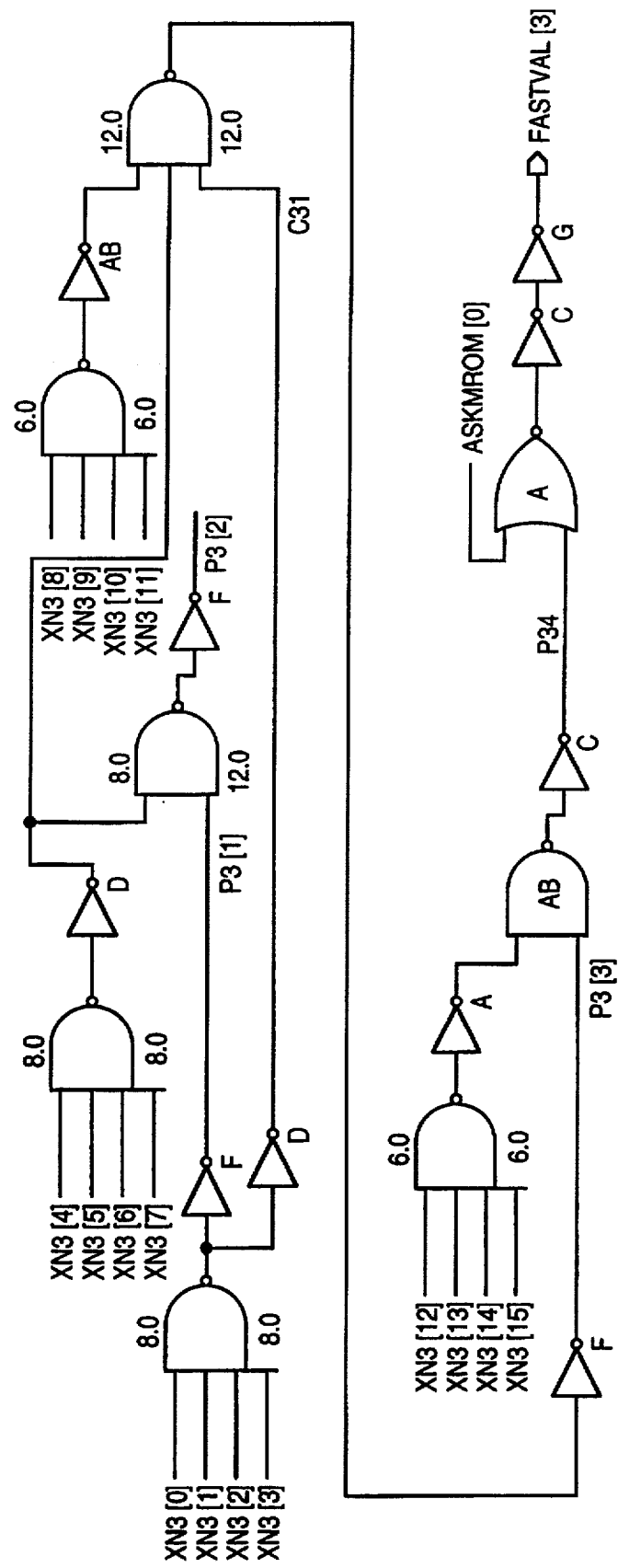
Figure 45:
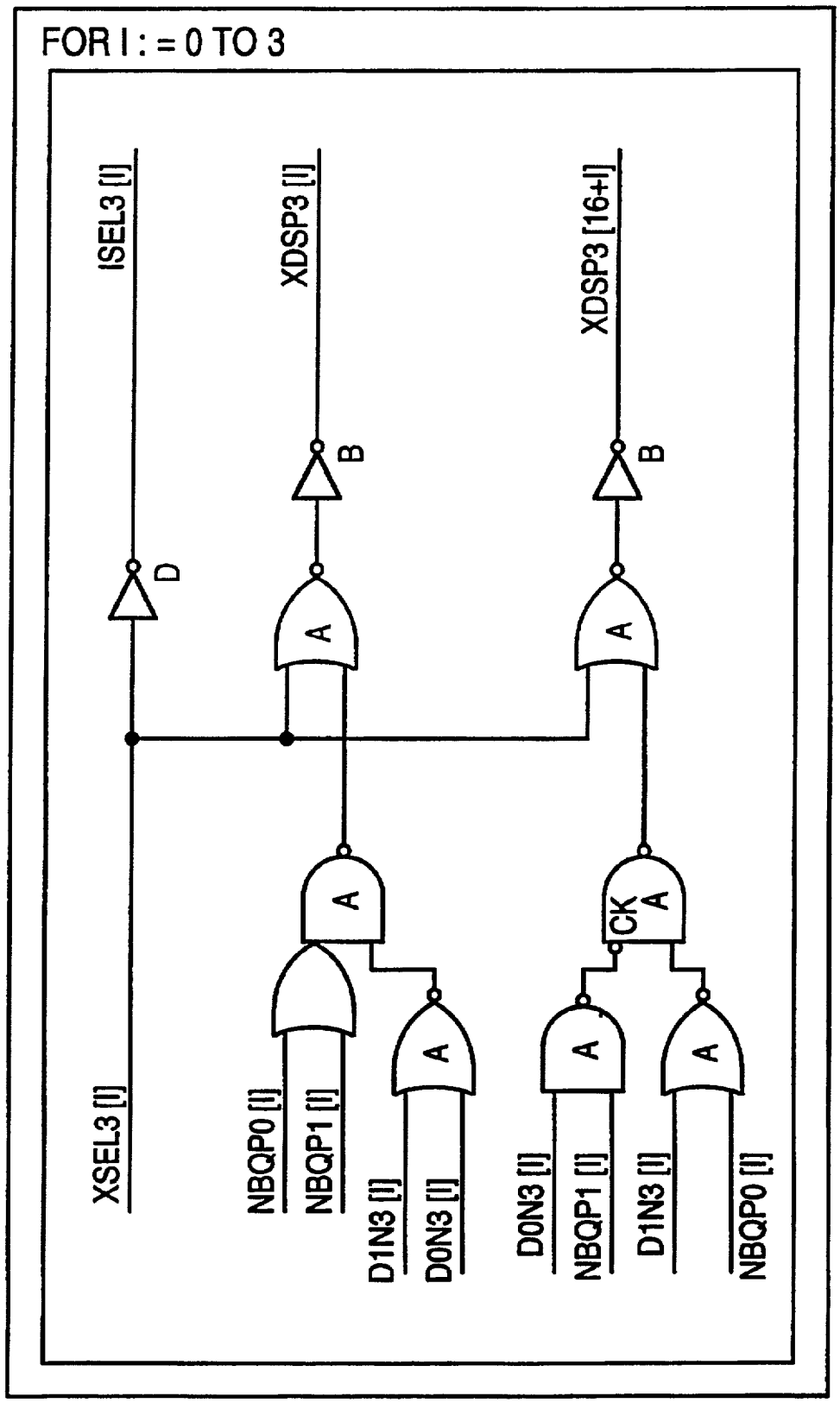
Figure 46:
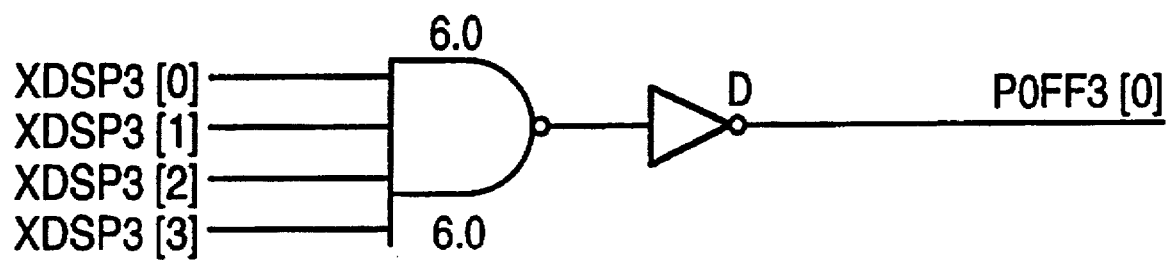
Figure 47:
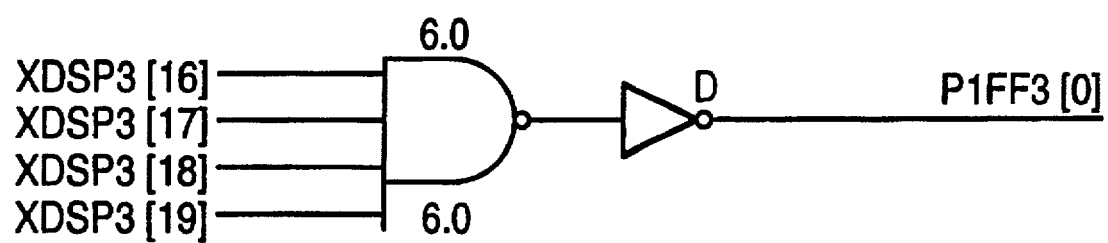
Figure 48:
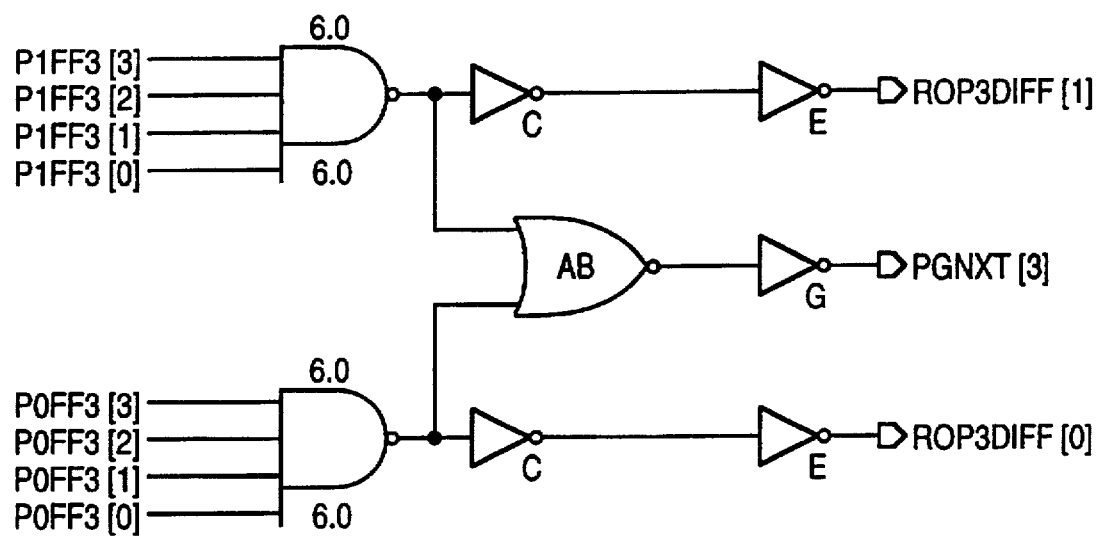
Figure 49:
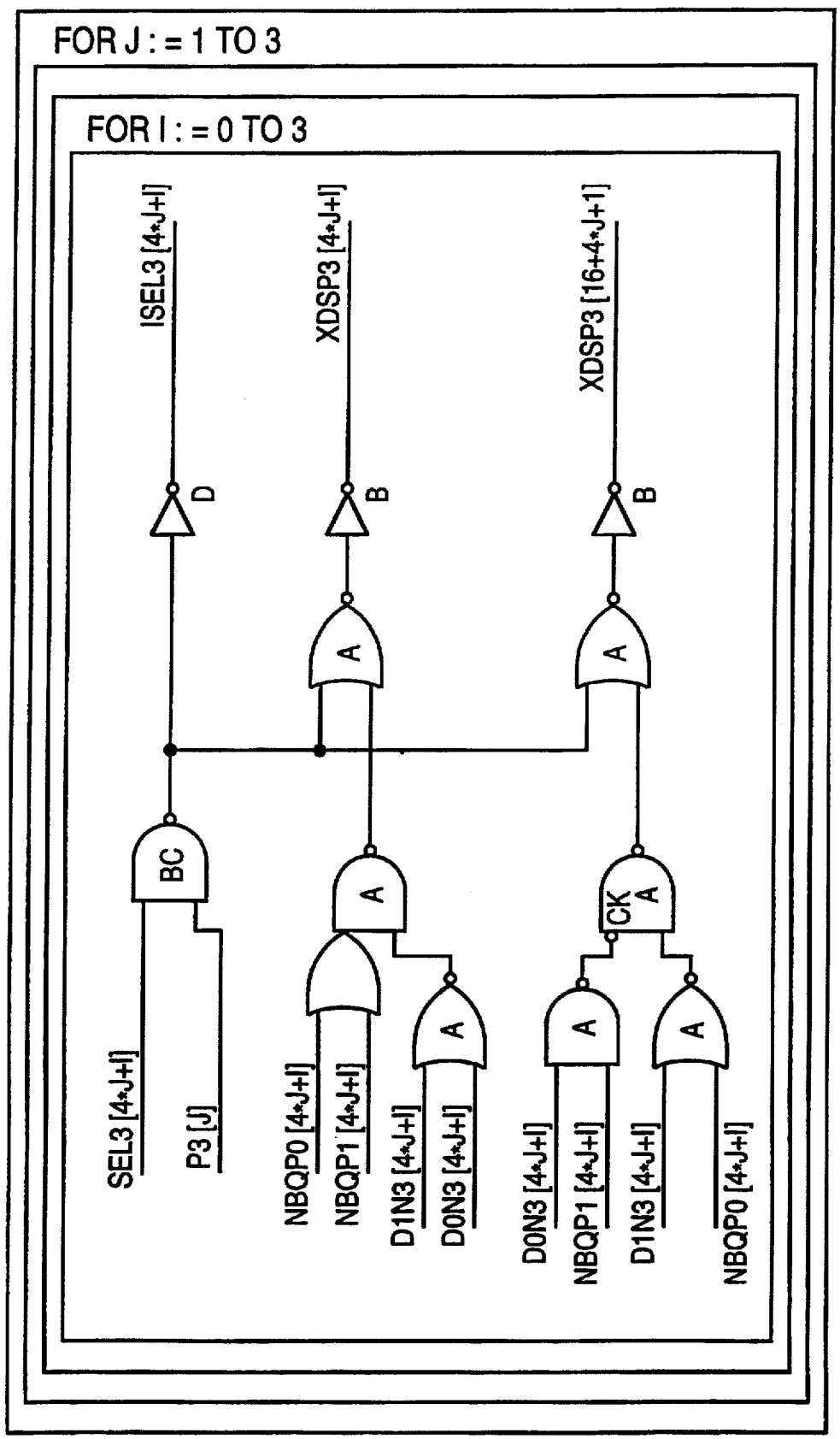
Figure 50:
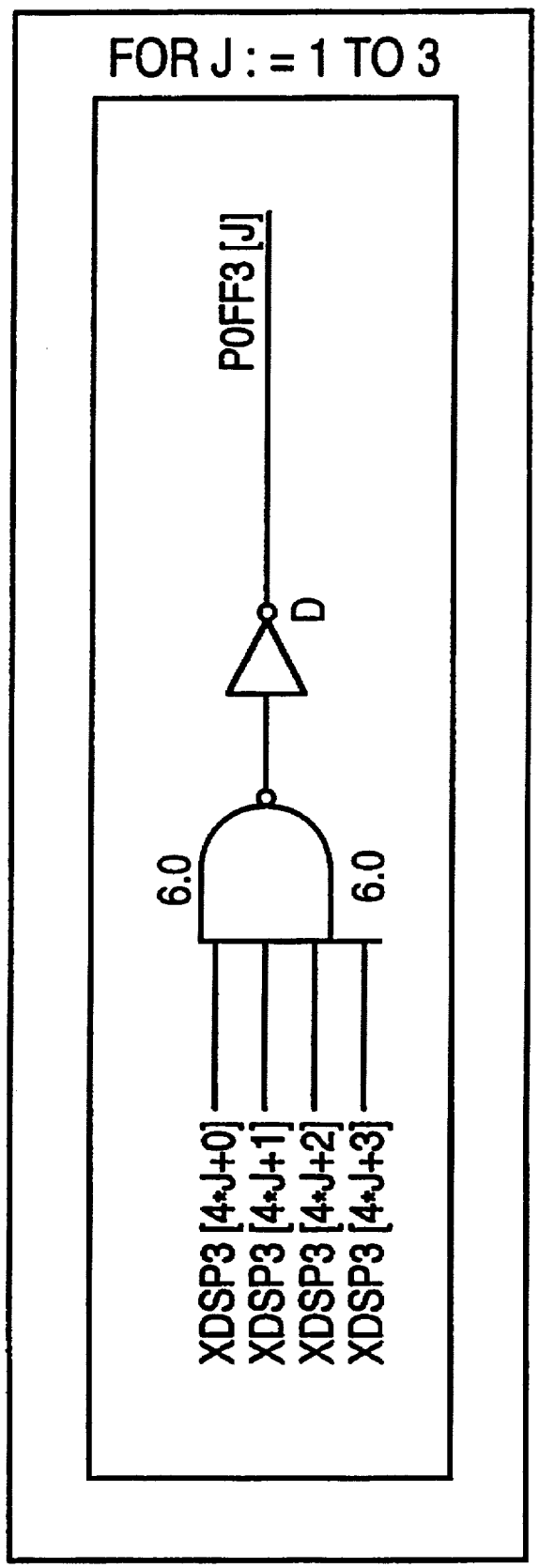

Embodiments of the elements in the scan logic architecture 690 are shown in FIGS. 8–51. Some of the gates in FIGS. 8–51 have one input marked by a dot to indicate the input that should be connected to a fast transistor. Others of the gates in FIGS. 8–51 have one input marked by a "CK" to indicate that pass gates are used to implement the logic function. Stage 0 for the first dispatch position is shown in FIGS. 8–21, in which the PDG is shown in FIGS. 8 (F1) and 9 (F2); the FOG(0) is shown in FIGS. 10 (F3), 11 (F4A) and 12 (F4B); the LAG(0) is shown in FIGS. 13 (F5) and 14 (F6); group GP(0,0) is shown in FIGS. 15 (F7), 16 (F8) and 17 (F9); groups GP(1,0), GP(2,0) and GP(3,0) are shown in FIGS. 19 (F11), 20 (F12) and 21 (F13); and the stage 0 ROP number signal generating logic RNG(0) is shown in FIG. 18 (F10). Stage 1 for the second dispatch position is shown in FIGS. 22–31, in which the FOG(1) is shown in FIGS. 22 and 23; the LAG(1) is shown in FIG. 24; group GP(0,1) is shown in FIGS. 25, 26 and 27; groups GP(1,1), GP(2,1) and GP(3,1) are shown in FIGS. 29, 30 and 31; and the stage 1 ROP number signal generating logic RNG(1) is shown in FIG. 28. Stage 2 for the third dispatch position is shown in FIGS. 32–41, in which the FOG(2) is shown in FIGS. 32 and 33; the LAG(2) is shown in FIG. 34; group GP(0,2) is shown in FIGS. 35, 36 and 37; groups GP(1,2), GP(2,2) and GP(3,2) are shown in FIGS. 39, 40 and 41; and the stage 2 ROP number signal generating logic RNG(2) is shown in FIG. 38. Stage 3 for the fourth dispatch position is shown in FIGS. 42–51, in which the FOG(3) is shown in FIGS. 42 and 43; the LAG(3) is shown in FIG. 44; group GP(0,3) is shown in FIGS. 45, 46 and 47; groups GP(1,3), GP(2,3) and GP(3,3) are shown in FIGS. 49, 50 and 51; and the stage 3 ROP number signal generating logic RNG(3) is shown in FIG. 48.

Many of the gate level circuits of FIGS. 8–51 contain circuit structures similar to, or are simplified variations of, other circuits included in groups GP(0,0), GP(1,0) and GP(1,1). Accordingly, the following description of circuit operation focusses on circuits included in groups GP(0,0), GP(1,0) and GP(1,1) so as to avoid an unnecessarily lengthy text.

Figure 51:
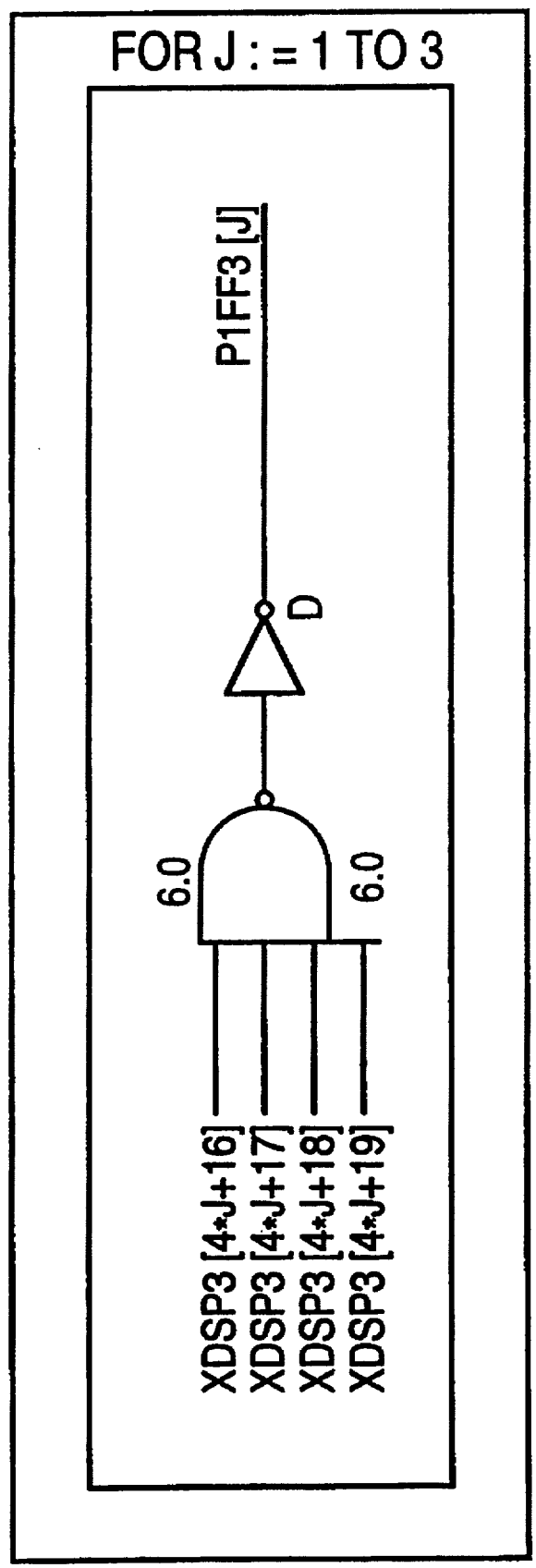

The operation of the other circuits shown in FIGS. 85–51 is readily apparent from the figures and the following description.

An embodiment of a logic circuit for the element F1 is shown in FIG. 8. Signal PARTIALDISP[1] is buffered by inverters 802 and 804 to produce PDISP1[0], by inverters 802 and 806 to produce PDISP1[1], by inverters 802 and 808 to produce PDISP1[2], by inverters 802 and 810 to produce PDISP1[3], and by inverters 802 and 812 to produce ROPONUM[1].

Figure 9:
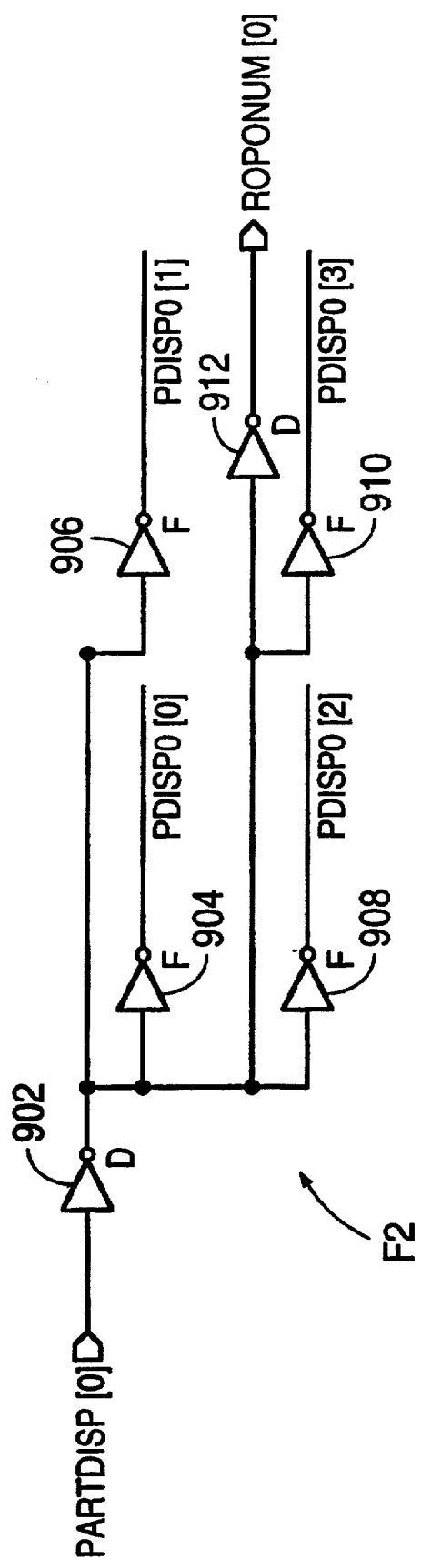

An embodiment of a logic circuit for the element F2 is shown in FIG. 9. Signal PARTIALDISP[0] is buffered by inverters 902 and 904 to produce PDISP0[0], by inverters 902 and 906 to produce PDISP0[1], by inverters 902 and 908 to produce PDISP0[2], by inverters 902 and 910 to produce PDISP0[3], and by inverters 902 and 912 to produce ROPONUM[0].

An embodiment of a logic circuit for the element F3 is shown in FIG. 10. Array BYTEQP2[15:0] is bitwise inverted by a set of sixteen inverters to produce array XIN[15:0].

An embodiment of a logic circuit for the element F4 is shown in FIGS. 11 and 12. As shown in FIG. 11, bit XIN[0]

is buffered by gate group 1102, which includes two series connected inverters, to produce the signal XSEL0[0]. XSEL0[0] is essentially an inverted version of BYTEQP2 [0]. Bits XIN[1:0] are applied to gate group 1104, which includes a NAND gate receiving XIN[1] through an inverter and XIN[0] directly, to produce the signal XSEL0[1]. Signal XSEL0[1] is essentially an inverted version of BYTEQP2 [1], provided XIN[0] is not asserted (logic 1), and is otherwise logic 1. Bits XIN[2:0] are applied to gate group 1106, which includes a NAND gate receiving XIN[2] through an inverter and XIN[1:0] directly, to produce the signal XSEL0 [2]. Signal XSEL0[2] is essentially an inverted version of BYTEQP2[2], provided XIN[1] and XIN[0] are not asserted (logic 1), and is otherwise logic 1. Bits XIN[3:0] are applied to gate group 1108, which includes a NAND gate receiving XIN[3] through an inverter and XIN[2:0] directly, to produce the signal XSEL0[3]. Signal XSEL0[3] is essentially an inverted version of BYTEQP2[3], provided XIN[2], XIN[1] and XIN[0] are not asserted (logic 1), and is otherwise logic 1.

FIG. 12 shows function F4 for bit groups XIN[7:4], XIN[11:8] and XIN[15:12]. Consider function F4 as applied to bit group XIN[7:4], for example. Bit XIN[4] is buffered by gate group 1202, which includes a single inverter, to produce the signal SEL0[4]. SEL0[4] is essentially BYTEQP2[4]. Bits XIN[5:4] are applied to gate group 1204, which includes a NAND gate receiving XIN[5] through an inverter and XIN[4] directly, followed by an inverter to produce the signal SEL0[5]. Signal SEL0[5] is essentially BYTEQP2[5], provided XIN[4] is not asserted (logic 1), and is otherwise logic 0. Bits XIN[6:4] are applied to gate group 1206, which includes a NAND gate receiving XIN[6] through an inverter and XIN[5:4] directly, to produce the signal SEL0[6]. Signal XSEL0[6] is essentially an inverted version of BYTEQP2[6], provided XIN[5] and XIN[4] are not asserted (logic 1), and is otherwise logic 0. Bits XIN[7:4] are applied to gate group 1208, which includes a NAND gate receiving XIN[7] through an inverter and XIN[6:4] directly, to produce the signal SEL0[7]. Signal SEL0[7] is essentially an inverted version of BYTEQP2[7], provided XIN[6], XIN[5] and XIN[4] are not asserted (logic 1), and is otherwise logic 0.

An embodiment of a logic circuit for the element F5 is shown in FIG. 13. Bits BYTEQP2[3:0] are or'ed by NOR gate 1302 followed by inverter 1303, bits BYTEQP2[7:4] are or'ed by NOR gate 1304 followed by inverter 1305, bits BYTEQP2[11:8] are or'ed by NOR gate 1306 followed by inverter 1307, and bits BYTEQP2[15:12] are or'ed by NOR gate 1308 followed by inverter 1309.

An embodiment of a logic circuit for the element F6 is shown in FIG. 14. Look-ahead signal P0[1] for the group GP(1,0) is signal BQP2OR[0] inverted in gate group 1402. Look-ahead signal P0[2] for the group GP(2,0) is NOR (BQP2OR[1], BQP2OR[0]) in gate group 1404. Look-ahead signal P0[3] for the group GP(3,0) is NOR (BQP2OR[2], BQP2OR[1], BQP2OR[0]) in gate group 1406. Look-ahead signal P0[4] is INV(NAND ((INV(BQP2OR[3]), P0[3])) in gate group 1408. FASTVAL[0] is NOR(ASKMROM[0],P0 [4]) buffered by two inverters in gate group 1410.

Embodiments of logic circuits for the elements F7 and F11 are shown in FIGS. 15 and 19 respectively. ISEL0[I] in F7 is derived directly from XSEL0[I] through inverter 1506, and ISEL0[4*J+I] in F11 is derived from SEL0[4*J+I] and P0[J] through NAND gate 1904 and inverter 1906. The position of the first occurrence of an asserted opcode bit in the BYTEQ 106 is indicated by the position of the logic 1 in the ISEL0 array. The signal XSEL0[I] in F7 and the output of the NAND gate 1904 in F11 are also respectively applied to gate groups 1502 and 1902, gate groups 1512 and 1912, and gate groups 1518 and 1918.

As applied to the OR-NAND gates 1502 and 1902 respectively, the signal XSEL0[I] in F7 and the output of the NAND gate 1904 in F11 are used to mask the array BYTEQP2 to remove the first occurrence of an asserted opcode bit from bit position x provided that BYTEQP1[x], BYTEQP0[x] is equal to PDISP1[x],PDISP0[x]. This condition, which identifies that a dispatch position is allocated to the last ROP in the sequence, is detected by gate groups 1500 and 1900. The masked array is presented as opcode location array XN1 to the next stage 610.

As applied to the gate groups 1512 and 1912 respectively, the signal XSEL0[I] in F7 and the output of the NAND gate 1904 in F11 are used to enable the outputs of gate groups 1508 and 1908, from which the signal D0N1 is derived and furnished to the next stage. As applied to the gate groups 1518 and 1918 respectively, the signal XSEL0[I] in F7 and the output of the NAND gate 1904 in F11 are used to enable the outputs of gate groups 1516 and 1916, from which the signal D1N1 is derived and furnished to the next stage. In effect, gate groups 1508 and 1516 of F7, and gate groups 1908 and 1916 of F11, increment PDISP1[x], PDISP0[x] by one unless BYTEPP1[x], BYTEQP0[x] and PDISP1[x], PDISP0[x] are equal. In this event, D1N1[x],D0N1[x] is forced to 00.

Elements F7 and F11 pass along the array BYTEQP2 as XN1 except for any bit that is masked, and pass along the arrays BYTEQP1 and BYTEQP0 as NBQP1 and NBQP0 respectively.

The ROP number signals ROP0DIFF[1:0] and PGNXT[0] for stage 0, and the ROP number signal ROP1NUM[1:0] for stage 1 are obtained by elements F8, F9, F10, F12 and F13, shown in FIGS. 16, 17, 18, 20 and 21 respectively. Elements F8, F9, F12 and F13 are 4-bit AND operations using a NAND gate followed by an inverter. Element F8 operates on bits XDISP[3:0]. Element F9 operates on bits XDISP [19:16]. Element F20 operates on elements XDISP[7:4], XDISP[11:8], and XDISP[15:12]. Element F21 operates on elements XDISP[23:20], XDISP[27:24], and XDISP [31:28]. The outputs P1FF0[3:0] and P0FF0[3:0] of elements F8, F9, F20 and F21 are applied to element F10. P1FF0[3:0] are applied to NAND gate 1802, the output of which is buffered by inverters 1804 and 1806 to produce bit ROP0DIFF[1], and buffered by inverters 1804 and 1808 to produce bit ROP1NUM[1]. P0FF0[3:0] are applied to NAND gate 1814, the output of which is buffered by inverters 1816 and 1818 to produce bit ROP0DIFF[0], and buffered by inverters 1816 and 1820 to produce bit ROP1NUM[0]. The outputs of NAND gates 1802 and 1814 are also applied to NOR gate 1810, the output of which is inverted by inverter 1812 and furnished as signal PGNXT [0].

The architecture of the fast byte queue scan logic architecture 690 is suitable for other rapid scanning applications. For example, FIG. 52 shows a fast byte queue scanner 5200 suitable for use in the ROPMUX 400 for processing the start and end bit arrays BYTEQS and BYTEQE, as well as the opcode and rop number arrays BYTEQP2, BYTEQP1 and BYTEQP0. In the byte queue scanner 5200, the scan logic 690 is combined with a second scan logic 5210 that processes the start and end bit arrays BYTEQS and BYTEQE to create a four element output array ESEL0[15:0], ESEL1 [15:0], ESEL2[15:0] and ESEL3[15:0], each element of which identifies for the ROP allocated the corresponding dispatch position the location of the end bit of the x86 instruction from which the ROP is mapped. The identification is done by first generating, a working array of four elements respectively identifying the location of the end bit for the first four instructions in the BYTEQ 106. Error checking also is performed; for example, checking is done to ensure that each start bit (except the first, which is assumed to be the first bit in the array BYTEQS) is immediately preceded by an end bit. Then, the signal PGNXT [3:0], which as mentioned above is from scan logic 690 and indicates whether the ROP in the dispatch position "x" is the last ROP in the ROP sequence mapped from the corresponding x86 instruction, is used as a multiplexer control signal to direct the first element of the working array to as many of the elements of the output array as there are dispatch positions allocated to the instruction at the head of queue, to direct the next element of the working array to as many of the available elements of the output array as there are dispatch positions allocated to the next instruction in the BYTEQ 106, and so forth.

The scan logic 5210 uses a grouping and look-ahead technique similar to that used in the architecture of FIGS. 6A and 6B in the second, third and fourth stages. The first stage need not be processed in this manner because it is assumed that a start bit is in the bit position at head of queue. For the second, third and fourth stages in scanner 5210, logic generally similar to the first opcode identification signal generation logic FOG is used to identify the first occurring end bit in each group of four bits from the array BYTEQE. Logic similar to the look-ahead signal generation logic LAG is used to determine whether any preceding group in the stage contains a first-occurring end bit. Each stage includes four groups, as in the scan logic 690.

The presence of a memory ROM instruction is detected in the first stage by monitoring BYTEQP1, BYTEQP0. If a memory ROM instruction is detected, signal ASKMROM[0] is asserted and applied to the scan logic 690.

While the invention has been described with reference to various embodiments, it will be understood that these embodiments are illustrative and that the scope of the invention is not limited to them. Variations, modifications, additions and improvements of the embodiments described are possible. The number of stages and the number of groups within each stage may be varied. Moreover, the invention may be used to scan queues other than the BYTEQ 106. These and other variations, modifications, additions and improvements may fall within the scope of the invention as defined in the claims which follow.

What is claimed is:

1. An instruction queue scanner comprising:
   an opcode identifier array input port;
   a mapping number array input port;
   plural pairs of opcode identifier and mapped sequence number outputs, each of said pairs corresponding to an instruction dispatch position; and
   scan logic coupled between said opcode identifier and said mapping number array input ports and said pairs of opcode identifier and mapped sequence number outputs, wherein said scan logic allocates opcode identifier elements of an opcode identifier array received at said opcode identifier array input port to a number of said opcode identifier outputs in accordance with a corresponding mapping number element of an mapping number array received at said mapping number array input port.

2. An instruction queue scanner, as recited in claim 1, wherein said scan logic comprises plural logic stages each corresponding to respective of the pairs of opcode identifier and mapped sequence number output ports.

3. An instruction queue scanner, as recited in claim 2, wherein each of said logic stages comprises:
   plural instances of group scan logic coupled to scan respective subset arrays of said opcode identifier array; and
   look-ahead logic coupled to pre-empt higher-order instances of said group scan logic instances if one of said subset arrays corresponding to a lower-order one of said group scan logic instances includes a not fully allocated opcode identifier.

4. An instruction queue scanner, as recited in claim 2, wherein lower-order ones of said logic stages are coupled to respective next higher-order ones of said logic stages to supply said next higher-order ones with respective masked opcode identifier array inputs, wherein said masked opcode identifier array inputs mask ones of said opcode identifier elements fully allocated to opcode identifier outputs of respective lower-order ones of said logic stages in accordance with corresponding ones of said mapping number elements.

5. An instruction queue scanner, as recited in claim 1, wherein said opcode identifier elements are selective for complex instruction opcodes from an instruction queue and wherein said mapping number array comprises mapping number elements corresponding to said opcode identifier elements and indicative of a number of simple instructions to which a corresponding one of said complex instruction opcodes maps.

6. An instruction queue scanner, as recited in claim 1, wherein said opcode identifier elements are selective for x86 opcode bytes from an instruction queue for predecoded x86 instructions and wherein said mapping number array comprises mapping number elements corresponding to said opcode identifier elements and indicative of a number of RISC-like operations to which a corresponding one of said x86 opcode bytes maps.

7. An instruction queue scanner, as recited in claim 1, wherein said opcode identifier outputs are coupled to select respective complex instruction opcodes from an instruction queue for provision to respective instruction decoder paths, and wherein said mapped sequence number outputs are coupled to respective ones of said instruction decoder paths to indicate a number of simple instructions to which a corresponding one of said selected complex instruction opcodes maps.

8. An apparatus comprising:
   an instruction queue;
   plural complex instruction decoder paths, wherein each of said instruction decoder paths corresponds to a simple instruction dispatch position;
   a queue scanner coupled between said instruction queue and said complex instruction decoder paths, said queue scanner having plural logic stages corresponding to respective of said simple instruction dispatch positions, wherein said queue scanner scans an opcode identifier array for opcode identifiers selective for complex instructions in said instruction queue and allocates said selective opcode identifiers to one or more simple instruction dispatch positions in accordance with corresponding mapping indicia
   wherein each of said logic stages comprise:
      plural instances of group scan logic coupled to scan a respective subset array of said opcode identifier array; and
      look-ahead logic coupled to pre-empt higher-order instances of said group scan logic instances if a lower-order one of said group scan logic instances detects a selective opcode identifier.

9. An apparatus comprising:

an instruction queue;

plural complex instruction decoder paths, wherein each of said instruction decoder paths corresponds to a simple instruction dispatch position;

a queue scanner coupled between said instruction queue and said complex instruction decoder paths, said queue scanner having plural logic stages corresponding to respective of said simple instruction dispatch positions, wherein said queue scanner scans an opcode identifier array for opcode identifiers selective for complex instructions in said instruction queue and allocates said selective opcode identifiers to one or more simple instruction dispatch positions in accordance with corresponding mapping indicia;

wherein lower-order ones of said logic stages are coupled to respective next higher-order ones of said logic stages to supply said next higher-order ones with respective masked opcode identifier array inputs, wherein said masked opcode identifier array inputs mask opcode identifiers of said opcode identifier array fully allocated by respective lower-order ones of said logic stages to corresponding simple instruction dispatch positions.

10. An apparatus comprising:

an opcode identifier vector input port, elements of an opcode identifier vector supplied thereto being selective for complex instruction opcode bytes in an instruction queue;

a mapping number vector input port, elements of a mapping number vector supplied thereto being indicative of numbers of simple instructions mapped from a complex instruction opcode selected by a corresponding one of said opcode identifier vector elements;

plural pairs of opcode identifier and mapped sequence number outputs, each of said pairs corresponding to a complex instruction to simple instruction decode path; and scan logic coupled between said opcode identifier and said mapping number array input ports and said pairs of opcode identifier and mapped sequence number outputs, wherein said scan logic allocates said opcode identifier elements to a number of said opcode identifier outputs in accordance with a corresponding one of said mapping number elements, and wherein said scan logic supplies mapped sequence numbers at respective of said mapped sequence number outputs in accordance with said allocation, each said mapped sequence numbers indicative of a particular one of one or more simple instructions to which the corresponding complex instruction maps.

11. A method for scanning an instruction queue comprising:

(a) scanning an opcode identifier array for a first opcode byte identifier;

(b) selecting a corresponding first complex instruction from said instruction queue for supply to a first complex instruction decode path;

if a mapping number array element corresponding to said first complex instruction indicates that multiple simple instructions map therefrom, (c) selecting said first complex instruction from said instruction queue for supply to a second complex instruction decode path, and (d) determining a mapped sequence number indicative of a particular one of said multiple simple instructions to which the corresponding complex instruction maps for supply to said second complex instruction decode path; and otherwise (e) scanning said opcode identifier array for a second opcode byte identifier; and (f) selecting a corresponding second complex instruction from said instruction queue for supply to said second complex instruction decode path.

12. A method as recited in claim 11 further comprising:

if a mapping number array element corresponding to said first complex instruction indicates that multiple simple instructions map therefrom, further (g) selecting said first complex instruction from said instruction queue for supply to a subsequent complex instruction decode path, and (h) determining a mapped sequence number indicative of a particular one of said multiple simple instructions to which the corresponding complex instruction maps for supply to said subsequent complex instruction decode path; and repeating said (g) selecting and said (h) determining until said first complex instruction is fully allocated to complex instruction decode paths in accordance with said multiple simple instructions that map therefrom.

13. A method as recited in claim 11 wherein said (a) scanning and said (e) scanning include:

scanning plural subset arrays of said opcode identifier array; and looking-ahead to pre-empt higher-order of said subset arrays if a lower-order one of said subset arrays includes a not fully allocated opcode identifier.

14. A method as recited in claim 11 further comprising:

masking a fully allocated opcode identifier from said opcode identifier array.

15. A method as recited in claim 11 wherein said (b) selecting, said (c) selecting, said (f) selecting, and said (g) selecting include supplying respective of said opcode identifiers from said opcode identifier array for selection of corresponding complex instructions from said instruction queue.

16. A method as recited in claim 11 wherein said (d) determining and said (h) determining include incrementing and supplying a respective mapped sequence numbers to corresponding of said complex instruction decode paths, said mapped sequence numbers indicative of a particular one of said multiple simple instructions to which the corresponding complex instruction maps.

17. An apparatus for scanning an instruction queue of predecoded complex instructions, wherein the instruction queue includes storage for complex instruction opcodes, an opcode identification array, and a mapping number array, elements of the opcode identification and mapping number arrays corresponding to respective ones of the complex instruction opcodes, the apparatus comprising:

a plurality of logic stages each corresponding to a simple instruction dispatch position and each having respective opcode identification and mapped sequence number outputs;

a first one of the logic stages associated with a first simple instruction dispatch position, the first logic stage coupled to receive information from the opcode identification array and from the mapping number array and to supply, based thereupon, a first opcode identification and a first mapped sequence number indication associated therewith;

a second one of the logic stages associated with a first simple instruction dispatch position, the second logic stage coupled to receive derivative opcode identification and mapped sequence number information from the first logic stage and to supply, based thereupon, a second opcode identification and a second mapped number indication associated therewith, wherein the first and the second opcode identifications are selective for a same complex instruction opcode from the instruction queue if the same complex instruction opcode has been allocated to a number of simple instruction dispatch positions, including the first simple instruction dispatch position, less than the mapping number array element corresponding to respective ones of the complex instruction opcodes.

18. An instruction queue scanning apparatus for a superscalar processor having an instruction queue and plural dispatch positions, the apparatus comprising:

plural logic stages each corresponding to a respective one of the dispatch positions and each having respective opcode identification and mapped sequence outputs, a first one of the logic stages coupled to receive predecode information selective for complex instruction opcodes in the instruction queue and to receive instruction mapping numbers corresponding to the complex instruction opcodes, and a subsequent one of the logic stages coupled to receive at least a portion of the predecode information and to receive at least a derivative portion of the instruction mapping numbers from the first logic stage, wherein the logic stages supply on respective opcode identification outputs, signals selective for complex instruction opcodes in the instruction queue and supply on respective mapped sequence outputs, signals to identify a particular one of multiple dispatch positions in a sequence allocated by the apparatus to the corresponding complex instruction opcode, plural dispatch positions being allocable to a single complex instruction opcode in accordance with the mapping number corresponding thereto.

19. A queue scanning apparatus for a superscalar processor having an instruction queue and plural simple instruction dispatch positions, the apparatus comprising:

plural logic stages each corresponding to a respective one of the simple instruction dispatch positions and each having a respective opcode identification output;

a first one of the logic stages coupled to receive information from an opcode marker array and to supply based thereupon the opcode identification output for the first dispatch position, elements of the opcode marker array being selective for corresponding complex instruction opcodes in the instruction queue;

a second one of the logic stages coupled to receive opcode marker information from the first logic stage and to supply based thereupon the opcode identification output for the second dispatch position, wherein the opcode marker information from the first logic stage masks a first element from the opcode marker array if dispatch positions have been fully allocated to the corresponding complex instruction opcode, and the first element from the opcode marker array is unmasked if dispatch positions remain to be allocated to the corresponding complex instruction opcode.

20. An apparatus, as recited in claim 19, further comprising:

subsequent ones of the logic stages, substantially similar to the second logic stage, and coupled to receive opcode marker information from respective prior ones of the logic stages and to supply based thereupon the opcode identification output for the respective dispatch position.

21. An apparatus, as recited in claim 19, wherein the plural logic stages include the first, the second, a third, and a fourth logic stage, the third and the fourth logic stages coupled to receive opcode marker information from respective prior second and third logic stages and to supply based respectively thereupon the opcode identification output for the respective third and fourth dispatch positions;

wherein the opcode marker information from the second logic stage masks the first element from the opcode marker array if dispatch positions have been fully allocated to the corresponding complex instruction opcode, and the first element from the opcode marker array is unmasked if the third dispatch position remains to be allocated to the corresponding complex instruction opcode;

wherein the opcode marker information from the third logic stage masks the first element from the opcode marker array if dispatch positions have been fully allocated to the corresponding complex instruction opcode, and the first element from the opcode marker array is unmasked if the fourth dispatch position remains to be allocated to the corresponding complex instruction opcode.

* * * * *